United States Patent [19]
Clark et al.

[11] Patent Number: 5,869,590
[45] Date of Patent: Feb. 9, 1999

[54] WATERBORNE POLYMERS HAVING PENDANT ALLYL GROUPS

[75] Inventors: Mark Dwight Clark, Kingsport; Martha Jean Collins, Blountville; Patricia Lopez; James Wayne Taylor, both of Kingsport, all of Tenn.

[73] Assignee: Eastman Chemical Company, Kingsport, Tenn.

[21] Appl. No.: 861,430

[22] Filed: May 21, 1997

Related U.S. Application Data

[63] Continuation-in-part of Ser. No. 647,099, May 9, 1996, which is a continuation of Ser. No. 420,550, Apr. 12, 1995, Pat. No. 5,539,073.

[51] Int. Cl.$^6$ .................................................. C08F 22/26
[52] U.S. Cl. .................. 526/323; 526/329.7; 526/329.2; 525/902; 524/533; 524/543
[58] Field of Search ................. 526/323, 329.7, 526/329.2, 264

[56] References Cited

U.S. PATENT DOCUMENTS

| | | | |
|---|---|---|---|
| 4,156,678 | 5/1979 | Krueger . | |
| 4,337,189 | 6/1982 | Bromley et al. | 523/332 |
| 5,227,423 | 7/1993 | Ingle | 524/458 |
| 5,539,073 | 7/1996 | Taylor et al. | 526/323 |

FOREIGN PATENT DOCUMENTS 2206591  1/1989  United Kingdom .

*Primary Examiner*—Mark L. Warzel
*Attorney, Agent, or Firm*—Rose M. Allen; Harry J. Gwinnell

[57] ABSTRACT

This invention provides polymers useful in coating compositions. The polymers are prepared via a free radical polymerization using ethylenically unsaturated monomers. The polymers of this invention possess pendant allylic groups which are capable of effecting free-radical flux when the compositions are applied to a substrate and exposed to oxygen. Coatings formed from preferred compositions possess superior solvent, print, and block resistance.

12 Claims, 7 Drawing Sheets

WATERBORNE POLYMERS HAVING PENDANT ALLYL GROUPS

This application is a continuation-in-part of application Ser. No. 08/647,099, filed May 9, 1996, which is a continuation of Ser. No. 08/420,550, filed Apr. 12, 1995 now U.S. Pat. No. 5,539,073.

FIELD OF THE INVENTION

This invention belongs to the field of polymer chemistry. In particular, this invention provides coating compositions comprised of allyl group-containing styrene-acrylic, acrylic, and vinyl acrylic latexes which have pendant allyl groups.

BACKGROUND OF THE INVENTION

Aqueous emulsion polymers or latexes in both clear and pigmented form are well-known. Examples of their uses include interior and exterior architectural coatings, general metal coatings, adhesives, and the like. Latexes can be formed by aqueous emulsion polymerization of ethylenically unsaturated monomers such as styrene, butyl acrylate, methyl methacrylate, vinyl acetate, vinyl 2-ethylhexanoate, acrylic acid, acrylonitrile, glycidyl methacrylate, 2-hydroxyethyl acrylate and the like. When ethylenically unsaturated monomers that contain a polar functionality such as the carboxyl group in acrylic acid, and/or the hydroxyl group in 2-hydroxyethyl acrylate, are used, there is a propensity for these groups to be found at or near the surface of the emulsion particles because of the affinity of these groups for the aqueous environment. In addition, techniques for increasing the amount of any non-water reactive functional group near the surface of the emulsion particles are known to those skilled in the art of emulsion polymerization. Illustrative of such techniques is the production of a core and shell latex in which the core of the particles has a given composition that may contain a small amount of the functional groups or be devoid of them and the shell or outer layers of the particles have a different composition which may be rich in the functional groups. The large number of independent variables which can be manipulated in designing latex particles renders the preparation of improved latexes problematic.

This invention as shown below, illustrates the importance of polymer gel fraction, polymer swell ratio, and the importance of choosing the appropriate monomers for allyl survival in water-borne particles. In addition, polymer film properties such as gel fraction, swell ratio, molecular-weight between crosslink points, and solvent resistance (methyl ethyl ketone double rubs) are reported. Film properties can be greatly improved if the polymer film can be crosslinked after film formation.

The preparation of emulsion polymers containing "dangling" or pendant double bonds is one possible solution for a coating system which crosslinks ambiently, thermally, and photochemically. However, this is difficult to achieve since the emulsion polymerization process would be expected to also involve free-radical polymerization with such double bonds. While emulsion polymers allow one to prepare high molecular weight polymers at low viscosity, water-borne polymer particles which contain unsaturation allow one the flexibility to later crosslink the coating under a variety of cure conditions. The use of "allylic" groups as vehicles to cure oil-based paints has been used in alkyd resin systems for years. Alkyds are esterified resins prepared from polyols, dicarboxylic acids, and fatty acids. Dangling double bonds in alkyd resins are contained in the fatty acid portion of the resins. Double bonds are referred to herein as "dangling" because they are contained in the side chains of the polymer, and are not contained in its backbone. The reaction of oxygen and allylic hydrogen atoms to form peroxides in the fatty acid portion of the resin starts the crosslinking chemistry. A so-called "drier" in the coating, typically, a cobalt salt, decomposes the peroxide to active hydroxyl and organic radicals at room temperature. The chain of chemical events which follows leads to a crosslinked coating. The advantage of this system is that it uses oxygen as an active agent in the crosslinking chemistry via a free-radical mechanism; thus, the coating formulation is stable until it is exposed to oxygen. Its obvious disadvantage is that organic solvents are liberated as the coating dries. Recent examples of water dispersible alkyds are described in U.S. Pat. No. 5,378,757, and references cited therein and PCT application WO 95/02019, as well as U.S. Pat. No. 4,251,406. In addition, as commercial alkyd coatings age, they have a tendency to become brittle and yellow.

In addition to alkyds, unsaturated polyesters are another class of resins which are prepared from the esterification of unsaturated dicarboxylic acids, and polyols. The unsaturated moiety of the polymer is usually located in the backbone of the polymer molecule. Although unsaturated polyesters can be oil-in-water emulsions, water-in-oil emulsions of unsaturated polyesters are typical. U.S. Pat. No. 3,629,169 describes a curable water-in-oil emulsion in which the oil phase contained a carboxylic acid-containing unsaturated polyester, a copolymerizable monomer such as styrene or methacrylic ester, non-ionic emulsifiers, a thixotropic thickener, a basic neutralizing agent, a promotor-catalyst system composed of dimethyl aniline, an oil soluble cobalt salt, and a thermal peroxide initiator. An emulsion was obtained by adding water while the oil phase was being stirred.

U.S. Pat. No. 3,950,287 describes a process for converting polymerizable water-in-oil emulsions to thermoset objects at room temperature. The oil phase consists of a carboxylic acid-containing unsaturated polyester resin, polymerizable monomers, oil-soluble cobalt salts, and a promoter consisting of N-hydroxyl alkyl substituted, phenyl-substituted tertiary amines and dialkyl anilines. The water phase, which contains hydrogen peroxide, is stirred into the oil to obtain an emulsion which rapidly cures. This reference claims that the effectiveness of a combination of catalyst and promoter is enhanced when it includes a mixture of tertiary amines where one of the tertiary amines has a hydroxyalkyl group attached to the amino group of the nitrogen, and the second amine is a dialkyl aniline. It is claimed that the —OH group of hydroxyalkyl substituted amines coordinates with cobalt which enhances the effectiveness of the catalyst-promotor system in affecting rapid gelation of the emulsion. The emulsions in the above inventions are claimed to be useful for preparing shaped objects.

U.S. Pat. No. 4,077,931 describes a process for producing a pourable (or pumpable) thermosetting water-in-oil emulsion comprising water as the continuous phase, and an unsaturated polyester, a copolymerizable monomer, and a peroxide-cobalt-tertiary amine curing system in the oil phase. This reference teaches that unsaturated polyesters with molecular weights greater than 1800 g/mole give a water-in-oil emulsion with superior properties. This reference further described a formulation recipe which allowed the emulsion to be shaped into usable objects before substantial cure of the emulsion occurred. Thus, this reference explored the use of water-in-oil emulsion prepared from unsaturated esters as molding compounds for shaped objects.

An approach to an emulsion particle which has dangling double bonds, which avoids the problem of polymerization of such double bonds during emulsion polymer synthesis is to first carry out a synthesis providing a latex particle with acid, epoxy, or carbodiimide functionality which is followed by reaction with an epoxy or acid functional compound, respectively, which contains a double bond.

U.S. Pat. No. 4,244,850 describes air drying and air curable latex coating compositions that have unsaturated resin particles dispersed in the water phase and which are combined with an emulsion of a drier salt. The coating compositions were formed by first preparing a latex whose particles contain either carboxyl or 1,2-epoxide functionality. After formation of the latex, a portion of the reactive carboxyl or 1,2-epoxide functionality was reacted with an ethylenically unsaturated monomer carrying one of the other of said reactive groups to provide unsaturated groups on the latex particles. For example, if the initial latex is made with free carboxylic acid functionality, it is then later reacted with glycidyl acrylate, and if the initial latex is made with free 1,2-epoxide functionality, it is then later reacted with methacrylic acid to leave free ethylenic unsaturation on the surface of the modified latex particle. The emulsion of a drier salt is then added after the post reaction. Drier salts such as cobalt naphthanate are used to facilitate the air curing of the residual acrylate moiety. Interestingly, no analytical data is given to support the claims. Instead, only broad observations of cast films are given. For example, the patent states that "water resistance, hardness and adhesion were observed, and it was seen that these gradually improved to possess the properties of cured alkyd coatings." No controls were performed.

U.S. Pat. No. 4,033,920 describes acrylic dispersion polymers which contained dangling methacrylate double bonds. In the process described in this reference, glycidyl methacrylate was reacted with carboxylic acid-containing polymers in solution. The solvent was removed under reduced pressure and replaced by a polymerizable monomer. The polymer solutions were neutralized with ammonia, diethanolamine, or triethyl amine, and then dispersed into water to form an emulsion. This reference suggests that the oil phase of the emulsion could contain conventional initiators such as benzoyl peroxide, and azobisisobutyronitrile. For photocure, photosensitizers such as benzoin (only one example was demonstrated), benzoin methyl ether, and the like were suggested. This reference was directed to the use of these emulsions for preparing films which cured by ultraviolet light or electron beam.

A second approach is to react carboxylic acid-containing latex particles with carbodiimide methacrylates to produce latex particles with dangling methacrylates (see U.S. Pat. No. 5,371,148.)

U.S. Pat. No. 3,219,610 teaches that emulsion particles prepared from allyl methacrylate, ethyl acrylate, and methyl methacrylate produced acetone insoluble films when they were baked at 150° C. for 30 minutes, whereas, films air dried for two hours were soluble in acetone. No analysis of the allyl content of these films were made to determine the amounts if any, of allyl moieties which survived the emulsion polymerization process. No styrene was used in this process, and no morphology design of the latex particles was attempted. No methyl ethyl ketone (solvent) resistance data was given.

L. V. Molkova, et al., Polymer Science USSR 28 (2) p. 321 (1986) describes emulsion polymerization of copolymers of allyl methacrylate and methyl methacrylate. This reference teaches allyl survival, as measured by bromination, as high as 83%. The glass transition temperatures of the copolymers were greater than 80° C. Crosslinking occurred when the film was heated at greater than 150° C. in the presence of a radical initiator.

GB Patent No. 2206591A taught the use of allyl methacrylate to prepare seed/shell/mantle latexes where the shell (as used below, the seed/shell would be referred to as the core) was crosslinked with allyl methacrylate. More recently, Lee and Rudin (Makromol. Chem., Rapid Commun. 10, 655 (1989)) used 5 weight percent of allyl methacrylate in the core of a core,shell latex particle as a "crosslinking agent" to give the core gel content. U.S. Pat. No. 4,925,893 and European Patent Application 0 297 781 A2 teach the preparation of latexes using a combination of allyl methacrylate and diallyl phthalate with other polymerizable monomers to prepare coatings which cure ambiently in the presence of catalyst. Styrene is disclosed as a possible but not preferred monomer.

U.S. Pat. No. 5,264,482 teaches the reaction of allyl glycidyl ether with carboxylic acid-containing copolymers to produce a water-soluble polymer with a "dangling allyl ether group" which was used as a curative additive to latex paints to increase lap time (or improve wet edge).

Although there is a need for products such as those described above, there is a further need for advanced products that have improved, lower initial molecular weight characteristics, improved adhesion, and products that will crosslink under ambient conditions or low to moderate temperatures in the presence of air with or without the use of drier salts or fugitive filming aids.

SUMMARY OF THE INVENTION

This invention provides polymers prepared via free-radical emulsion polymerization which contain dangling or pendant allyl functionality. In an embodiment, the polymers, when exposed to a radical source or oxygen, further react as evidenced by an increase in gel fraction and/or a decrease in swell ratio; this results in a coating with improved properties, for example, print resistance, block resistance, or solvent resistance. In a preferred embodiment, the latex composition is prepared from allyl methacrylate, methyl methacrylate and/or styrene, amino-functional methacrylates and additional ethylenically unsaturated monomers. It is further preferred that the additional ethylenically unsaturated monomers include ethyleneureido-containing monomers.

DETAILED DESCRIPTION OF THE INVENTION

Figure 1:
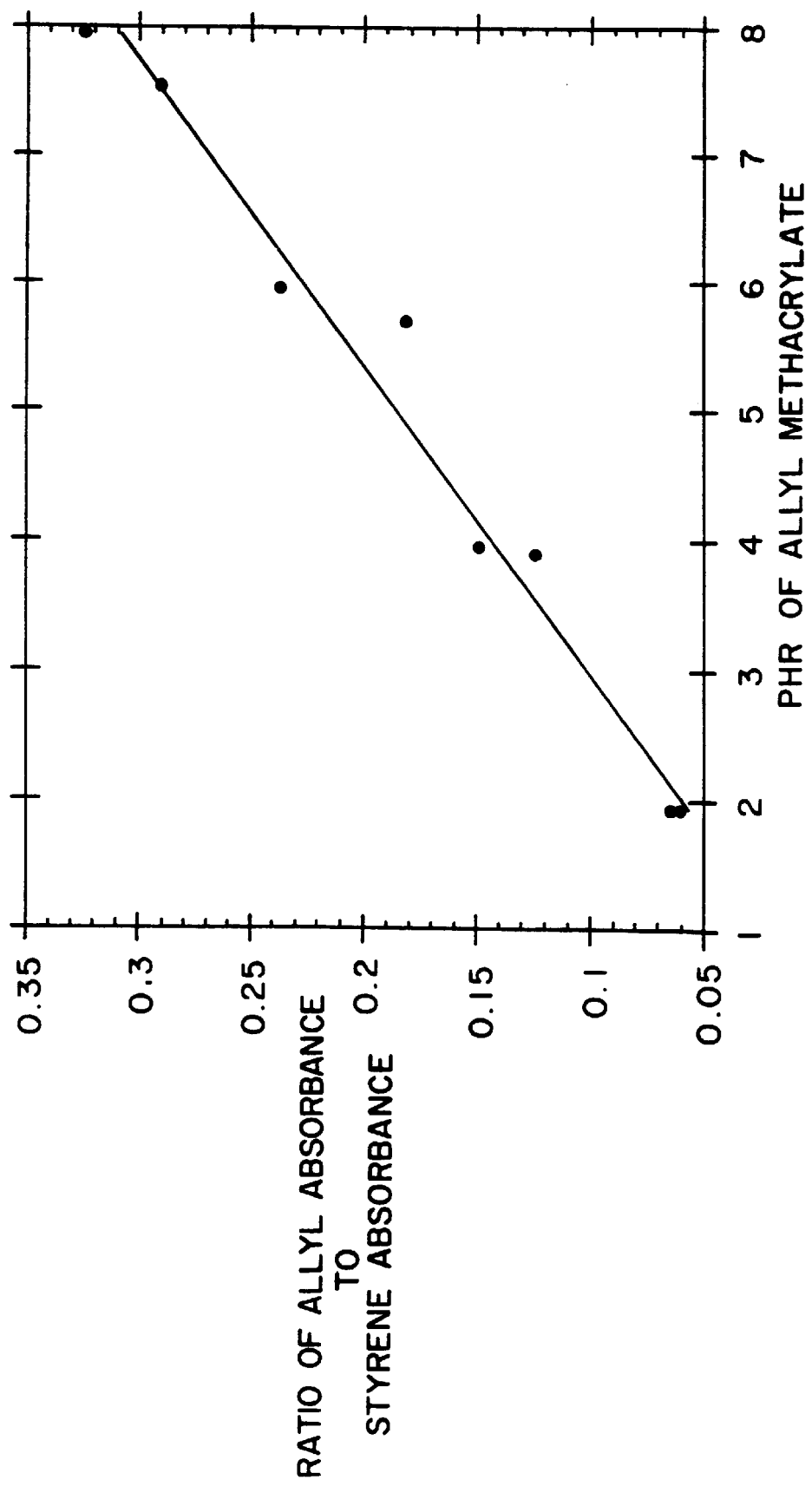
FIG. 1 is a plot of the theoretical ratio of allyl absorbance to styrene absorbance in an allyl group-containing latex with 20% styrene.

The present invention provides a curable polymer composition comprising the reaction product of the free radical emulsion polymerization of an allyl group-containing ethylenically unsaturated monomer, wherein said allyl group-containing monomer is a compound having at least one allyl group and at least one other ethylenically unsaturated group other than an allyl or a group which is capable of a free radical reaction, or wherein said allyl group-containing ethylenically unsaturated monomer is a compound having three or more allyl groups, wherein said allyl group is bonded to a moiety which is other than a carbonyl group, with a styrenic monomer or an alkyl (alkyl) acrylate, and optionally other ethylenically unsaturated monomers, wherein said polymer possesses sufficient available pendant allyl functionality to effect crosslinking, especially during and/or provided that said polymer has a glass transition temperature of less than 65° C., after film formation.

The polymers of the present invention possess a glass transition temperature ($T_g$) of less than 65° C., preferably less than 55° C., most preferably less than 50° C.

As used herein, the term "allyl group-containing ethylenically unsaturated monomer" refers to a compound having at least one allyl group and at least one other ethylenically unsaturated group or a group which is capable of a free-radical reaction, such as a mercaptan. The terms "allyl group" and "allyl functionality" refer to a group having an allylic hydrogen atom, wherein said allyl group is bounded to a moiety which is other than a carbonyl group.

In a preferred embodiment, greater than about 70 weight percent of the total allyl group-containing ethylenically unsaturated monomers utilized possess a free allyl group subsequent to polymerization.

In a further preferred embodiment, the allyl group-containing ethylenically unsaturated monomer is selected from the group consisting of allyl methacrylate, alkoxybutenyl methacrylates such as 1-(2-methoxy-3-butenyl) methacrylate, hydroxybutenyl methacrylate, the allyl or diallyl ester of maleic acid, and poly(allyl glycidyl ether).

Preferably, the alkyl (alkyl) acrylate is methyl methacrylate, or a $C_2$–$C_6$ alkyl homologue thereof.

In a further preferred embodiment, the styrenic monomer is selected from the group consisting of styrene, alpha-methyl styrene, vinyl naphthalene, vinyl toluene, and chloromethyl styrene.

Preferred polymers of the present invention have sufficient pendant allyl functionality to allow for crosslinking when the polymers are applied to a substrate and allowed to dry. Accordingly, such preferred polymer compositions, when applied to a substrate at a thickness of about 2 mils and exposed to ambient temperatures for a period of up to 21 days, remains unpenetrated when subjected to about 100 methylethylketone double rubs.

In a further preferred embodiment, the polymer composition is prepared from about 1 to about 15 weight percent of allyl group-containing ethylenically unsaturated monomers, about 10 to about 99 weight percent of styrenic monomers, and other ethylenically unsaturated monomers, most preferably about 2 to about 10 weight percent of allyl group-containing ethylenically unsaturated monomers, about 10 to about 70 weight percent of styrenic monomers, and any remaining weight percent from other ethylenically unsaturated monomers, the total being 100 percent.

In an especially preferred embodiment, the polymer is prepared from about 4 to about 6 weight percent of allyl group-containing ethylenically unsaturated monomers, about 20 to about 55 weight percent of styrenic monomers, and other ethylenically unsaturated monomers.

In the above polymers, additional ethylenically unsaturated species which can be utilized include, for example, methyl acrylate, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, octyl methacrylate, styrene, α-methyl styrene, glycidyl methacrylate, carbodiimide methacrylate, alkyl crotonates, vinyl acetate, di-n-butyl maleate, di-octylmaleate, and compounds of the general formula (1)

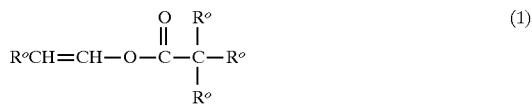

wherein $R^\circ$ is independently hydrogen or an alkyl group of up to 12 carbon atoms. Preferably, at least one of $R^\circ$ is methyl.

Preferred compounds of formula (1) include the following:

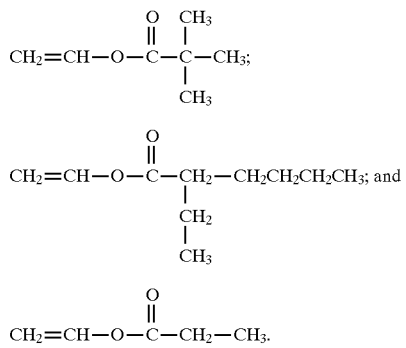

In the above formulae, the alkyl and alkylene groups may be straight or branched chain, and unless otherwise specified contain from one to 12 carbon atoms.

Preferably, the polymer is prepared using nitrogen containing monomers, preferably the known wet adhesion-promoting monomers, including t-butylaminoethyl methacrylate, dimethylaminoethyl methacrylate, and diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl) ethylene urea, and methacrylamidoethylethylene urea.

One process for preparing these polymers involves charging surfactants to a reactor, feeding in the monomers for the core of the latex under monomer starved conditions. As used herein, the term "starved-feed" or "monomer starved" refers to a process where a mixture of the monomers and separately the initiator are fed into the preheated reaction mixture over a period of time. This process results in better compositional control of the copolymers since a high conversion of monomer to polymer is maintained in the reaction vessel. This process also results in better temperature control of the polymerization. The addition rate and process temperature is optimized for the initiator used. The reaction is preferably conducted at 80° C. under an inert gas such as nitrogen, and the polymerization is initiated using a free radical initiator such as sodium persulfate. After the core monomers are fed into the reactor, a monomer dispersion or solution, comprised of, for example, a surfactant, styrene, butyl acrylate, 2-ethylhexyl 3-mercaptopropionate (a chain transfer agent to control the molecular weight and gel fraction of the shell), and the monomers of which define the shell are fed into the reactor.

It is also preferred that in this process, a chain transfer agent is utilized in a range of about 0.01% to 8% by weight, based on the total solids in the emulsion. Exemplary chain transfer agents are butyl mercaptan, mercaptopropionic acid, 2-ethylhexyl 3-mercaptopropionate, n-butyl 3-mercaptopropionate, octyl mercaptan, isodecyl mercaptan, octadecyl mercaptan, mercaptoacetic acid, and the reactive chain transfer agents taught in U.S. Pat. No. 5,247,040, incorporated herein by reference, in particular, allyl mercaptopropionate, allyl mercaptoacetate, crotyl mercaptopropionate, and crotyl mercaptoacetate.

In the above process, suitable initiators, reducing agents, catalysts and surfactants are well-known in the art of emulsion polymerization.

Typical initiators include hydrogen peroxide, potassium or ammonium peroxydisulfate, dibenzoyl peroxide, lauryl peroxide, ditertiary butyl peroxide, 2,2'-azobisisobutyronitrile, t-butyl hydroperoxide, benzoyl peroxide, and the like.

Suitable reducing agents are those which increase the rate of polymerization and include for example, sodium bisulfite, sodium hydrosulfite, sodium formaldehyde sulfoxylate, ascorbic acid isoascorbic acid, and mixtures thereof.

Suitable catalysts are those compounds which increase the rate of polymerization and which, in combination with the above described reducing agents, promote decomposition of the polymerization initiator under the reaction conditions.

Suitable catalysts include transition metal compounds such as, for example, ferrous sulfate heptahydrate, ferrous chloride, cupric sulfate, cupric chloride, cobalt acetate, cobaltous sulfate, and mixtures thereof.

Suitable surfactants include ionic and nonionic surfactants such as alkyl polyglycol ethers such as ethoxylation products of lauryl, oleyl, and stearyl alcohols; alkyl phenol polyglycol ethers such as ethoxylation products of octyl- or nonylphenol, diisopropyl phenol, triisopropyl phenol; alkali metal ammonium salts of alkyl, aryl or alkylaryl sulfonates, sulfates, phosphates, and the like, including sodium lauryl sulfate, sodium octylphenol glycolether sulfate, sodium dodecylbenzene sulfonate, sodium lauryldiglycol sulfate, and ammonium tritertiarybutyl phenol and penta- and octaglycol sulfonates, sulfosuccinate salts such as disodium ethoxylated nonylphenol half ester of sulfosuccinic acid, disodium n-octyldecyl sulfosuccinate, sodium dioctyl sulfosuccinate, and the like.

Also, reactive anionic or nonionic surfactants possessing styrene or allyl groups may be utilized. Examples include surface active monomers sold by PPG Industries, Inc., as MAZON SAM 181, 183, 184, 211 which are anionic sulfates or sulfonates and MAZON SAM 185–187 which are nonionic. Other reactive surfactants include those sold by Daiichi Kogyo Seiyaku under the name AQUARON. Examples of AQUARON surfactants includes compounds of the formulae

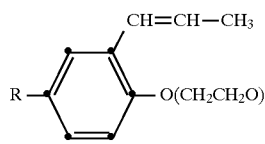

and

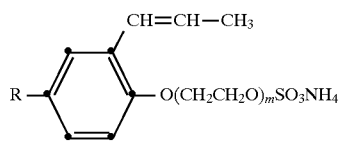

wherein R is nonyl or octyl and n and m are integers of from 1 to 50 and 1 to 10, respectively. Other reactive surfactants include the sodium alkyl allyl sulfosuccinate sold by Henkel, under the name TREM LF-40. Further examples of such surfactants can be found in U.S. Pat. Nos. 5,185,212; 2,600,831; 2,271,622; 2,271,623; 2,275,727; 2,787,604; 2,816,920; and 2,739,891, incorporated herein by reference.

Water-dispersible and water-soluble polymers may also be employed as surfactants/stabilizers in the emulsion polymerizations described herein. Examples of such polymeric stabilizers include water-dispersible polyesters (U.S. Pat. Nos. 4,946,932 and 4,939,233, incorporated herein by reference), water-dispersible polyurethanes (U.S. Pat. Nos. 4,927,876 and 5,137,961, incorporated herein by reference), and alkali-soluble acrylic resins (U.S. Pat. No. 4,839,413, incorporated herein by reference).

In the above emulsions, the polymer exists as a particle, dispersed in water.

Thus, as a further aspect of the present invention, there is provided a polymeric particle having a mean diameter of about. 35 to about 350 nm, said particle comprising the reaction product of the free radical emulsion polymerization of an allyl group-containing ethylenically unsaturated monomer and a styrenic monomer, and optionally other ethylenically unsaturated monomers, wherein said particle possesses sufficient pendant allyl moieties to effect free-radical flux upon application to a substrate to form a film, and exposure to oxygen at temperatures of greater than about 0° C.

In a preferred embodiment, in the polymer particle greater than about 60 weight percent of the total allyl group-containing ethylenically unsaturated monomers utilized possess a free allyl group.

In a preferred embodiment, the particle is a generally spherical particle. Accordingly, in a preferred embodiment of the present invention, there is provided a generally spherical polymeric particle having a core portion and a shell portion, wherein said core portion is a polymer composition comprising the reaction product of the free radical emulsion polymerization of ethylenically unsaturated monomers, said core portion having an overall $T_g$ of about –50° C. to about 60° C., wherein the gel content is in a range of 0 to 90%, and the swell ratio of the gel portion in acetone ranges from 2:1 to 30:1, and wherein said shell portion is a polymer composition comprising the reaction product of the free radical emulsion polymerization of an allyl group-containing ethylenically unsaturated monomer and a styrenic monomer, and optionally other ethylenically unsaturated monomers, wherein said shell possesses a gel content of about 0 to 90%, and sufficient pendant allyl functionality to effect crosslinking at temperatures as low as about 0° C.

In such particles, the overall $T_g$ is about –30° C. to 30° C.

The polymer particles may also be prepared in a multilobe form, a peanut shell, an acorn form, a raspberry form, or in the shape of an "o".

It is further preferred in such particles that said core portion comprises about 20 to about 80 of the total weight of said particle and wherein said shell portion comprises about 80 to about 20 of the total weight volume of said particle.

In this regard, gel fraction is determined by the method taught in U.S. Pat. No. 5,371,148, incorporated herein by reference. (P. J. Flory, "Principles of Polymer Chemistry," Cornell University Press, Ithaca, New York (1953), Chapter 9; P. J. Flory, J. Am. Chem. Soc., 69, 2893 (1947); P. J. Flory, J. Am. Chem. Soc., 59, 241 (1937); W. H. Stockmeyer, J. Chem. Phys., 12, 125 (1944)).

As a further aspect of the present invention there is provided a latex paint composition which comprises the polymers as described above, further comprising one or more leveling, rheology, and flow control agents such as silicones, fluorocarbons or cellulosics; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; extenders; defoaming and antifoaming agents; anti-settling, anti-sag and bodying agents; anti-skinning agents; anti-flooding and anti-floating agents; fungicides and mildewcides; corrosion inhibitors; thickening agents; or coalescing agents.

Specific examples of such additives can be found in *Raw Materials Index*, published by the National Paint & Coatings Association, 1500 Rhode Island Avenue, N.W., Washington, D.C. 20005. Further examples of such additives and emulsion polymerization methodology may be found in U.S. Pat. No. 5,371,148, incorporated herein by reference.

Examples of flatting agents include synthetic silica, available from the Davison Chemical Division of W.R. Grace & Company under the trademark SYLOID®; polypropylene, available from Hercules Inc., under the trademark HERCOFLAT®; synthetic silicate, available from J.M. Huber Corporation under the trademark ZEOLEX®.

Examples of dispersing agents and surfactants include sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinnic acid, disodium alkyl amido polyethoxy sulfosuccinnate, tetrasodium N-(1,2-dicarboxyethyl)-N-octadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkylene amine salts of an unsaturated fatty acid, all available from BYK Chemie U.S.A. under the trademark ANTI TERRA®. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, and polyethylene oxide. Other examples of thickeners include the methylene/ethylene oxide associative thickeners and water soluble carboxylated thickeners, for example, those sold under the UCAR POLYPHOBE trademark by Union Carbide.

Several proprietary antifoaming agents are commercially available, for example, under the trademark BRUBREAK of Buckman Laboratories Inc., under the Byk® tradename of BYK Chemie, U.S.A., under the Foamaster® and Nopco® trademarks of Henkel Corp./Coating Chemicals, under the DREWPLUS® trademarks of the Drew Industrial Division of Ashland Chemical Company, under the TRYSOL® and TROYKYD® trademarks of Troy Chemical Corporation, and under the SAG® trademarks of Union Carbide Corporation.

Examples of fungicides, mildewcides, and biocides include 4,4-dimethyloxazolidine, 3,4,4-trimethyloxazolidine, modified barium metaborate, potassium N-hydroxy-methyl-N-methyldithiocarbamate, 2-(thiocyanomethylthio) benzothiazole, potassium dimethyl dithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-guinolinate.

Examples of U.V. absorbers and U.V. light stabilizers include substituted benzophenone, substituted benzotriazoles, hindered amines, and hindered benzoates, available from American Cyanamid Company under the trademark CYASORB UW, and diethyl- 3-acetyl-4-hydroxy-benzyl-phosphonate, 4-dodecyloxy-2-hydroxy benzophenone, and resorcinol monobenzoate.

As a further aspect of the present invention, there is provided a coating composition optionally containing one or more of the above-described additives. It may also be desirable to utilize a water-miscible organic solvent and/or coalescing agent. Such solvents and coalescing agents are well known and include ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diacetone alcohol, TEXANOL® ester alcohol (Eastman Chemical Company), and the like. Such solvents and coalescing aids may also include reactive solvents and coalescing aids such as diallyl phthalate, SANTOLINK XI-100® polyglycidyl allyl ether from Monsanto, and others as described in U.S. Pat. Nos. 5,349,026 and 5,371,148, incorporated herein by reference.

(See, for example, J. K. Backus in "High Polymers, Vol. 29, 1977, p. 642–680).

As a further aspect of the present invention, there is provided a coating composition as set forth above, further comprising one or more pigments and/or fillers in a concentration of about 1 to about 70 weight percent, preferably about 30 to about 60 weight percent, based on the total weight of components (a) and (b) of the composition.

Pigments suitable for use in the coating compositions envisioned by the present invention are the typical organic and inorganic pigments, well-known to one of ordinary skill in the art of surface coatings, especially those set forth by the Colour Index, 3d Ed., 2d Rev., 1982, published by the Society of Dyers and Colourists in association with the American Association of Textile Chemists and Colorists. Examples include, but are not limited to the following: CI Pigment White 6 (titanium dioxide); CI Pigment Red 101 (red iron oxide); CI Pigment Yellow 42, CI Pigment Blue 15, 15:1, 15:2, 15:3, 15:4 (copper phthalocyanines); CI Pigment Red 49:1; and CI Pigment Red 57:1.

The latex compositions of the present invention can be utilized alone or in conjunction with other conventional waterborne polymers. Thus, as a further aspect of the present invention, there is provided a waterborne coating composition comprising a blend of a curable polymer composition comprising the reaction product of the free radical emulsion polymerization of an allyl group-containing ethylenically unsaturated monomer and a styrenic monomer or an alkyl (alkyl)acrylate, and optionally other ethylenically unsaturated monomers, wherein said polymer possesses sufficient pendant allyl functionality to effect crosslinking at temperatures as low as about −30° C.; and optionally one or more water dispersible polymers selected from the group consisting of polyesters, polyester-amides, cellulose esters, alkyds, polyurethanes, epoxy resins, polyamides, acrylics, and vinyl polymers, and the like.

Upon formulation above, the coating compositions is then applied to the desired substrate or article, e.g., steel, aluminum, wood, gypsum board, or galvanized sheeting (either primed or unprimed), and allowed to air dry. Any coating composition designed for industrial coatings, textile coatings, ink coatings, adhesives, or coatings for plastics are within the scope of the present invention and is included in the term "article". Thus, as a further aspect of the present invention, there is provided a shaped or formed article which has been coated with the coating compositions of the present invention and dried.

Figure 2:
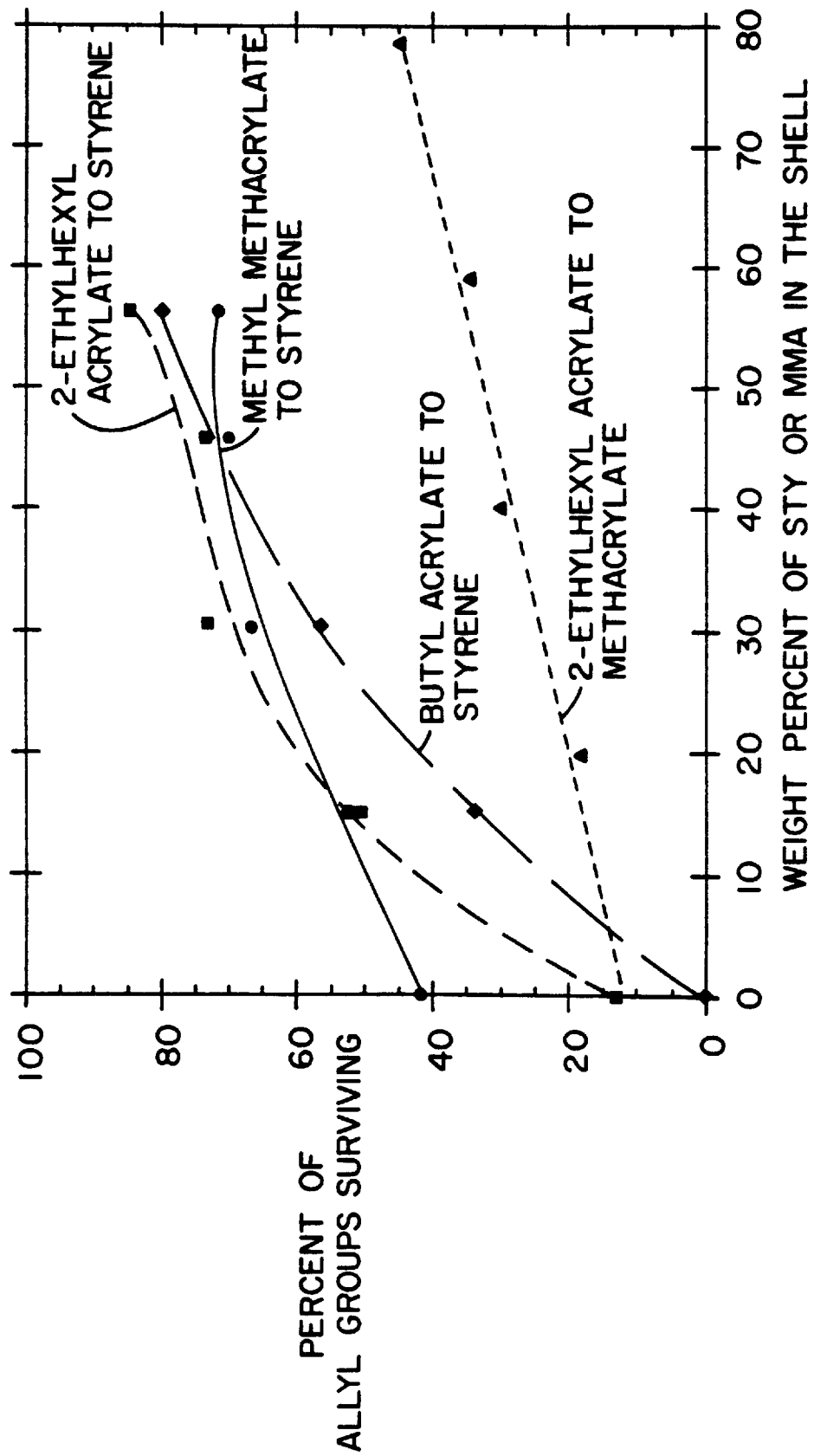
FIG. 2 is a plot of percent of allyl groups surviving the polymerization reaction versus the weight percent of styrene (STY) or methyl methacrylate(MMA) in the shell of the particle.

In the experimental section, Examples 3 through 17 and FIG. 2 demonstrate that during emulsion polymerization, the survival of the allyl moieties in the polymer depends upon the type of monomers present during the polymerization process. The loss of allyl functionality is due to reaction of both double bonds of for example, allyl methacrylate, in the polymerization process, resulting in intra-particle crosslinking. The data show that the polymerization of allyl methacrylate in the presence of butyl acrylate results in negligible levels of allyl moieties surviving the polymerization process. In addition, polymerizing allyl methacrylate in the presence of 2-ethylhexyl acrylate results in about 17% of the allyl moieties surviving the polymerization process. Polymerizing allyl methacrylate in the presence of methyl methacrylate results in about 42% of the allyl moieties surviving the polymerization process. Thus, polymerizing allyl methacrylate in the presence of butyl acrylate, 2-ethylhexyl acrylate, or methyl methacrylate results in highly crosslinked latex particles. This fact is illustrated in Table 10d, Examples 53 through 72 where the lower swell ratios and higher gel fractions are obtained for the particles where the shell contains methyl methacrylate as the hard monomer (Examples 65 through 72) versus styrene (Examples 46 through 53) as the hard monomer. Since crosslinked shells in core/shell latex particles restrict polymer flow during film formation, it is an undesirable result. FIG. 2 shows that the presence of styrene during the polymerization of allyl methacrylate to form the shell of the latex particle give higher survival level of the allyl moieties. In effect, the polymerization process is more selective in polymerizing through the methacrylate moiety than the allyl moiety of allyl methacrylate when styrene is present. The conclusion is that the preparation of allyl group-containing latex polymers is best accomplished in the presence of styrene. In addition, when low levels of styrene are present in the monomer feed, the best choice of acrylate monomers for Tg adjustment are those monomers with higher molecular weights than butyl acrylate; thus, less weight % of styrene can be used for a given mole % level of styrene if 2-ethylhexyl acrylate is used instead of butyl acrylate. (See FIG. 2).

Figure 3:
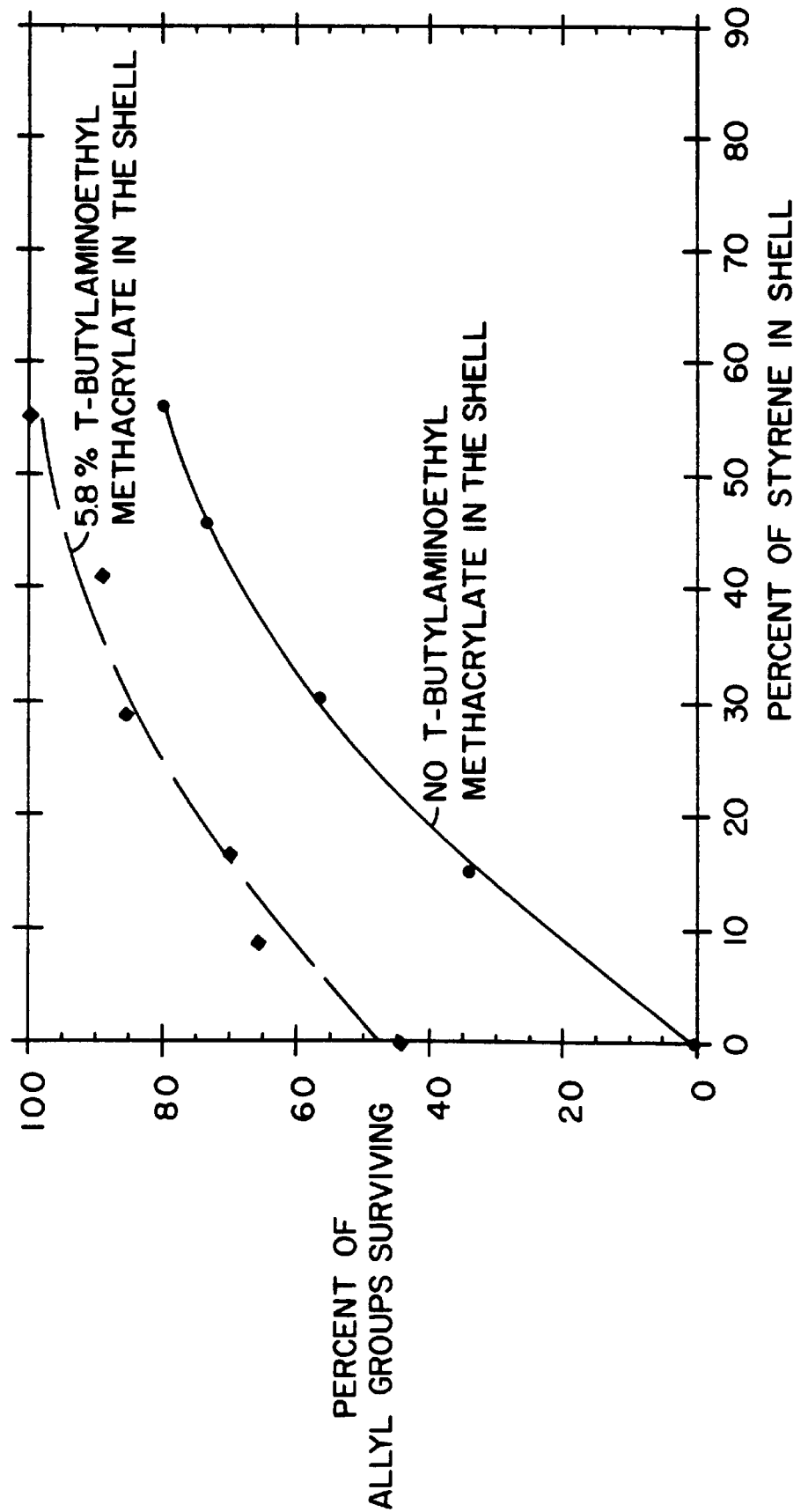
FIG. 3 is a plot of allyl group survival versus increasing percent of styrene in the shell of the particle.

Examples 18 through 28 (Tables 4 and 5) and FIG. 3 demonstrate that during the polymerization of allyl methacrylate, the presence of t-butylaminoethyl methacrylate give additional survival of the allyl moieties. Thus, an important aspect of this invention is that allyl group survival is enhanced by the use of nitrogen-functional monomers. For the polymer with a butyl acrylate-based shell (zero styrene content on the plot) which contains no t-butylaminoethyl methacrylate, essentially no allyl groups from allyl methacrylate survived the polymerization process; however, the addition of 5.8% of t-butylaminoethyl methacrylate to the monomer feed for the shell results in 47% of the allyl groups surviving the polymerization process. In addition, as styrene is added to the monomer feed for the shell, the feed containing the t-butylaminoethyl methacrylate consistently gives higher survival levels of allyl moieties in the shell than the feed containing no t-butylaminoethyl methacrylate.

Examples 29 through 45 (Table 8b) show that for styrene-based core/shell particles where the shell contains allyl methacrylate, t-butylaminoethyl methacrylate, styrene, and butyl acrylate that allyl survival levels from 79% to 100% are obtainable. In addition, the data show that when these latexes were cast and air dried, a linear decrease in swell ratio (see experimental for details) occurred over 37 days; thus, these latexes crosslinked in the absence of added driers. Tilson (U.S. Pat. No. 3,219,610) showed that his films did not crosslink at ambient temperatures even in the presence of a cobalt napthenate drier.

To demonstrate the effect of various monomers in the shell on the process of preparing allyl group-containing core/shell waterborne particles, the following experiment was carried out using the following monomers in the preparation of the shell: t-butyl-aminoethyl methacrylate, dimethylaminoethyl methacrylate, styrene, 2-ethylhexyl acrylate, 2-ethylhexyl 3-mercaptopropionate. In the core of these core/shell particles the level of trimethylolpropane triacrylate was varied. In addition, the calculated Tg of the latex particles was varied by maintaining the Tg of the shells at 15° C. while adjusting the Tg of the core of the latex particles to achieve an overall Tg of −5° C. or 15° C. The preparation of the latexes are given in Examples 46 through 62. The experiment is described in Tables 9a–9e. The output of the experiment, filterable solids through a 100 mesh screen (scrap), shear stability, freeze-thaw stability, minimum film forming temperature (MFFT), percent allyl survival, gel fraction of the latex, and swell ratio of the latex are given in Table 9f. Analysis of the results in Table 9g shows the effect of each independent variable in the design. The results show that increasing the overall level of mercaptan while decreasing the level of trimethylolpropane triacrylate decreases the amount of scrap. In addition, latex particles with an overall Tg of 15° C. gave (on the average) latexes with higher freeze-thaw cycles than latexes with an overall Tg of −5° C. In this experiment, increasing the overall level of trimethylolpropane triacrylate from 0.1% to 0.2% decreases (on the average) the allyl survival by 3%. It is observed that the use of dimethylaminoethyl methacrylate instead of t-butylaminoethyl methacrylate results in a polymer with less gel in the shell and a latex particle with a higher swell ratio. A shell with less gel content, and a higher swell ratio gives latex particles which film more efficiently than those particles with higher gel content and lower swell ratios.

A second series of experiments (shown on Table 10a) shows the effect of replacing styrene with methyl methacrylate (Examples 65 through 73). Each methyl methacrylate-based core/shell latex is characterized in Table 10d. The analysis of the results is shown in Table 10e. The results show that increasing the overall level of mercaptan while decreasing the level of trimethylolpropane triacrylate decreases the amount of scrap, and that latex particles with an overall Tg of 15° C. give (on the average) latexes with higher freeze-thaw cycles than latexes with an overall Tg of −5° C. Replacing styrene with methyl methacrylate lowers the allyl moiety survival (on the average) by 79%, decreases the swell ratio of the latex particles, and increases the gel fraction of the shell. Example 73 (Table 10d) illustrates that the substitution of a small amount of methyl methacrylate for styrene in the shell results in an unexpectedly high allyl survival level as well as core/shell morphology.

Analysis of the data shown in Tables 11a–11c and Tables 9b and 9c shows the effect of replacing 2-ethylhexyl acrylate with butyl acrylate (Examples 74 through 82) in the shell of the core/shell latex particles. Each butyl acrylate-based core/shell latex is characterized in Table 11d. The analysis of the results is shown in Table 11e. One desired property of a latex is that when the latex is frozen and then thawed that the latex thaws to a stable liquid and not a solid. Freeze-thaw results show that latex particles with an overall Tg of 15° C. give (on the average) latexes with higher freeze-thaw cycles than latexes with an overall Tg of −5° C. Replacing 2-ethylhexyl acrylate with butyl acrylate lowers the allyl moiety survival (on the average) by 12%, decreases the swell ratio of the latex particles and increases the gel fraction of the shell. 2-Ethylhexyl 3-mercaptopropionate lowers the gel fraction of the particle (by reducing gel fraction in the shell) while trimethylolpropane triacrylate increases the gel fraction of the particle (by increasing the gel fraction in the core). Increasing the level of trimethylolpropane triacrylate from 0.1% to 0.2% has the effect of reducing (on the average) the swell ratio of the latex particle.

The fourth series of experiments (shown in Table 12a) shows the effect of maintaining a low Tg shell of −5° C. while adjusting the Tg of the core to achieve an overall Tg of the particle of −5° C. to 15° C. (Examples 83 through 91). 2-Ethylhexyl acrylate was used as the low Tg monomer in the latex preparations. In addition, t-butylaminoethyl methacrylate is compared to dimethylaminoethyl methacrylate. The results of the experiment are shown in Table 12d. Analysis of the results (Table 12e) shows that using dimethylaminoethyl methacrylate in place of t-butylaminoethyl methacrylate gives (on the average) an increase in allyl survival of 7.6%. In addition, dimethylaminoethyl methacrylate gives latex particles with lower overall gel fraction. As shown in Table 12d, those latexes with hard cores and soft shell (shell Tg=−50° C., overall Tg=15° C.) have on the average much lower freeze-thaw cycles than the latexes with hard shells (Tg=15° C.) and soft core.

Examples 95, 96, 101, and 102 show that the emulsion polymerization process can use a wide variety of surfactants such as nonreactive small molecular weight anionic surfactants (AEROSOL OT), polyester-type surfactants, and reactive anionic surfactants designed to copolymerize with styrene but not to polymerize with allyl groups.

Examples 97 and 98 demonstrate a procedure using power feed (or gradient feed) to prepare allyl group-containing latexes with allyl and enriched styrene surfaces.

Examples 103 and 104 illustrate methods for preparing novel compositions of allyl group-containing latexes using hydroxybutenyl methacrylate in the place of allyl methacrylate.

Example 105 illustrates a novel composition and procedure for grafting poly(allyl glycidyl ether) (MONSANTOLINK XI-100) onto the shell of an allyl group-containing latex particle.

Examples 106 illustrates the use of butyl methacrylate as a monomer for the shell. Example 107 illustrates the use of isobornyl methacrylate in the shell of latex particles. Examples 108 and 109 illustrate the preparation of latex particles with 10% and 45% styrene, respectively.

Examples 110 and 111 show the use of AQUACAT catalyst in the monomer feed. Comparisons of the latexes show that the use of the anionic surfactant AEROSOL 18 in the monomer feed gives a process-worthy latex with low filterable solids; on the other hand, the use of anionic surfactant AEROSOL OT-75 in the place of AEROSOL 18 (Example 111) provides an undesirably high level of filterable solids.

Preferably, driers such as AQUACAT are added to a formulation to enhance the cure rate of an ambient curable water borne polymer; however, the use of AQUACAT requires properly stirring the AQUACAT into the formulation, and its absorption onto the waterborne particles is time dependent. In addition, in a pigmented formulation, it is likely that pigments will absorb some of the AQUACAT requiring more to be used in a pigmented formulation than in an unpigmented formulation. By adding the AQUACAT directly to the monomer feed, the shell of the particles containing the allyl moieties has the aquacat absorbed onto the shell in close proximity to the allyl moieties resulting in very efficient use of the catalyst; thus, avoiding the problems discussed above. The results of crosslinking studies from this latex are shown in Example 110 in Table 20.

Micrograph Studies

Although the "classical" core/shell morphology is often a desired goal of latex synthesis, other morphologies such as multilobe morphology may be desired. For example, a multilobe latex, RHOPLEX ML200 is sold by Rohm & Haas Company. This type of morphology is believed to have a rheology benefit in formulated coatings. In addition to the "classical" core/shell morphologies obtained in this study, three additional morphologies were identified. The latex from Example 44 contained multilobe particles whereas the latex from Example 59 contained peanut shell morphologies with a uniform shell. An unknown morphology was discovered in Examples 75 through 78. Many of the latexes particles from these examples appeared to be doughnut in shape with a hole in their center, hereinafter referred to as "O-shaped".

Crosslinking Studies

Figure 4:
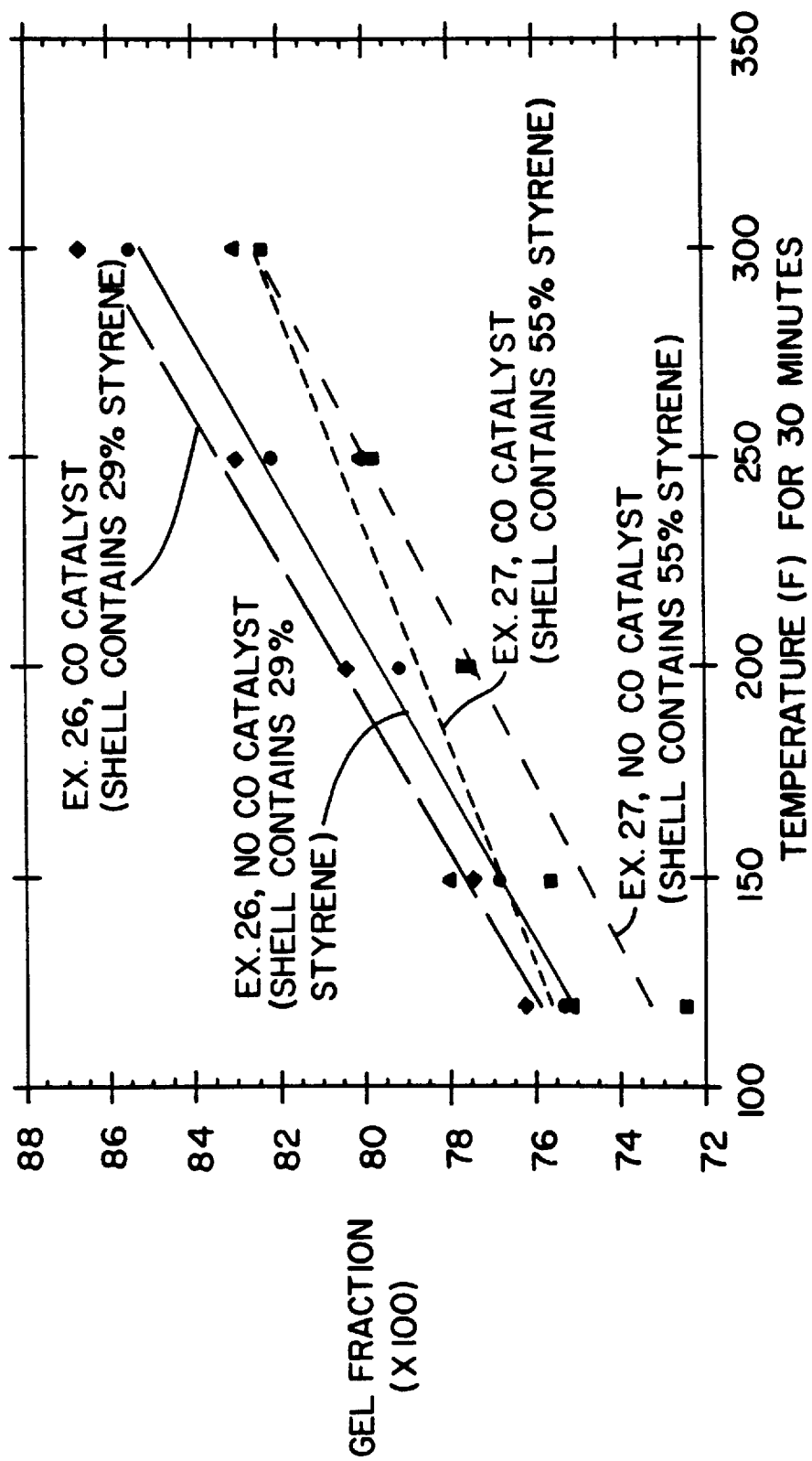
FIG. 4 is a plot of gel fraction (×100) versus cure temperature (°F.) for 30 minutes.

The survival of allyl moieties in the latexes from Examples 26 and 27 were 85 and 92%, respectively. These latexes were tested with and without the addition of cobalt catalyst (See Example 112 for details). One mil films were cast over release paper then cured for 30 minutes in a forced-air oven at various temperatures. The results are shown in FIG. 4. In general as the cure temperature increases the gel content of the films increases with and without the presence of a cobalt drier. Samples which contained the cobalt drier generally had slightly higher gel fractions than the samples which contained no cobalt drier.

Figure 5:
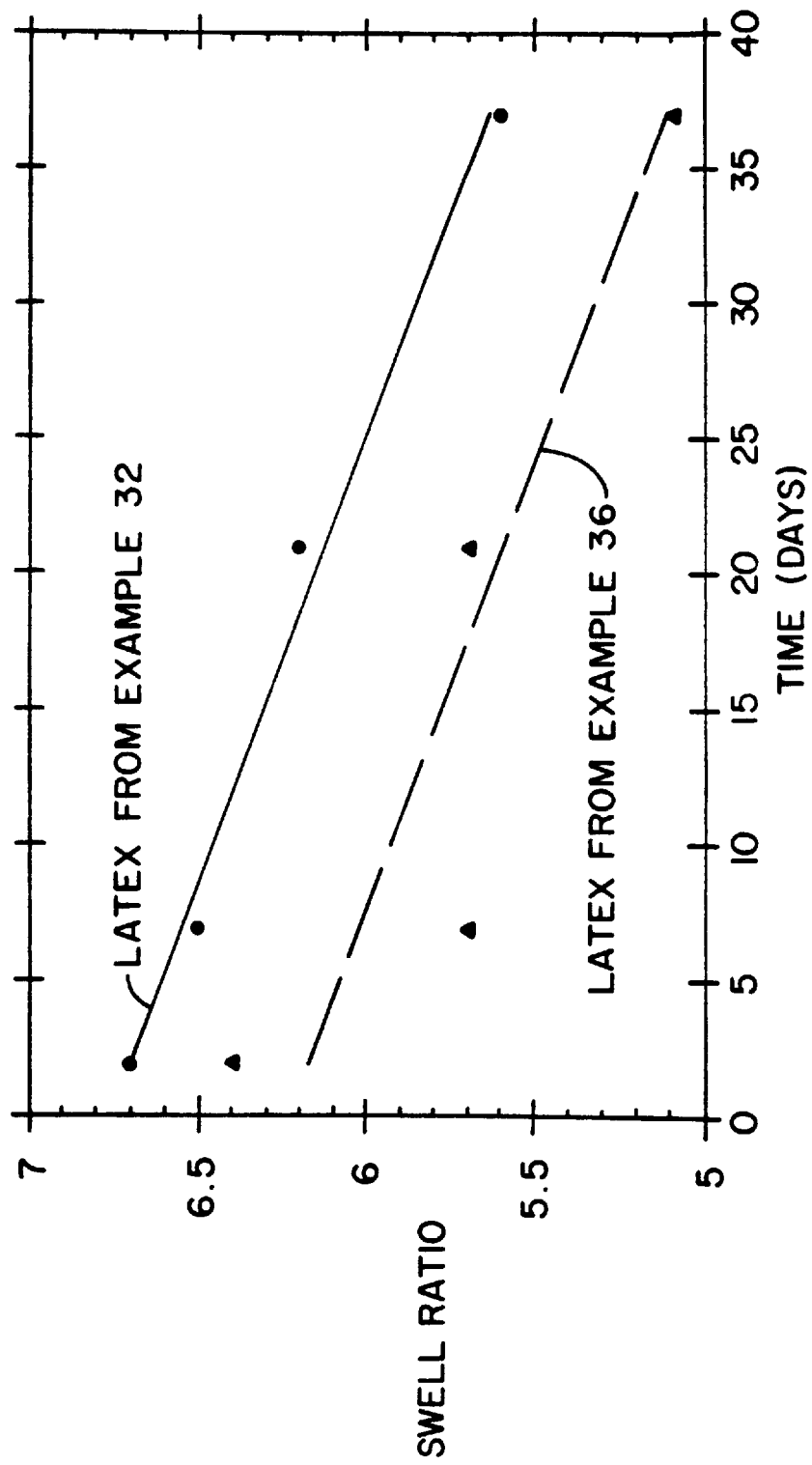
FIG. 5 is a plot of swell ratio of allyl functional latexes versus cure time at 23° C. and 50% relative humidity in days.

Examples 29 through 45 show a series of core/shell latexes where the cores were crosslinked during synthesis with trimethylolpropane triacrylate at levels 0.2 to 0.46 percent based on core weight, and the shells containing varying levels of allyl methacrylate, t-butyl methacrylate, and 2-ethylhexyl 3-mercaptopropionate. Table 6a shows the compositions (based on particle weight) of the various latexes prepared in this experiment. The data show that when one mil dried films of these latexes were cured at room temperature that the swell ratio of 13 of the 16 latexes decreased with time. The change in swell ratio per day was obtained by measuring the decrease in swell ratio over 37 days then obtaining the slope of these plots to determine the swell ratio change per day. FIG. 5 shows the swell ratio of clear latex films prepared from Examples 32 and 36 as a function of time at room temperature. The swell ratio is shown to decrease linearly with time. A decrease in swell ratio of −0.031 per day was obtained for both films which show that the crosslink density of these films increase as the films aged. This result indicates crosslinking within the films.

Figure 6:
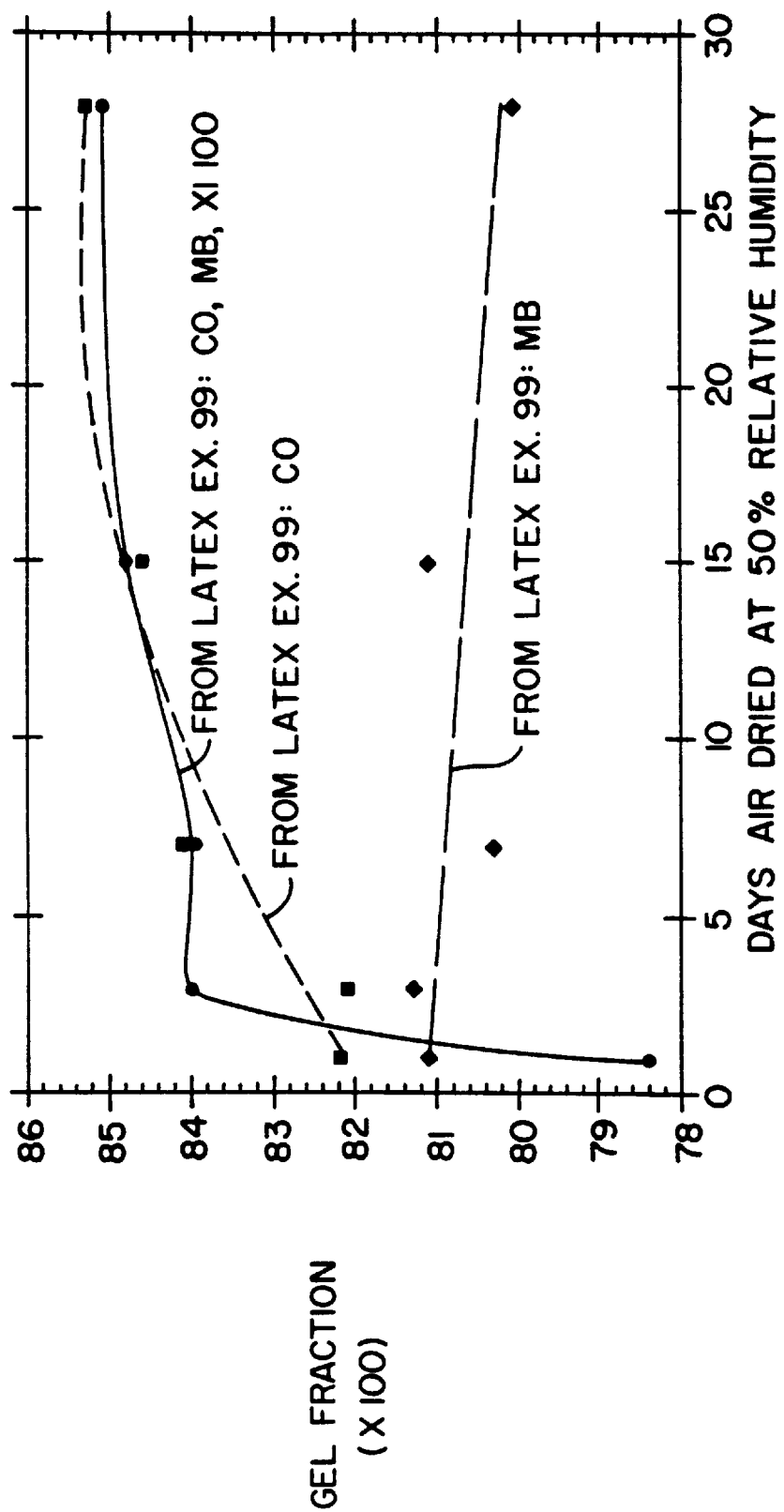
FIG. 6 is a plot of gel fraction (×100) versus cure time at 23° C. and 50% relative humidity in days.
Figure 7:
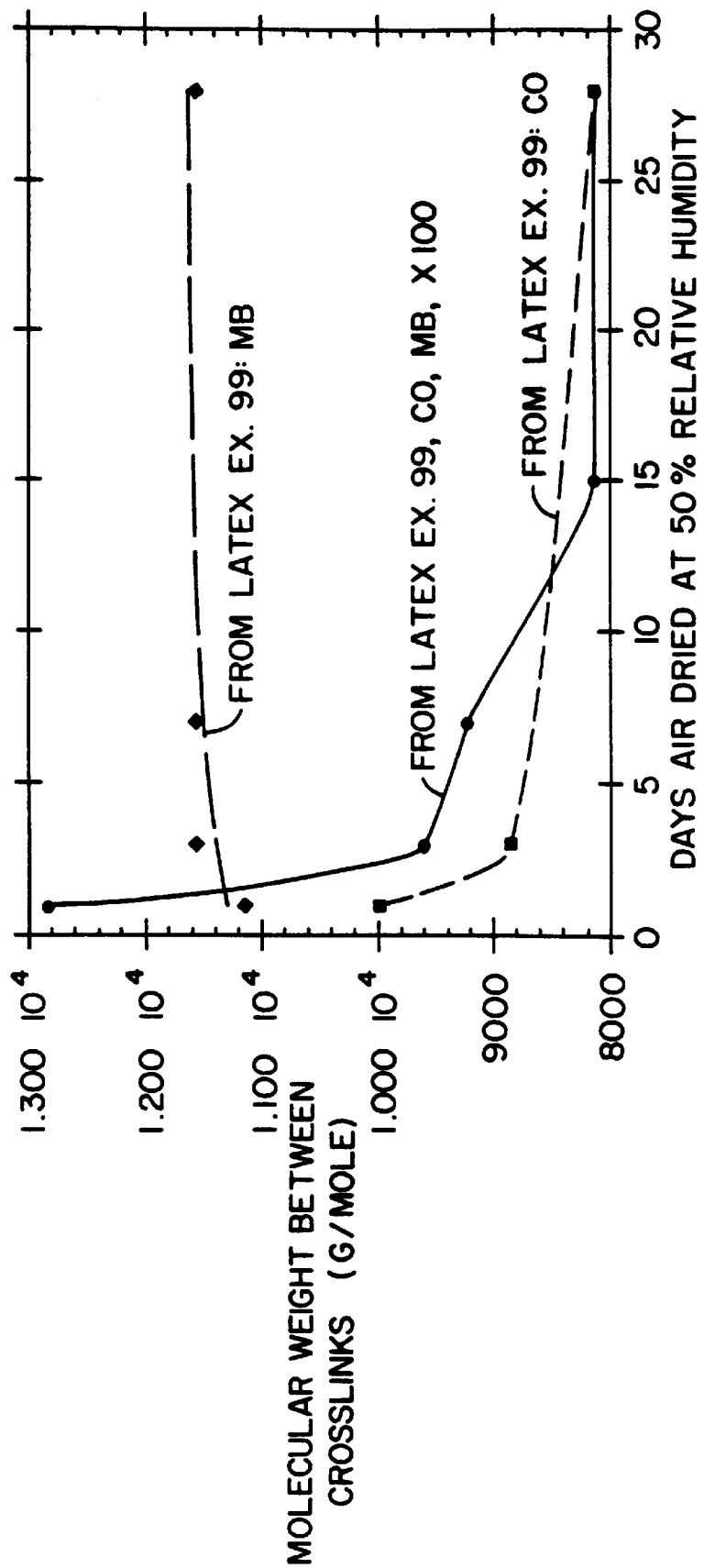
FIG. 7 is a plot of molecular weight between crosslinks in g/mole versus cure time at 23° C. and 50% relative humidity in days.

FIGS. 6 and 7 show the crosslinking of clear films prepared from Example 99. Three examples are presented: a clear film using a cobalt drier, methylene blue, and MONSANTOLINK XI-100 as activating agents for crosslinking; a clear film prepared from using methylene blue as catalyst; and a clear film using a cobalt drier as the catalyst. As shown in FIGS. 6 and 7, the cobalt drier or a combination of cobalt drier, methylene blue, and MONSANTOLINK XI-100 are very effective in increasing the films gel fraction and decreasing the molecular weight between crosslink points of clear films as they cure at room temperature. In addition, the use of a cobalt drier is also effective. The use of methylene blue by itself was found not to be effective in promoting crosslinking in the clear films prepared from Example 99. The details are shown in Example 114.

As shown in Example 115 (Table 20), selected latexes were formulated, then clear films cast over aluminum panels. The dry film thickness of the films was 2 mil. The data show that methyl ethyl ketone resistance can be obtained for clear films when cured under ambient or thermal conditions. Solvent resistance was obtained at temperatures as low as 110° C. when selected samples were cured for 30 minutes, or at room temperature when cured for as few as 5 days.

The range of weight percent of monomers used in Examples 29 through 105, and 109 are shown in the Table below:

or more) with large amounts of cosolvents in the coating. Then, at application, the coating resin is, in effect, temporarily plasticized by the cosolvent and will film at ambient temperatures to form a continuous film. Upon drying, however, the cosolvent escapes to the environment, and the coating becomes harder, resulting in improved block and print resistance. Examples 116 and 119 describe the preparation of two grinds, one for a low volatile organic compound (low V.O.C.–below 200 g/L) architectural semigloss paint and the other for a zero volatile organic compound (zero V.O.C.) paint, respectively. Examples 117 and 120 demonstrate the use of the two grinds to prepare low V.O.C. and zero V.O.C. semigloss architectural coatings from emulsions from examples 47, 48, 62, 73, 76, 80, 81, 82, 83, 92, 93, and 94 while Examples 118 and 121 detail the development of blocking and print resistance in the coatings from examples 117 and 120. The data demonstrates that semigloss coatings prepared from emulsions with Tg's of 15° C. and no allyl methacrylate (see emulsion example 92) do not achieve early blocking resistance nor appreciable print resistance whereas such semigloss coatings with the benefits of allyl methacrylate ambient curing can develop these properties to various extents.

Allyl group-containing latexes can be formulated in a number of ways. Reactive plasticizers such as diethylene glycol dimethacrylate, pentaerythritol triacrylate, pentaerythritol crtraacrylate, trimethylolpropane triacrylate, divinyl adipate, or diisopropenyl adipate can be used. Other examples can be found in U.S. Pat. No. 5,371,148, incorporated herein by reference. Further, reactive coalescents such as the acetoacetates and enamines thereof as disclosed in U.S. Pat. No. 5,349,026, incorporated herein by reference, can be utilized. Nonreactive filming aids such as alcohols, hydroxyethers, esters, ester of lactic acid or ketones could also be used. The above plasticizers could also be used in combination with hydrocarbon solvents or super critical carbon dioxide. Polymers functionalized using the above technology can be applied to a substrate directly from water,

| Monomers | Weight Percent of Monomer Based on Monomer in the Shell | Weight Percent of Monomer Based on Monomer in the Core | Weight Percent of Monomer Based on Monomer in the Latex |
|---|---|---|---|
| Trimethylolpropane triacrylate | 0.00 | 0.15–0.46 | 0.10–0.30 |
| 2-ethylhexyl 3-mercapto-propionate | 0.72–0.86 | 0.00 | 0.25–3.0 |
| Allyl Methacrylate | 5.8–23 | 0.00 | 2–8 |
| Styrene | 24–49 | 4.4–17.3 | 0–45 |
| Butyl Acrylate | 23–38 | 52 | 42–48 |
| 2-Ethylhexyl acrylate | 30–38 | 44–66 | 40–56 |
| t-Butylaminoethyl methacrylate | 5.8–23 | 0.00 | 2–8 |
| Dimethylaminoethyl methacrylate | 0–4.9 | 0.00 | 0–1.7 |
| Acetoacetoxyethyl methacrylate | 0–5.6 | 0.00 | 0–2 |
| Methyl methacrylate | 14–43 | 30–43 | 21–28 |

In the latexes discussed above, the shell was approximately 40 weight percent of the particle.

The use of other monomers such as butyl methacrylate and isobornyl methacrylate is demonstrated in the composition of allyl group-containing waterborne particles prepared in Examples 106 and 107.

It is desirable in the coatings industry to reduce or eliminate the volatile organic compounds (V.O.C.'s) given off during and after coating an object. However, in order to achieve blocking and print resistance properties in semigloss and glossy coatings, it is common to formulate a high Tg waterborne resin (Tg's are typically usually 20° C. to 35° C.

or if desirable, they can be isolated as dry polymers. Applications include (but are not limited to) coatings for metal, paper, plastic, wood, inks, and textiles.

EXPERIMENTAL SECTION

Materials

AEROSOL-OT, sodium dioctyl sulfosuccinate, is an anionic surfactant sold by Cytec Industries, Inc.

AEROSOL 18, N-octadecyl sulfosuccinamate, is an anionic surfactant sold by Cytec Industries, Inc.

TERGITOL NP-40 (70% in water) is a nonylphenol-based nonionic surfactant sold by Union Carbide Corporation.

Hydroxybutenyl Methacrylate is the mixture of isomers obtained from reaction of 1,2-epoxy-3-butene and methacrylic acid.

TREM LF-40 (40% solids) is sodium dodecylallyl sulfosuccinate, an anionic reactive surfactant solid by Henkel.

Hydrosulfite AWC (100% solids) is sodium formaldehyde sulfoxylate, a reducing agent sold by Henkel.

HITENOL HS-20, (100%) is a polyoxyethylene alkylphenyl ether ammonium sulfate, a reactive surfactant sold by DKS, International, Inc., Japan.

MAZON SAM-185 is a copolymerizable surfactant sold by PPG Industries, Inc., Chemicals Group.

2-Acrylamido-2-methylpropanesulfonate, sodium salt (AMPS, 50% solids in water) sold by Lubrizol Corp., Wichleffed, Ohio 44092

Allyl methacrylate, t-butylaminoethyl methacrylate, dimethylaminoethyl methacrylate were purchased from ROHM TECH INC., 195 Canal St., Malden, Mass. 02148

Methyl methacrylate, styrene, n-butyl acrylate, 2-ethylhexyl acrylate, sodium persulfate, sodium metabisulfite, isoascorbic acid, and t-butylhydroperoxide were purchased from Aldrich Corp.

Trimethylolpropane triacrylate, a tri-functional acrylate was purchased from Polysciences.

Pentaeryrithritol triacrylate and pentaerythritol tetraacrylate were purchased from Polysciences Acetoacetoxyethyl Methacrylate (AAEM) is a monomer sold by Eastman Chemical Company.

2-Ethylhexyl 3-mercaptopropionate, a mercaptan chain transfer agent was purchased from Phillips Petroleum Company.

MONSANTOLINK XI-100, a poly(allyl glycidyl ether), is a reactive peroxide-forming macromonomer sold by Monsanto.

AQUACAT (Alkylaryl ethoxylate of Cobalt; 5% active cobalt metal, 72% Solids), ULTRA additives, Inc., 460 Straight St., Paterson, N.J. 07501.

HYDROCURE II (Cobalt neodecanoate, 45% solids), Mooney Chemical, Inc, 2301 Scranton Rd, Cleveland, Ohio 44113

FC-430 (Fluro surfactant, 98.5% solids), 3M Center, St. Paul, Minn. 55144–1000

SURFYNOL 104 and 104DPM (50% Solids), Air Products and Chemicals, Inc., 7201 Hamilton Boulevard, Allentown, Pa. 18195–1501.

Propylene Glycol and TEXANOL ester alcohol are sold by Eastman Chemical Company.

TAMOL 1124 is a dispersant sold by Rohm & Haas.

RHOPLEX ML-200 is an acrylic latex sold by Rohm & Haas Company.

RM-5 is a rheology modifier (thickener) sold by Rohm & Haas Company.

FOAMASTER AP is a defoamer sold by Henkel.

TI-PURE R-900 is Titanium Dioxide sold by DuPont.

BURGESS #98 is a fine particle size clay sold by Burgess Pigment.

TIOXIDE R-HD6X is Titanium Dioxide sold by Tioxide.

TRITON CF-10 is a surfactant sold by Union Carbide.

FOAMASTER AP and FOAMASTER VF are defoamers sold by Henkel.

Ethylene Glycol is an antifreeze agent purchased from Aldrich.

CELLOSIZE 4400H is a rheology modifier sold by Union Carbide.

Testing Procedures

MFFT resist

Resistant minimum film forming temperature (MFFT resist) is determined by casting a wet latex film with a 4-mil applicator cube on an MFFT bar set at a temperature range in which the film will coalesce during drying, pulling the edge of a brass spatula blade through the film from cold to hot end on the MFFT bar after 30 minutes, and recording the temperature at which the blade offers significant resistance to the experimenter.

Film Gel Fraction (FGF) and Film Swell Ratio (FSR)

Film gel fractions (FGF) were obtained by determining the insoluble weight fraction of polymer in a dry film sample. Film swell ratio (FSR) were obtained by determining the ratio of the insoluble polymer weight fraction swollen in the selected solvent (by weight) to dry weight of the insoluble weight fraction in a dry film sample. Average values were determined from quadruplicate measurements. The solvent used was acetone.

The procedure used is as follows: for each sample determination, a 4"×4"325-mesh steel screen and a metal weighing boat are baked in the vacuum oven at 120° C. for 90 minutes, cooled for 30 minutes over $P_2O_5$ and weighed (W1 and W2, respectively). After the latex film is dried and kept for the required number of days under constant temperature and humidity, a piece of the film is cut, weighed (W3), placed in the aluminum pan, and put aside. Another film sample is cut, weighed (W4), and placed in a screw cap jar with excess solvent on a shaker bath for 16 hours at constant temperature. The film gel is recovered by pouring the solution plus wet solids from the jar through the screen and weighing the screen plus retained wet solids (W5). At this point, the screen plus solids and the film sample are dried in the aluminum boat in a forced air oven overnight, then a vacuum oven at 80° C. for 3 hours and cooled for 30 minutes in a dessicator over $P_2O_5$. The samples are weighed and the vacuum oven portion of the baking procedure repeated until reproducible weights were obtained for the screen plus dry solids (W6) and the film sample in the aluminum boat (W7). Calculations are shown below:

$$FGF=(W6-W1)/[(W4)*[(W7-W2)/W3]]$$

$$FSR=(W5-W1)/(W6-W1)$$

Emulsion shape factor

Transmission electron micrographs of emulsion particles prepared with the shell preferentially stained over the core are evaluated for shape of the particle and appearance of the shell at the particle surface. A round shape with uniform coverage of the shell is rated a 1 while all other shapes and morphologies are rated a 0.

Constant Temperature and Humidity Room

Films were prepared and film measurements were conducted at ASTM standard conditions for laboratory testing of 73.5°±3.5° F. (23°±2° C.) and 50±5% relative humidity.

Paint Viscosity

Paint viscosity (in KU units) was measured after 24 hours using a Krebs-Stormer viscometer.

Gloss

Gloss was measured on 6 mil (wet) thick films cast on Leneta 2B opacity paper after 24 hours using a micro-tri-glossmeter by BYK-Gardner according to ASTM method D 523 Test Method for Specular Gloss.

Blocking Resistance

Blocking resistance was determined using 6 mil (wet) films on Leneta 2B opacity paper according to ASTM 4946 Test Method for Blocking Resistance of Architectural Paints using 1 psi pressure after film dried to designated times. The tests were numerically rated where a rating of 1 represents 100% pass where painted surfaces lift apart with no noise, a rating of 2 represents noise when painted surfaces are separated but no film degradation occurs, a rating of 3 represents some destruction of the painted surfaces when the two surfaces are separated and a rating of 4 represents 100% fail where the painted surfaces flow completely together and complete destruction of the films occurs upon separation.

Print Resistance

Print resistance was determined using 6 mil (wet) films on Leneta 2B opacity paper according to ASTM D 2064-91 Test Method for Print Resistance of Architectural Paints using a 4 pound weight placed on top of a #9 black rubber stopper which was placed on four layers of cheesecloth after film dried to designated times. The tests were numerically rated where a rating of 1 represents 100% pass with no demarcation (cloth lifts off with no print left behind), a rating of 2 represents demarcations (some impression is observed), a rating of 3 represents 100% fail (the cheesecloth impregnates the film).

Methyl Ethyl Ketone Resistance

Films were constantly soaked with methyl ethyl ketone. Data was obtained using a crockmeter with a 1 kg weight placed on the arm for a total weight of approximately 1500 g. The test ended when the break-through of the film on the panel was first observed. Data were reported as double rubs (one set of back and forth). All data are an average of three results.

EXAMPLE 1
Preparation of a Standard Polymer for Calibration the amount of Allyl Moieties attached to an Acrylic Polymer

PROCEDURE 1

To a 1000 mL resin kettle equipped with a condenser, nitrogen purge, and subsurface feed tube were added 229 g of water, 0.372 g of TREM LF-40, 0.12 g of SAM 185, 12.58 g of methyl methacrylate, 2.88 g of styrene, 17.2 g of butyl acrylate, 0.125 g of 2-ethylhexyl 3-mercaptopropionate, 0.12 g of TERGITOL NP-40(100%), and 2.05 g of sodium carbonate. A nitrogen purge was begun, then the contents of the reactor brought up to 80° C. at 400 rpm. After reaching 80° C., an initiator solution charge composed of 2.3 g of sodium persulfate dissolved in 13 g of water were added to the reactor. An emulsion feed composed of 115 g of water, 1.43 g of TREM LF-40, 47.28 g of methyl methacrylate, 47.72 g of styrene, 105.62 g of n-butyl acrylate, and 0.770 g of 2-ethylhexyl 3-mercaptopropionate was fed into the reactor at 2.5 g/min. Five minutes after the first emulsion feed was begun, an initiator charge composed of 1.3 g dissolved in 33.5 g of water was fed into the reactor at 0.16 g/min. After the first emulsion feed was completed, a second feed composed of 4.03 g of AEROSOL OT-75, 21.0 g of methyl methacrylate, 62.4 g of n-butyl acrylate, 7.16 g of t-butylaminoethyl methacrylate, and 3.29 g of 2-ethylhexyl 3-mercaptopropionate, and 0.5 g of AMPS was fed at the same rate. Five minutes after the last feed, a post catalyst solution of 0.4 g of sodium persulfate, and 0.4 g of sodium metabisulfite dissolved in 12 g of water were charged and heating continued for 30 minutes. The emulsion was cooled then filtered through a 100 mesh wire screen. Solids, 46.4%, amount of dried solids were collected, 1.44 g (100 mesh screen).

EXAMPLE 2
FT-IR Analytical Method

PROCEDURE 2

A sample of the above polymer from Example 1 was air dried for three days then vacuum dried to remove residual water. A series of polymer solutions were prepared by dissolving 3.7 g of the dried polymer in 40 g of methylene chloride. To each polymer solution was added a controlled amount of allyl acetate. A spectrum of each solution was obtained via transmission fourier-transform infrared spectroscopy (0.1 mm liquid cell). The ratio of the allyl absorbance at 1649 cm$^{-1}$ to styrene absorbance at 1601 cm$^{-1}$ was obtained as a function of allyl acetate concentration. The moles of allyl acetate added to each polymer solution was then converted to the equivalent moles of allyl methacrylate. A plot of the allyl absorbance divided by the styrene absorbance as function of the phr (grams of allyl methacrylate per 100 grams of resin) was then constructed. This plot is shown in FIG. 1. The total amount of styrene in the polymer was 20 weight percent.

EXAMPLES 3 through 22

Preparation of Waterborne Allyl Methacrylate-Containing Core/Shell Particles to Show the Effect of Shell Composition on the Survival of the Allyl Moiety from Allyl Methacrylate during Emulsion Polymerization

PROCEDURE 3

To a 1000 mL resin kettle equipped with a condenser, nitrogen purge, and subsurface feed tube were added 220 g of water, 0.372 g of TREM LF-40, 0.12 g of SAM 185, monomer charge, 0.12 g of TERGITOL NP-40(100%), 2.04 g of sodium carbonate, and monomers for the reactor charge described in the tables below. A nitrogen purge was begun, then the contents of the reactor brought up to 80° C. at 400 rpm. After reaching 80° C., an initiator solution charge composed of 2.3 g of sodium persulfate dissolved in 13 g of water were added to the reactor. An emulsion feed composed of 85 g of water, 1.43 g of TREM LF-40, and monomers was fed into the reactor at 2.5 g/min. Five minutes after the first emulsion feed was begun, an initiator charge composed of 1.3 g of sodium persulfate dissolved in 33.5 g of water was fed in at 0.16 g/min. After the first emulsion feed was completed, a second emulsion feed composed of 60 g of water, 4.03 g of AEROSOL 18, 1.174 g of TERGITOL NP-40 (100%), and monomers was fed at the same rate. Five minutes after the last feed, a post catalyst solution prepared from 0.4 g of sodium persulfate, and 0.4 g of sodium metabisulfite dissolved in 12 g of water were charged and heating continued for 30 minutes. The emulsion was cooled, then filtered through 100 mesh wire screen. The solids level, amount of dried material (collected through a 100 mesh screen), and particle size were determined. The composition for each latex, and their characterization is shown in the Tables 1 through 4. Plots which show the survival of allyl groups as a function of shell composition are shown in FIG. 2.

TABLE 1

|  | Mass(g) Ex. 3 | Mass(g) Ex. 4 | Mass(g) Ex. 5 | Mass(g) Ex. 6 | Mass(g) Ex. 7 |
| --- | --- | --- | --- | --- | --- |
| Monomers in Reactor Charge |  |  |  |  |  |
| Methyl Methacrylate | 2.45 | 5.11 | 7.77 | 10.43 | 12.25 |
| Styrene | 10.02 | 7.36 | 4.70 | 2.04 | 0.02 |
| n-Butyl Acrylate | 20.05 | 20.05 | 20.05 | 20.05 | 20.05 |
| Trimethylolpropane Triacrylate | 0.10 | 0.10 | 0.10 | 0.10 | 0.10 |

TABLE 1-continued

|  | Mass(g) Ex. 3 | Mass(g) Ex. 4 | Mass(g) Ex. 5 | Mass(g) Ex. 6 | Mass(g) Ex. 7 |
|---|---|---|---|---|---|
| Monomers in Feed 1 |  |  |  |  |  |
| Methyl Methacrylate | 15.07 | 31.41 | 47.75 | 64.09 | 75.27 |
| Styrene | 61.58 | 45.24 | 28.90 | 12.56 | 1.38 |
| n-Butyl Acrylate | 123.15 | 123.15 | 123.15 | 123.15 | 123.15 |
| Trimethylolpropane Triacrylate | 0.62 | 0.62 | 0.62 | 0.62 | 0.62 |
| Monomers in Feed 2 |  |  |  |  |  |
| Methyl Methacrylate | 102.59 | 83.59 | 64.59 | 45.59 | 32.59 |
| Styrene | 0.00 | 19.00 | 38.00 | 57.00 | 70.00 |
| n-Butyl Acrylate | 0.00 | 0.00 | 0.00 | 0.00 | 0.00 |
| Allyl Methacrylate | 21.48 | 21.48 | 21.48 | 21.48 | 21.48 |
| t-Butylaminoethyl Methacrylate | 0.00 | 0.00 | 0.00 | 0.00 | 0.00 |
| 2-Ethylhexyl 3-Mercapto-propionate | 0.90 | 0.90 | 0.90 | 0.90 | 0.90 |
| AMPS | 0.50 | 0.50 | 0.50 | 0.50 | 0.50 |
| Weight Percent Styrene in Shell | 0 | 15 | 31 | 46 | 56 |
| Solids of Latex | 46.9 | 45.3 | 47.8 | 47.2 | 47.5 |
| Dried Solids Collected (100 mesh) | 1.84 | 0.27 | 0.45 | 0.67 | 0.30 |
| Particle Size (nm) | 265 | 259 | 214 | 212 | 237 |

TABLE 2

|  | Mass(g) Ex. 8 | Mass(g) Ex. 9 | Mass(g) Ex. 10 | Mass(g) Ex. 11 |
|---|---|---|---|---|
| Monomers in Reactor Charge |  |  |  |  |
| 2-Ethylhexyl Acrylate | 5.95 | 9.45 | 12.81 | 16.17 |
| Methyl Methacrylate | 16.55 | 13.05 | 9.69 | 6.33 |
| Styrene | 10.02 | 10.2 | 10.02 | 10.02 |
| Trimethylolpropane Triacrylate | 0.10 | 0.10 | 0.10 | 0.10 |
| Monomers in Feed 1 |  |  |  |  |
| 2-Ethylhexyl Acrylate | 36.57 | 58.07 | 78.71 | 99.35 |
| Methyl Methacrylate | 101.65 | 80.15 | 59.51 | 38.87 |
| Styrene | 61.58 | 61.58 | 61.58 | 61.58 |
| Trimethylolpropane Triacrylate | 0.62 | 0.62 | 0.62 | 0.62 |
| Monomers in Feed 2 |  |  |  |  |
| 2-Ethylhexyl Acrylate | 77.59 | 52.59 | 28.59 | 4.59 |
| Methyl Methacrylate | 25.00 | 50.00 | 74.00 | 98.00 |
| Styrene | 0.00 | 0.00 | 0.00 | 0.00 |
| Allyl Methacrylate | 21.48 | 21.48 | 21.48 | 21.48 |
| t-Butylaminoethyl Methacrylate | 0.00 | 0.00 | 0.00 | 0.00 |
| 2-Ethylhexyl 3-Mercapto-propionate | 0.90 | 0.90 | 0.90 | 0.90 |
| AMPS | 0.50 | 0.50 | 0.50 | 0.50 |
| Weight Percent Methyl Methacrylate in Shell | 20 | 40 | 60 | 79 |
| Solids of Latex | 47.6 | 47.7 | 47.3 | 47.9 |
| Dried Solids Collected (100 mesh) | 0.56 | 0.57 | 0.27 | 3.57 |
| Particle Size (nm) | 245 | 280 | 247 | 270 |

TABLE 3

|  | Mass(g) Ex. 13 | Mass(g) Ex. 14 | Mass(g) Ex. 15 | Mass(g) Ex. 16 | Mass(g) Ex. 17 |
|---|---|---|---|---|---|
| Monomers in Reactor Charge |  |  |  |  |  |
| 2-Ethylhexyl Acrylate | 2.45 | 5.11 | 7.77 | 10.43 | 12.25 |
| Styrene | 10.02 | 7.36 | 4.70 | 2.04 | 0.22 |
| Methyl Methacrylate | 20.05 | 20.05 | 20.05 | 20.05 | 20.05 |
| Trimethylolpropane Triacrylate | 0.10 | 0.10 | 0.10 | 0.10 | 0.10 |
| Monomers in Feed 1 |  |  |  |  |  |
| 2-Ethylhexyl Acrylate | 15.07 | 31.41 | 47.75 | 64.09 | 75.27 |
| Styrene | 61.58 | 45.24 | 28.90 | 12.56 | 1.38 |
| Methyl Methacrylate | 123.15 | 123.15 | 123.15 | 123.15 | 123.15 |
| Trimethylolpropane Triacrylate | 0.62 | 0.62 | 0.62 | 0.62 | 0.62 |
| Monomers in Feed 2 |  |  |  |  |  |
| 2-Ethylhexyl Acrylate | 102.59 | 83.59 | 64.59 | 45.59 | 32.59 |
| Styrene | 0.00 | 19.00 | 38.00 | 57.00 | 70.00 |
| Methyl Methacrylate | 0.00 | 0.00 | 0.00 | 0.00 | 0.00 |
| Allyl Methacrylate | 21.48 | 21.48 | 21.48 | 21.48 | 21.48 |
| t-Butylaminoethyl Methacrylate | 0.00 | 0.00 | 0.00 | 0.00 | 0.00 |
| 2-Ethylhexyl 3-Mercapto-propionate | 0.90 | 0.90 | 0.90 | 0.90 | 0.90 |
| AMPS | 0.50 | 0.50 | 0.50 | 0.50 | 0.50 |
| Weight Percent Styrene in Shell | 0.00 | 15 | 31 | 46 | 56 |
| Solids of Latex | 47.0 | 47.1 | 46.2 | 48.5 | 47.3 |
| Dried Solids Collected (100 mesh) | 8.51 | 4.66 | 0.29 | 1.28 | 3.36 |
| Particle Size (nm) | 311 | 323 | 267 | 260 | 236 |

TABLE 4

|  | Mass(g) Ex. 18 | Mass(g) Ex. 19 | Mass(g) Ex. 20 | Mass(g) Ex. 21 | Mass(g) Ex. 22 |
|---|---|---|---|---|---|
| Monomers in Reactor Charge |  |  |  |  |  |
| n-Butyl Acrylate | 2.45 | 5.11 | 7.77 | 10.43 | 12.25 |
| Styrene | 10.02 | 7.36 | 4.70 | 2.04 | 0.22 |
| Methyl Methacrylate | 20.05 | 20.05 | 20.05 | 20.05 | 20.05 |
| Trimethylolpropane triacrylate | 0.10 | 0.10 | 0.10 | 0.10 | 0.10 |
| Monomers in Feed 1 |  |  |  |  |  |
| n-Butyl Acrylate | 15.07 | 31.41 | 47.75 | 64.09 | 75.27 |
| Styrene | 61.58 | 45.24 | 28.90 | 12.56 | 1.38 |
| Methyl Methacrylate | 123.15 | 123.15 | 123.15 | 123.15 | 123.15 |
| Trimethylolpropane Triacrylate | 0.62 | 0.62 | 0.62 | 0.62 | 0.62 |
| Monomers in Feed 2 |  |  |  |  |  |
| n-Butyl Acrylate | 1.2.59 | 83.59 | 64.59 | 45.59 | 32.59 |
| Styrene | 0.00 | 19.00 | 38.00 | 57.00 | 70.00 |
| Methyl Methacrylate | 0.00 | 0.00 | 0.00 | 0.00 | 0.00 |
| Allyl Methacrylate | 21.48 | 21.48 | 21.48 | 21.48 | 21.48 |
| t-Butylaminoethyl Methacrylate | 0.00 | 0.00 | 0.00 | 0.00 | 0.00 |
| 2-Ethylhexyl 3-Mercapto-propionate | 0.90 | 0.90 | 0.90 | 0.90 | 0.90 |
| AMPS | 0.50 | 0.50 | 0.50 | 0.50 | 0.50 |
| Weight Percent Styrene in Shell | 0.00 | 15 | 31 | 46 | 56 |
| Percent Solids of Latex | 47.5 | 47.6 | 47.6 | 48.5 | 47.3 |
| Dried Solids Collected (100 mesh) | 0.97 | 0.35 | 1.05 | 0.68 | 0.82 |
| Particle Size (nm) | 281 | 289 | 329 | 341 | 360 |

EXAMPLES 23 through 28
Preparation of Waterborne Allyl Methacrylate-t-Butylaminoethyl Methacrylate-Containing Polymers

PROCEDURE 4

To a 1000 mL resin kettle equipped with a condenser, nitrogen purge, and subsurface feed tube were added 229 g of water, 0.372 g of TREM LF-40, 0.12 g of SAM 185, monomer charge, 0.13 g of TERGITOL NP-40(100%), 2.04 g of sodium carbonate, and monomers for the reactor charge described in the tables below.

A nitrogen purge was begun, then the contents of the reactor brought up to 80° C. at 400 rpm. After reaching 80° C., an initiator charge composed of 2.3 g of sodium persulfate dissolved in 13 g of water were added to the reactor. An emulsion feed composed of 115 g of water, 1.43 g of TREM LF-40, and monomers was fed into reactor at 2.5 g/min. Five minutes after the first emulsion feed was begun, an initiator solution composed of 1.3 g of sodium persulfate dissolved in 33.5 g of water was fed in at 0.16 g/min. After the first emulsion feed was completed, a second feed composed of 4.03 g of AEROSOL OT-75, and monomers was fed into the reactor at the same rate. Five minutes after the last feed, a post catalyst solution of 0.4 g of sodium persulfate, and 0.4 g of sodium metabisulfite dissolved in 12 g of water were charged and heating continued for 30 minutes. The emulsion was cooled, then filtered through 100 mesh wire screen. The solids level, amount of dried material (collected through a 100 mesh screen), and particle size were determined. The composition for each latex, and their characterization is shown in the Table 5.

of water, 0.372 g of TREM LF-40, 0.12 g of SAM 185, monomer charge, 0.13 g of TERGITOL NP-40(100%), 2.04 g of sodium carbonate, and monomers for the reactor charge described in the tables below. A nitrogen purge was begun, then the contents of the reactor brought up to 80° C. at 400 rpm. After reaching 80° C., an initiator charge composed of 2.3 g of sodium persulfate dissolved in 13 g of water were added to the reactor. An emulsion feed composed of 115 g of water, 1.43 g of TREM LF-40, and monomers was begun. Five minutes after the first emulsion feed was begun, an initiator solution composed of 1.3 g of sodium persulfate dissolved in 33.5 g of water was fed in at 0.16 g/min. After the first emulsion feed was completed, a second feed composed of 4.03 g of AEROSOL OT-75, and monomers was fed into the reactor at the same rate. Five minutes after the last feed, a post catalyst solution of 0.4 g of sodium persulfate, and 0.4 g of sodium metabisulfite dissolved in 12 g of water were charge an heating continued for 30 minutes. The emulsion was cooled than filtered through 100 mesh wire screen. The solids level, amount of dried material (100 mesh screen), particle size, viscosity (Brookfield, LVT #1 spindle, 60 rpm), and pH were determined. The experimental details (Table 6a) and composition for each latex (Table 6b through 8)as well as their characterization are shown below:

TABLE 5

|  | Mass(g) Ex. 23 | Mass(g) Ex. 24 | Mass(g) EX. 25 | Mass(g) Ex. 26 | Mass(g) Ex. 27 | Mass(g) Ex. 28 |
|---|---|---|---|---|---|---|
| Monomers in Reactor Charge |  |  |  |  |  |  |
| Methyl Methacrylate | 12.58 | 12.58 | 12.58 | 12.58 | 12.58 | 12.58 |
| Styrene | 2.89 | 2.89 | 2.89 | 2.89 | 2.89 | 2.89 |
| n-Butyl Acrylate | 17.2 | 17.2 | 17.2 | 17.2 | 17.2 | 17.2 |
| Trimethylolpropane Triacrylate | 0.12 | 0.12 | 0.12 | 0.12 | 0.12 | 0.12 |
| Monomers in Feed 1 |  |  |  |  |  |  |
| Methyl Methacrylate | 26.3 | 37.28 | 47.28 | 62.27 | 77.28 | 77.28 |
| Styrene | 68.7 | 57.72 | 47.72 | 32.72 | 17.72 | 0.00 |
| n-Butyl Acrylate | 105.62 | 105.62 | 105.62 | 105.62 | 105.62 | 123.34 |
| Trimethylolpropane Triacrylate | 0.77 | 0.77 | 0.77 | 0.77 | 0.77 | 0.77 |
| Monomers in Feed 2 |  |  |  |  |  |  |
| Methyl Methacrylate | 51.00 | 40.00 | 20.99 | 15.00 | 0.00 | 0.00 |
| Styrene | 0.00 | 11.00 | 20.99 | 35.99 | 51.00 | 68.72 |
| n-Butyl Acrylate | 40.00 | 40.00 | 40.00 | 40.00 | 40.00 | 22.28 |
| Allyl Methacrylate | 21.48 | 21.48 | 21.48 | 21.48 | 21.48 | 21.48 |
| t-Butylaminoethyl Methacrylate | 7.16 | 7.16 | 7.16 | 7.16 | 7.16 | 7.16 |
| 2-Ethylhexyl 3-Mercaptopropionate | 4.19 | 4.19 | 4.19 | 4.19 | 4.19 | 4.19 |
| AMPS | 0.50 | 0.50 | 0.50 | 0.50 | 0.50 | 0.50 |
| Weight Percent Styrene in Shell | 0.00 | 8.8 | 17 | 29 | 40 | 55 |
| Percent Solids of Latex | 46.1 | 47.4 | 47.4 | 46.5 | 45.2 | 47.0 |
| Dried Solids Collected (100 mesh) | 21 | 5.7 | 3.77 | 0.63 | 1.96 | 3.79 |

Films were cast over zinc selenide and transmission infrared spectra of dried films were obtained from each latex were obtained as described in the analytical procedure. Comparison plots (in FIG. 3) show that adding t-butylaminoethyl methacrylate to the second emulsion feed results in improved survival of the allyl moiety from allyl methacrylate during emulsion polymerization.

EXAMPLES 29–45
Preparation of Waterborne Allyl Methacrylate, t-Butylaminoethyl Methacrylate-Containing Polymers

PROCEDURE 5

To a 1000 mL resin kettle equipped with a condenser, nitrogen purge, and subsurface feed tube were added 229 g TABLE 6a

| Example Number | Percent ALMA | Percent t-BAMA | Percent TMPTA | Percent Mercaptan | Percent Carbonate |
|---|---|---|---|---|---|
| Example 29 | 2 | 2 | 0.15 | 0.25 | 0.55 |
| Example 30 | 4 | 2 | 0.2 | 2.08 | 0.7 |
| Example 31 | 6 | 2 | 0.25 | 3 | 0.6 |
| Example 32 | 8 | 2 | 0.3 | 1.17 | 0.65 |
| Example 33 | 2 | 4 | 0.2 | 1.17 | 0.6 |
| Example 34 | 4 | 4 | 0.15 | 3 | 0.65 |
| Example 35 | 6 | 4 | 0.3 | 2.08 | 0.55 |
| Example 36 | 8 | 4 | 0.25 | 0.25 | 0.7 |

TABLE 6a-continued

| Example Number | Percent ALMA | Percent t-BAMA | Percent TMPTA | Percent Mercaptan | Percent Carbonate |
|---|---|---|---|---|---|
| Example 37 | 2 | 6 | 0.25 | 2.08 | 0.65 |
| Example 38 | 4 | 6 | 0.3 | 0.25 | 0.6 |
| Example 39 | 6 | 6 | 0.15 | 1.17 | 0.7 |
| Example 40 | 8 | 6 | 0.2 | 3 | 0.55 |
| Example 41 | 2 | 8 | 0.3 | 3 | 0.7 |

TABLE 6a-continued

| Example Number | Percent ALMA | Percent t-BAMA | Percent TMPTA | Percent Mercaptan | Percent Carbonate |
|---|---|---|---|---|---|
| Example 42 | 4 | 8 | 0.25 | 1.17 | 0.55 |
| Example 43 | 6 | 8 | 0.2 | 0.25 | 0.65 |
| Example 44 | 8 | 8 | 0.15 | 2.08 | 0.6 |
| Example 45 | 0 | 0 | 0 | 0 | 0.55 |

TABLE 6b

| | Mass(g) Ex. 29 | Mass(g) Ex. 30 | Mass(g) Ex. 31 | Mass(g) Ex. 32 | Mass(g) Ex. 33 | Mass(g) Ex. 34 |
|---|---|---|---|---|---|---|
| Monomers in Reactor Charge | | | | | | |
| Methyl Methacrylate | 14.03 | 13.29 | 12.58 | 11.89 | 14.03 | 13.31 |
| Styrene | 1.47 | 2.21 | 2.93 | 3.58 | 1.49 | 2.24 |
| n-Butyl Acrylate | 17.21 | 17.18 | 17.15 | 17.16 | 17.16 | 17.16 |
| Trimethylolpropane Triacrylate | 0.08 | 0.10 | 0.13 | 0.15 | 0.10 | 0.08 |
| Monomers in Feed 1 | | | | | | |
| Methyl Methacrylate | 86.21 | 81.65 | 77.28 | 73.06 | 86.21 | 81.74 |
| Styrene | 9.03 | 13.59 | 18.03 | 21.99 | 9.15 | 13.76 |
| n-Butyl Acrylate | 105.70 | 105.53 | 105.32 | 105.42 | 105.42 | 105.43 |
| Trimethylolpropane Triacrylate | 0.46 | 0.61 | 0.77 | 0.92 | 0.62 | 0.46 |
| Monomers in Feed 2 | | | | | | |
| Methyl Methacrylate | 0.00 | 0.00 | 0.00 | 0.00 | 0.00 | 0.00 |
| Styrene | 61.11 | 55.79 | 50.64 | 46.03 | 60.96 | 55.60 |
| n-Butyl Acrylate | 47.50 | 39.1 | 33.8 | 37.80 | 44.35 | 36.00 |
| Allyl Methacrylate | 7.16 | 14.32 | 21.48 | 28.64 | 7.16 | 14.32 |
| t-Butylaminoethyl Methacrylate | 7.16 | 7.16 | 7.16 | 7.16 | 7.16 | 7.16 |
| 2-Ethylhexyl 3-Mercaptopropionate | 0.90 | 7.45 | 10.74 | 4.19 | 4.19 | 10.74 |
| AMPS | 0.50 | 0.50 | 0.50 | 0.50 | 0.50 | 0.50 |
| Weight Percent Styrene in Shell | 49 | 45 | 41 | 37 | 49 | 45 |
| Measured Glass Transition Temperature | 11.1 | 5.6 | 1.4 | 7.6 | 9.5 | 2.6 |

TABLE 7

| | Mass(g) Ex. 35 | Mass(g) Ex. 36 | Mass(g) Ex. 37 | Mass(g) Ex. 38 | Mass(g) Ex. 39 | Mass(g) Ex. 40 |
|---|---|---|---|---|---|---|
| Monomers in Reactor Charge | | | | | | |
| Methyl Methacrylate | 11.88 | 11.28 | 12.63 | 11.93 | 11.33 | 10.53 |
| Styrene | 3.59 | 4.26 | 2.78 | 3.55 | 4.27 | 5.02 |
| n-Butyl Acrylate | 17.17 | 17.12 | 17.25 | 17.15 | 17.11 | 17.14 |
| Trimethylolpropane Triacrylate | 0.15 | 0.13 | 0.13 | 0.15 | 0.08 | 0.10 |
| Monomers in Feed 1 | | | | | | |
| Methyl Methacrylate | 72.97 | 69.27 | 77.59 | 73.28 | 69.58 | 64.65 |
| Styrene | 22.04 | 26.17 | 17.09 | 21.82 | 26.25 | 30.82 |
| n-Butyl Acrylate | 105.46 | 105.18 | 105.95 | 105.37 | 105.10 | 105.30 |
| Trimethylolpropane Triacrylate | 0.92 | 0.77 | 0.77 | 0.92 | 0.46 | 0.62 |
| Monomers in Feed 2 | | | | | | |
| Methyl Methacrylate | 0.00 | 0.00 | 0.00 | 0.00 | 0.00 | 0.00 |
| Styrene | 45.97 | 41.17 | 51.73 | 46.23 | 41.07 | 35.76 |
| n-Butyl Acrylate | 34.60 | 38.80 | 36.00 | 40.90 | 35.60 | 27.20 |
| Allyl Methacrylate | 21.48 | 28.64 | 7.16 | 14.32 | 21.48 | 28.64 |
| t-Butylaminoethyl Methacrylate | 14.32 | 14.32 | 21.48 | 21.48 | 21.48 | 21.48 |
| 2-Ethylhexyl 3-Mercaptopropionate | 7.45 | 0.90 | 7.45 | 0.90 | 4.19 | 10.74 |
| AMPS | 0.50 | 0.50 | 0.50 | 0.50 | 0.50 | 0.50 |
| Weight Percent Styrene in Shell | 37 | 33 | 42 | 37 | 33 | 29 |
| Measured Glass Transition Temperature | −2.6 | 14.5 | 9 | 13.6 | 8.1 | −0.7 |

TABLE 8a

| | Mass(g) Ex. 41 | Mass(g) Ex. 42 | Mass(g) Ex. 43 | Mass(g) Ex. 44 | Mass(g) Ex. 45 |
|---|---|---|---|---|---|
| Monomers in Reactor Charge | | | | | |
| Methyl Methacrylate | 11.88 | 11.28 | 10.63 | 9.92 | 14.78 |
| Styrene | 3.60 | 4.26 | 4.94 | 5.68 | 0.78 |
| n-Butyl Acrylate | 17.16 | 17.12 | 17.12 | 17.10 | 17.22 |
| Trimethylolpropane Triacrylate | 0.15 | 0.13 | 0.10 | 0.08 | 0.00 |
| Monomers in Feed 1 | | | | | |
| Methyl Methacrylate | 72.97 | 69.27 | 65.27 | 60.96 | 90.82 |
| Styrene | 22.12 | 26.17 | 30.35 | 34.92 | 4.76 |
| n-Butyl Acrylate | 105.38 | 105.18 | 105.15 | 105.05 | 105.80 |
| Trimethylolpropane Triacrylate | 0.92 | 0.77 | 0.62 | 0.46 | 0.00 |
| Monomers in Feed 2 | | | | | |
| Methyl Methacrylate | 0.00 | 0.00 | 0.00 | 0.00 | 0.00 |
| Styrene | 45.88 | 41.17 | 36.31 | 30.99 | 66.06 |
| n-Butyl Acrylate | 31.40 | 35.50 | 36.50 | 28.10 | 50.60 |
| Allyl Methacrylate | 7.16 | 14.32 | 21.48 | 28.64 | 7.16 |
| t-Butylaminoethyl Methacrylate | 28.64 | 28.64 | 28.64 | 28.64 | 0.00 |
| 2-Ethylhexyl 3-Mercapto-propionate | 10.74 | 4.19 | 0.90 | 7.45 | 0.00 |
| AMPS | 0.50 | 0.50 | 0.50 | 0.50 | 0.50 |
| Weight Percent Styrene in Shell | 37 | 33 | 29 | 25 | 53 |
| Measured Glass Transition Temperature | 3.4 | 10.5 | 15.2 | 5.4 | 10.9 |

Table 8b

The latex compositions from Tables 6b, 7, 8, and 8a were characterized for solids, particle size, scrap (filterable solids collected on a 100 mesh screen), viscosity, pH, latex swell ratio, latex gel fraction, and percent of allyl survival. In addition, clear films were cast on release paper, and aged for 37 days at room temperature. The decrease in swell ratio was measured as a function of cure time. From linear plots (FIG. 5), the decrease in swell ratio per day was obtained. The results from the above experiments are shown in the table below:

TABLE 8b

| Ex. No. | % Solids | Particle Size (nm) | Scrap grams | Viscosity (Brookfield) | pH | Latex Swell Ratio | Latex Gel Fraction (X100) | Allyl Survival | Swell Ratio/day |
|---|---|---|---|---|---|---|---|---|---|
| 29 | 45.96 | 221 | 1.65 | 12.7 | 7.6 | 6.9 | 78 | 96.34 | −0.088 |
| 30 | 46.72 | 181 | 0.09 | 17.8 | 7.4 | 7.4 | 83 | 100 | −0.034 |
| 31 | 47 | 157 | 0.37 | 22.2 | 7.5 | 6.6 | 78 | 95.88 | 0.00 |
| 32 | 46.63 | 167 | 0.19 | 12.8 | 7.5 | 5.7 | 89 | 94.02 | 0.00 |
| 33 | 45.77 | 196 | 0.88 | 13 | 7.5 | 7.7 | 81 | 78.92 | −0.091 |
| 34 | 47.9 | 136 | 4.5 | 24.6 | 1.5 | 8.5 | 70 | 93.69 | −0.031 |
| 35 | 46.38 | 243 | 4.67 | 12.5 | 7.6 | 5.8 | 86 | 88.98 | −0.003 |
| 36 | 44.04 | 155 | 5.89 | 18.4 | 7.9 | 5.5 | 88 | 89.45 | −0.031 |
| 37 | 45.53 | 141 | 3.83 | 17.6 | 8.1 | 7.5 | 69 | 84.05 | −0.010 |
| 38 | 41.7 | 163 | 10.55 | 15.2 | 7.9 | 6.6 | 82 | 83.95 | −0.011 |
| 39 | 45.34 | 177 | 3.36 | 13.6 | 8 | 8 | 77 | 88.52 | −0.013 |
| 40 | 45.43 | 149 | 4.6 | 17.2 | 7.9 | 6.3 | 74 | 98.40 | −0.004 |
| 41 | 43.35 | 194 | 5.04 | 22.7 | 8.2 | 11.9 | 74 | 81.47 | 0.00 |
| 42 | 45.24 | 164 | 5.76 | 14.2 | 8.2 | 9.5 | 78 | 89.80 | −0.013 |
| 43 | 45.54 | 168 | 8.93 | 16 | 8.2 | 6.5 | 75 | 93.18 | — |
| 44 | 46.18 | 196 | 10.67 | 15.9 | 8.3 | 7.1 | 74 | 90.47 | −0.018 |
| 45 | 45.57 | 198 | 3.25 | 16.1 | 6.7 | 0 | 1 | | |

EXAMPLES 46–103
Preparation of Waterborne Allyl Methacrylate-Containing Polymers

PROCEDURE 6

To a 3000 mL resin kettle equipped with a condenser, nitrogen purge, and subsurface feed tube were added 640 g of water, 4.05 g of TREM LF-40, 1.93 g of TERGITOL NP-40(70%), 7.3 g of sodium carbonate, and monomers for the reactor charge described in the tables below. A nitrogen purge was begun, then the contents of the reactor brought up to 80° C. at 400 rpm. After reaching 80° C., an initiator charge composed of 7.70 g of sodium persulfate dissolved in 43.6 g of water were added to the reactor. An emulsion feed composed of 355 g of water, 13.01 g of TREM LF-40, 10.21 g of TERGITOL NP-40 (70%), and monomers was fed into the reactor at 8.375 g/min. Five minutes after the first emulsion feed was begun, an initiator solution composed of 4.36 g of sodium persulfate dissolved in 112 g of water was fed in at 0.536 g/min. After the first emulsion feed was completed, a second emulsion feed composed of 171 g of water,12.79 g of AEROSOL 18, 5.09 g of TERGITOL NP-40 (70%), and monomers was fed into the reactor at 8.375 g/min. Five minutes after the last feed, a post catalyst solution of 1.34 g of t-butylhydroperoxide, and 1.34 g of sodium formaldehyde sulfoxylate dissolved in 40.2 g of water was charged and heating continued for 30 minutes. The emulsion was cooled then filtered through 100 mesh wire screen. The solids level, amount of dried material (100 mesh screen), particle size, viscosity (Brookfield, LVT #1 spindle, 60 rpm), and pH were determined. The composition for each latex, and their characterization are shown in the Tables 9a–19b below:

Table 9a

The latex particles contains 4 percent by weight of allyl methacrylate, and are prepared from styrene (20 weight percent), 2-ethylhexyl acrylate, methyl methacrylate, trimethylolpropane triacrylate (TMPTA), 2-ethylhexyl 3-mercaptopropionate, and the sodium salt of 2-acrylamido- 2-methylpropane sulfonate (AMPS). In addition, monomer acetoacetoxyethyl methacrylate is added as a variable. The shell of core/shell particles have a calculated Tg of 15° C., and the Tg of the core is varied to obtain overall Tg of the core/shell particles. The monomer percents shown below are based on total monomer weight of the latex particles.

Variable 1: Dimethylaminoethyl Methacrylate (0) versus t-BAMA (1)
Variable 2: AAEM (0 versus 2%)
Variable 3: 2-ethylhexyl 3-mercaptopropionate, (0.25 versus 1.17%)
Variable 4: TMPTA (0.1 versus 0.2%)
Variable 5: (Shell Tg Calculated, −5° C. versus 15° C.)

TABLE 9a

| Examples | t-BAMA = 1 DMAEMA = 0 | Percent AAEM | Percent Mercaptan | Percent TMPTA | Glass Transition Temperature |
|---|---|---|---|---|---|
| 46 | 1 | 2 | 1.17 | 0.2 | 15 |
| 47 | 1 | 2 | 0.25 | 0.1 | 15 |
| 48 | 1 | 0 | 0.25 | 0.2 | 15 |
| 49 | 1 | 0 | 1.17 | 0.1 | 15 |
| 50 | 1 | 2 | 1.17 | 0.2 | −5 |
| 51 | 1 | 2 | 0.25 | 0.1 | −5 |
| 52 | 1 | 0 | 0.25 | 0.2 | −5 |
| 53 | 1 | 0 | 1.17 | 0.1 | −5 |
| 54 | 0 | 2 | 0.25 | 0.2 | 15 |
| 55 | 0 | 2 | 1.17 | 0.1 | 15 |
| 56 | 0 | 0 | 1.17 | 0.2 | 15 |
| 57 | 0 | 0 | 0.25 | 0.1 | 15 |
| 58 | 0 | 2 | 0.25 | 0.2 | −5 |
| 59 | 0 | 2 | 1.17 | 0.1 | −5 |
| 60 | 0 | 0 | 1.17 | 0.2 | −5 |
| 61 | 0 | 0 | 0.25 | 0.1 | −5 |
| 62 | 0.5 | 1 | 0.71 | 0.15 | 5 |

TABLE 9b

| | Mass(g) Ex. 46 | Mass(g) Ex. 47 | Mass(g) Ex. 48 | Mass(g) Ex. 49 | Mass(g) Ex. 50 | Mass(g) Ex. 51 |
|---|---|---|---|---|---|---|
| Monomers in Reactor Charge | | | | | | |
| Methyl Methacrylate | 52.05 | 52.22 | 52.97 | 52.89 | 28.54 | 28.54 |
| Styrene | 8.54 | 8.54 | 7.70 | 8.13 | 8.41 | 8.68 |
| 2-Ethylhexyl Acrylate | 48.90 | 48.90 | 48.82 | 48.65 | 72.55 | 72.44 |
| Trimethylolpropane Triacrylate | 0.34 | 0.17 | 0.34 | 0.17 | 0.34 | 0.17 |
| Monomers in Feed 1 | | | | | | |
| Methyl Methacrylate | 319.73 | 320.76 | 325.41 | 324.89 | 175.34 | 175.34 |
| Styrene | 52.49 | 52.46 | 47.32 | 49.93 | 51.63 | 53.32 |
| 2-Ethylhexyl Acrylate | 300.38 | 300.41 | 299.89 | 298.83 | 445.64 | 444.98 |
| Trimethylolpropane Triacrylate | 2.066 | 1.03 | 2.06 | 1.03 | 2.06 | 1.03 |
| Monomers in Feed 2 | | | | | | |
| Styrene | 178.82 | 178.85 | 184.84 | 181.81 | 179.82 | 177.85 |
| 2-Ethylhexyl Acrylate | 126.0 | 137.00 | 155.00 | 147.00 | 125.00 | 138.00 |
| Allyl Methacrylate | 47.97 | 47.97 | 47.97 | 47.97 | 47.97 | 47.97 |
| t-Butylaminoethyl Methacrylate | 23.99 | 23.99 | 23.99 | 23.99 | 23.99 | 23.99 |
| 2-Ethylhexyl 3-Mercapto-propionate | 14.03 | 3.00 | 3.00 | 14.03 | 14.03 | 3.00 |
| Acetoacetoxyethyl Methacrylate | 0.00 | 23.99 | 0.00 | 0.00 | 23.99 | 23.99 |
| AMPS | 1.68 | 1.68 | 1.68 | 1.68 | 1.68 | 1.68 |
| Weight Percent Styrene in Shell | 43 | 51 | 44 | 48 | 43 | 43 |
| Percent Solids of Latex | 47.2 | 46.6 | 45.8 | 46.9 | 44.2 | 45.6 |
| Dried Solids Collected (100 mesh) | 0.38 | 0.60 | 25.4 | 0.40 | 0.40 | 0.95 |
| Particle Size (nm) | 232 | 220 | 244 | 221 | 183 | 196 |
| Viscosity (LVT 1 at 60 rpm) | 19.8 | 18.9 | 20.2 | 21.0 | 23.3 | 24.1 |
| pH | 7.8 | 7.8 | 8.2 | 7.8 | 7.6 | 8.2 |

TABLE 9c

| | Mass(g) Ex. 52 | Mass(g) Ex. 53 |
|---|---|---|
| Monomers in Reactor Charge | | |
| Methyl Methacrylate | 28.88 | 28.93 |
| Styrene | 8.26 | 8.27 |
| 2-Ethylhexyl Acrylate | 72.35 | 72.47 |
| Trimethylolpropane Triacrylate | 0.34 | 0.17 |
| Monomers in Feed 1 | | |
| Methyl Methacrylate | 177.40 | 177.71 |
| Styrene | 50.76 | 50.79 |
| 2-Ethylhexyl Acrylate | 444.45 | 445.15 |
| Trimethylolpropane Triacrylate | 2.06 | 1.03 |
| Monomers in Feed 2 | | |
| Methyl Methacrylate | 0.00 | 0.00 |
| Styrene | 180.84 | 180.81 |
| 2-Ethylhexyl Acrylate | 159.00 | 148.00 |
| Allyl Methacrylate | 47.97 | 47.97 |
| t-Butylaminoethyl Methacrylate | 23.99 | 23.99 |
| 2-Ethylhexyl 3-Mercapto-propionate | 3.00 | 14.03 |
| Acetoacetoxyethyl Methacrylate | 0.00 | 0.00 |
| AMPS | 1.68 | 1.68 |
| Weight Percent Styrene in Shell | 43 | 43 |
| Percent Solids of Latex | 45.5 | 45.9 |
| Dried Solids Collected (100 mesh) | 1.5 | 3.6 |
| Particle Size (nm) | 223 | 264 |
| Viscosity (LVT 1 at 60 rpm) | 24.1 | 17.7 |
| pH | 7.9 | 8.3 |

TABLE 9d

|  | Mass(g) Ex. 54 | Mass(g) Ex. 55 | Mass(g) Ex. 56 | Mass(g) Ex. 57 | Mass(g) Ex. 58 | Mass(g) Ex. 59 |
|---|---|---|---|---|---|---|
| Monomers in Reactor Charge | | | | | | |
| Methyl Methacrylate | 52.54 | 52.94 | 53.11 | 53.11 | 29.13 | 29.27 |
| Styrene | 8.04 | 8.04 | 7.48 | 7.62 | 8.18 | 8.18 |
| 2-Ethylhexyl Acrylate | 48.82 | 48.68 | 48.90 | 48.94 | 72.19 | 72.22 |
| Trimethylolpropane Triacrylate | 0.34 | 0.17 | 0.34 | 0.17 | 0.34 | 0.17 |
| Monomers in Feed 1 | | | | | | |
| Methyl Methacrylate | 323.34 | 325.20 | 326.23 | 326.23 | 178.95 | 179.77 |
| Styrene | 49.37 | 49.40 | 45.97 | 46.80 | 50.23 | 50.26 |
| 2-Ethylhexyl Acrylate | 299.89 | 299.04 | 300.41 | 300.61 | 443.43 | 443.61 |
| Trimethylolpropane Triacrylate | 2.06 | 1.03 | 2.06 | 1.03 | 2.06 | 1.03 |
| Monomers in Feed 2 | | | | | | |
| Styrene | 182.45 | 182.42 | 186.41 | 185.44 | 181.45 | 181.42 |
| 2-Ethylhexyl Acrylate | 137 | 126.00 | 146.00 | 158.00 | 138.00 | 127.00 |
| Allyl Methacrylate | 47.97 | 47.97 | 47.97 | 47.97 | 47.97 | 47.97 |
| Dimethylaminoethyl Methacrylate | 20.39 | 20.39 | 20.39 | 20.39 | 20.39 | 20.39 |
| 2-Ethylhexyl 3-Mercapto-propionate | 3.00 | 14.03 | 14.03 | 3.00 | 3.00 | 14.03 |
| Acetoacetoxyethyl Methacrylate | 23.99 | 23.99 | 0.00 | 0.00 | 23.99 | 23.99 |
| AMPS | 1.68 | 1.68 | 1.68 | 1.68 | 1.68 | 1.68 |
| Weight Percent Styrene in Shell | 44 | 44 | 45 | 44 | 44 | 44 |
| Percent Solids of Latex | 45.8 | 46.5 | 46.5 | 46.8 | 45.8 | 46.0 |
| Dried Solids Collected (100 mesh) | 18.6 | 1.15 | 2.76 | 0.20 | 12.4 | 2.75 |
| Particle Size (nm) | 260 | 225 | 204 | 245 | 212 | 212 |
| Viscosity (LVT 1 at 60 rpm) | 21.0 | 25.0 | 19.3 | 26.8 | 24.5 | 24.5 |
| pH | 7.6 | 7.5 | 7.7 | 7.7 | 7.5 | 7.5 |

TABLE 9e

|  | Mass(g) Ex. 60 | Mass(g) Ex. 61 | Mass(g) Ex. 62 | Mass(g) Ex. 63 | Mass(g) Ex. 64 |
|---|---|---|---|---|---|
| Monomers in Reactor charge | | | | | |
| Methyl Methacrylate | 29.27 | 29.47 | 41.64 | 41.64 | 41.64 |
| Styrene | 7.62 | 7.62 | 8.22 | 8.22 | 8.22 |
| 2-Ethylhexyl Acrylate | 72.61 | 72.58 | 59.72 | 59.72 | 59.72 |
| Trimethylolpropane Triacrylate | 0.34 | 0.17 | 0.25 | 0.25 | 0.25 |
| Monomers in Feed 1 | | | | | |
| Methyl Methacrylate | 179.77 | 181.01 | 255.79 | 255.79 | 255.79 |
| Styrene | 46.83 | 46.80 | 50.51 | 50.51 | 50.51 |
| 2-Ethylhexyl Acrylate | 446.01 | 445.83 | 366.83 | 366.83 | 366.83 |
| Trimethylolpropane Triacrylate | 2.06 | 1.03 | 1.55 | 1.55 | 1.55 |
| Monomers in Feed 2 | | | | | |
| Styrene | 185.41 | 185.44 | 181.13 | 181.13 | 181.13 |
| 2-Ethylhexyl Acrylate | 147.00 | 158.00 | 143.00 | 143.00 | 143.00 |
| Allyl Methacrylate | 47.97 | 47.97 | 47.97 | 47.97 | 47.97 |
| Dimethylaminoethyl Methacrylate | 20.39 | 20.39 | 10.19 | 10.19 | 10.19 |
| 2-Ethylhexyl 3-Mercapto-propionate | 14.03 | 3.00 | 8.52 | 8.52 | 8.52 |
| Acetoacetoxyethyl Methacrylate | 0.00 | 0.00 | 11.99 | 11.99 | 11.99 |
| AMPS | 1.68 | 1.68 | 1.68 | 1.68 | 1.68 |
| t-Butylaminoethyl Methacrylate | 0.00 | 0.00 | 11.99 | 11.99 | 11.99 |
| Weight Percent Styrene in Shell | 44 | 44 | 43 | 43 | 43 |
| Percent Solids of Latex | 46.4 | 44.7 | 45.1 | 46.3 | 45.9 |
| Dried Solids Collected (100 mesh) | 1.61 | 0.50 | 13.8 | 19.3 | 10.0 |
| Particle Size (nm) | 258 | 194 | 211 | 199 | 226 |
| Viscosity (LVT 1 at 60 rpm) | 20.3 | 32.5 | 21.9 | 19.9 | 23.2 |
| pH | 7.5 | 7.6 | 7.5 | 7.4 | 7.5 |

Examples 63 and 64 are repeats of Example 62.

TABLE 9f

Characterization of Examples 46–62

| Examples | Scrap (phr) | Shear Stable | Freeze-Thaw Cycles | MFFT (°C.) | % Allyl Survival | Gel Fraction Latex (X100) | Swell Ratio of Latex | Morphology |
|---|---|---|---|---|---|---|---|---|
| 46 | 0.0305 | Yes | 5 | 12.7 | 90.7 | 77.9 | 5.4 | 0 |
| 47 | 0.0482 | Yes | 5 | 16 | 100 | 72.4 | 6.486 | 0 |
| 48 | 2.04 | Yes | 5 | 16.2 | 99.5 | 79.4 | 5.915 | 0 |
| 49 | 0.0321 | Yes | 5 | 7.8 | 99.4 | 72.1 | 6.289 | 1 |
| 50 | 0.137 | Yes | 5 | 5.8 | 93.96 | 80.4 | 4.927 | 0 |
| 51 | 0.0763 | Yes | 0 | 6.9 | 100 | 82.6 | 5.231 | 0 |
| 52 | 0.12 | Yes | 5 | 6.8 | 96.4 | 81.5 | 6.038 | 1 |
| 53 | 0.289 | Yes | 5 | 7.8 | 100 | 68.1 | 7.531 | 0.5 |
| 54 | 1.5 | Yes | 5 | 7.9 | 96.5 | 66.7 | 7.703 | 0 |
| 55 | 0.0924 | Yes | 5 | 10.8 | 100 | 52.3 | 8.75 | 0 |
| 56 | 0.222 | Yes | 5 | 10.8 | 100 | 58.3 | 7.268 | 0 |
| 57 | 0.0161 | Yes | 5 | 9.7 | 98.5 | 70.3 | 6.846 | 0 |
| 58 | 0.996 | Yes | 3 | 7.2 | 100 | 79.8 | 5.608 | 0 |
| 59 | 0.221 | Yes | 5 | 7.9 | 100 | 62.5 | 7.38 | 1 |
| 60 | 0.13 | Yes | 5 | 7.2 | 96 | 71.9 | 5.389 | 0 |
| 61 | 0.0402 | Yes | 0 | 4.7 | 100 | 72.8 | 6.596 | 1 |
| 62 | 1.11 | Yes | 5 | 15.6 | 100 | 69.5 | 6.819 | 0 |

Morphology: A rating of 1 is the classic core/shell morphology; 0 indicates other known morphologies.

TABLE 9g

Analysis of Examples 46–62

| Variables | Scrap (phr) | Fr.-Thaw | % Allyl Survival | Latex Gel Fraction | Latex Swell Ratio | MFFT: Resist |
|---|---|---|---|---|---|---|
| Ave. Value | 0.42 | 4 | 98.3 | 71.7 | 6.48 | 9.52 |
| DMAEMA (0) vs. t-BAMA (1) | 0 | 0 | 0 | (10) | (−0.96) | 0 |
| AAEM (0 to 2%) | 0 | 0 | 0 | 0 | 0 | 0 |
| Mercaptan (0.25 to 1.2%) | (−0.46) | 0 | 0 | (−7.75) | 0 | 0 |
| TMPTA (0.1 to 0.2%) | (0.54) | 0 | (−3.1) | (5.35) | (−0.86) | 0 |
| Tg (−5 to 15C) | 0 | (2.1) | 0 | (−6.3) | (0.74) | (8.4) |
| Interactions | Yes | Yes | No | No | Yes | No |
| R2 | 0.5662 | 0.46127 | 0.3284 | 0.7977 | 0.8749 | 0.4202 | phr, grams of dried polymer collected on a 100 mesh screen per 100 g of theoretical dried polymer.

Table 10a

The latex particles contain 4 percent by weight of allyl methacrylate, and are prepared from styrene (20 weight percent) and/or methyl methacrylate, 2-ethylhexyl acrylate, trimethylolpropane triacrylate (TMPTA), 2-ethylhexyl 3-mercaptopropionate, and the sodium salt of 2-acrylamido-2-methylpropane sulfonate (AMPS). In addition, the monomer acetoacetoxyethyl methacrylate (AAEM) is added as a variable. The shell of core/shell particles have a calculated Tg of 15° C., and the Tg of the core is varied to obtain overall Tg of the core/shell particles. The monomer percents shown below are based on total monomer weight of the latex particles.

Variable 1: Methyl Methacrylate (0) versus Styrene (1) primary monomer in the Shell Variable 2: AAEM (0 versus 2%)

Variable 3: 2-Ethylhexyl 3-Mercaptopropionate, (0.25 versus 1.17%)

Variable 4: TMPTA (0.1 versus 0.2%)

Variable 5: (Shell Tg Calculated, −5° C. versus −15° C.)

TABLE 10a

| Examples | Styrene = 1 MMA = 0 | Percent AAEM | Percent Mercaptan | Percent TMPTA | Glass Transition Temperature |
|---|---|---|---|---|---|
| 46 | 1 | 2 | 1.17 | 0.2 | 15 |
| 47 | 1 | 2 | 0.25 | 0.1 | 15 |
| 48 | 1 | 0 | 0.25 | 0.2 | 15 |
| 49 | 1 | 0 | 1.17 | 0.1 | 15 |
| 50 | 1 | 2 | 1.17 | 0.2 | −5 |
| 51 | 1 | 2 | 0.25 | 0.1 | −5 |
| 52 | 1 | 0 | 0.25 | 0.2 | −5 |
| 53 | 1 | 0 | 1.17 | 0.1 | −5 |
| 65 | 0 | 2 | 0.25 | 0.2 | 15 |
| 66 | 0 | 2 | 1.17 | 0.1 | 15 |
| 67 | 0 | 0 | 1.17 | 0.2 | 15 |
| 68 | 0 | 0 | 0.25 | 0.1 | 15 |
| 69 | 0 | 2 | 0.25 | 0.2 | −5 |
| 70 | 0 | 2 | 1.17 | 0.1 | −5 |
| 71 | 0 | 0 | 1.17 | 0.2 | −5 |
| 72 | 0 | 0 | 0.25 | 0.1 | −5 |
| 73 | 0.5 | 1 | 0.71 | 0.15 | 5 |

TABLE 10b

|  | Mass(g) Ex. 65 | Mass(g) Ex. 66 | Mass(g) Ex. 67 | Mass(g) Ex. 68 | Mass(g) Ex. 69 | Mass(g) Ex. 70 |
|---|---|---|---|---|---|---|
| Monomers in Reactor Charge | | | | | | |
| Methyl Methacrylate | 60.56 | 60.56 | 60.41 | 60.64 | 36.94 | 37.16 |
| Styrene | 0.00 | 0.00 | 0.00 | 0.00 | 0.00 | 0.00 |
| 2-Ethylhexyl Acrylate | 48.93 | 48.96 | 49.02 | 49.02 | 72.55 | 72.49 |
| Trimethylolpropane Triacrylate | 0.34 | 0.17 | 0.34 | 0.17 | 0.34 | 0.17 |
| Monomers in Feed 1 | | | | | | |
| Methyl Methacrylate | 372.02 | 372.88 | 371.51 | 372.52 | 226.94 | 228.31 |
| Styrene | 0.00 | 0.00 | 0.00 | 0.00 | 0.00 | 0.00 |
| 2-Ethylhexyl Acrylate | 300.58 | 300.75 | 301.09 | 301.12 | 445.66 | 445.33 |
| Trimethylolpropane Triacrylate | 2.06 | 1.03 | 2.06 | 1.03 | 2.06 | 1.03 |
| Monomers in Feed 2 | | | | | | |
| Methyl Methacrylate | 174.85 | 174.82 | 178.81 | 178.84 | 173.85 | 173.82 |
| 2-Ethylhexyl Acrylate | 141.00 | 130.00 | 150.00 | 161.00 | 142.00 | 131 |
| Allyl Methacrylate | 47.97 | 47.97 | 47.97 | 47.97 | 47.97 | 47.97 |
| t-Butylaminoethyl Methacrylate | 23.99 | 23.99 | 23.99 | 23.99 | 23.99 | 23.99 |
| 2-Ethylhexyl 3-Mercaptopropionate | 3.00 | 14.03 | 14.03 | 3.00 | 3.00 | 4.03 |
| Acetoacetoxyethyl Methacrylate | 23.99 | 23.99 | 0.00 | 0.QO | 23.99 | 23.99 |
| AMPS | 1.68 | 1.68 | 1.68 | 1.68 | 1.68 | 1.68 |
| Weight Percent MMA in Shell | 42 | 42 | 43 | 43 | 42 | 42 |
| Percent Solids of Latex | 44.0 | 46.8 | 46.6 | 46.8 | 46.1 | 46.9 |
| Dried Solids Collected (100 mesh) | 0.41 | 0.75 | 1.40 | 2.20 | 2.60 | 0.65 |
| Particle Size (nm) | 248 | 251 | 305 | 321 | 237 | 233 |
| Viscosity (LVT 1 at 60 rpm) | 17.8 | 12.9 | 41.4 | 41.6 | 21.3 | 22.22 |
| pH | 7.1 | 7.4 | 7.4 | 7.4 | 7.4 | 7.2 |

TABLE 10c

|  | Mass(g) Ex. 71 | Mass(g) Ex. 72 | Mass(g) Ex. 73 |
|---|---|---|---|
| Monomers in Reactor Charge | | | |
| Methyl Methacrylate | 36.96 | 37.19 | 57.49 |
| 2-Ethylhexyl Acrylate | 72.52 | 72.45 | 60.41 |
| Trimethylolpropane Triacrylate | 0.31 | 0.17 | 0.25 |
| Monomers in Feed 1 | | | |
| Methyl Methacrylate | 227.07 | 228.59 | 302.07 |
| 2-Ethylhexyl Acrylate | 445.54 | 445.05 | 371.06 |
| Trimethylolpropane Triacrylate | 2.06 | 1.03 | 1.55 |
| Monomers in Feed 2 | | | |
| Methyl Methacrylate | 177.31 | 177.34 | 59.4 |
| Styrene | 0.00 | 0.00 | 119.93 |
| 2-Ethylhexyl Acrylate | 151.5 | 162.5 | 143 |
| Allyl Methacrylate | 47.97 | 47.97 | 47.97 |
| t-Butylaminoethyl Methacrylate | 23.99 | 23.99 | 23.99 |
| 2-Ethylhexyl 3-Mercaptopropionate | 14.03 | 2.99 | 1.68 |
| Acetoacetoxyethyl Methacrylate | 0.00 | 0.00 | 11.99 |
| AMPS | 1.68 | 1.68 | 1.68 |
| Weight Percent MMA in Shell | 43 | 43 | 14 |
| Percent Solids of Latex | 47.3 | 46.8 | 47.0 |
| Dried Solids Collected (100 mesh) | 21.9 | 27.4 | 0.10 |
| Particle Size (nm) | 267 | 299 | 256 |
| Viscosity (LVT 1 at 60 rpm) | 19.7 | 18.0 | 20.4 |
| pH | 7.6 | 7.6 | 7.5 |

TABLE 10d

Characterization of Examples 46–53, 65–73

| Examples | Scrap (phr) | Shear Stable | Freeze-Thaw Cycles | MFFT (°C.) | % Allyl Survival | Gel Fraction Latex (X100) | Swell Ratio of Latex | Morphology |
|---|---|---|---|---|---|---|---|---|
| 46 | 0.0305 | Yes | 5 | 12.7 | 90.7 | 77.9 | 5.4 | 0 |
| 47 | 0.0482 | Yes | 5 | 16 | 100 | 72.4 | 6.486 | 0 |
| 48 | 2.04 | Yes | 5 | 16.2 | 99.5 | 79.4 | 5.915 | 0 |
| 49 | 0.0321 | Yes | 5 | 7.8 | 99.4 | 72.1 | 6.289 | 1 |
| 50 | 0.137 | Yes | 0 | 5.8 | 93.96 | 80.4 | 4.927 | 0 |
| 51 | 0.0763 | Yes | 0 | 6.9 | 100 | 82.6 | 5.231 | 0 |

TABLE 10d-continued

Characterization of Examples 46–53, 65–73

| Examples | Scrap (phr) | Shear Stable | Freeze-Thaw Cycles | MFFT (°C.) | % Allyl Survival | Gel Fraction Latex (X100) | Swell Ratio of Latex | Morphology |
|---|---|---|---|---|---|---|---|---|
| 52 | 0.12 | Yes | 5 | 6.8 | 96.4 | 81.5 | 6.038 | 1 |
| 53 | 0.289 | Yes | 5 | 7.8 | 100 | 68.1 | 7.531 | 0.5 |
| 65 | 1.5 | Yes | 5 | 23 | 20.3 | 92 | 3.214 | 1 |
| 66 | 0.0924 | Yes | 5 | 23 | 27.4 | 86.5 | 3.87 | 1 |
| 67 | 0.222 | Yes | 5 | 22 | 0 | 89.3 | 3.163 | 1 |
| 68 | 0.0161 | Yes | 5 | 25 | 22.7 | 89.9 | 3.359 | 1 |
| 69 | 0.996 | Yes | 0 | 5.8 | 11.4 | 89.2 | 3.858 | 1 |
| 70 | 0.221 | Yes | 0 | 0.5 | 28.8 | 85 | 4.179 | 1 |
| 71 | 0.13 | Yes | 1 | 1.1 | 16 | 87.2 | 3.947 | 0.9 |
| 72 | 0.0402 | Yes | 0 | 3.4 | 21.4 | 87.6 | 4.361 | 1 |
| 73 | 1.11 | Yes | 5 | 9.3 | 86 | 82 | 6.522 | 0.8 |

Latex Morphology: 1, Core/Shell Morphology; 0, Raspberry Morphology.

TABLE 10e (Examples 46–53, 65–73)

| Variables | Scrap (phr) | Freeze-Thaw | Percent Allyl Survival | Gel Fraction (X100) | Swell Ratio | Morphology | MFFT |
|---|---|---|---|---|---|---|---|
| Ave. Value | 0.53 | 3.29 | 59.64 | 82.53 | 4.958 | 0.659 | 11.4 |
| MMA (0) vs. STY (1) | 0 | 0 | (79) | (−12) | (2.3) | (−0.68) | (−3) |
| AAEM (0 to 2%) | 0 | 0 | 0 | 0 | 0 | (−0.15) | 0 |
| Mercaptan (0.25 to 1.2%) | (−0.64) | 0 | 0 | (−3.5) | 0 | 0 | (−2.8) |
| TMPTA (0.1 to 0.2%) | (0.72) | 0 | (−8.9) | (4.1) | (−0.60) | 0 | 0 |
| Tg (−5 to 15° C.) | 0 | (3.6) | 0 | 0 | 0 | 0 | (3.4) |
| Interactions | Yes | No | No | No | No | Yes | Yes |
| R2 | 0.8283 | 0.5743 | 0.9576 | 0.853 | 0.7445 | 0.7844 | 0.9579 |

Table 11a

The latex particles contain 4 percent by weight of allyl methacrylate, and are prepared from styrene (20 weight percent), 2-ethylhexyl acrylate or butyl acrylate, methyl methacrylate, trimethylolpropane triacrylate (TMPTA), 2-ethylhexyl 3-mercaptopropionate, and the sodium salt of 2-acrylamido-2-methylpropane sulfonate (AMPS). In addition, monomer acetoacetoxyethyl methacrylate (AAEM) is added as a variable. The shell of core/shell particles have a calculated Tg of 15° C., and the Tg of the core is varied to obtain overall Tg of the core,shell particles. The monomer percents shown below are based on total monomer weight of the latex particles.

Variable 1: Butyl Acrylate (0) versus 2-Ethylhexyl Acrylate (1)
Variable 2: AAEM (0 versus 2%)
Variable 3: 2-ethylhexyl 3-mercaptopropionate, (0.25 versus 1.17%)
Variable 4: TMPTA (0.1 versus 0.2%)
Variable 5: (Overall Tg Calculated, −5° C. versus 15° C.)

TABLE 11a

| Examples | 2EHA = 1 BA = 0 | Percent AAEM | Percent Mercaptan | Percent TMPTA | Glass Transition Temperature |
|---|---|---|---|---|---|
| 46 | 1 | 2 | 1.17 | 0.2 | 15 |
| 47 | 1 | 2 | 0.25 | 0.1 | 15 |
| 48 | 1 | 0 | 0.25 | 0.2 | 15 |
| 49 | 1 | 0 | 1.17 | 0.1 | 15 |
| 50 | 1 | 2 | 1.17 | 0.2 | −5 |
| 51 | 1 | 2 | 0.25 | 0.1 | −5 |
| 52 | 1 | 0 | 0.25 | 0.2 | −5 |
| 53 | 1 | 0 | 1.17 | 0.1 | −5 |
| 74 | 0 | 2 | 0.25 | 0.2 | 15 |
| 75 | 0 | 2 | 1.17 | 0.1 | 15 |
| 76 | 0 | 0 | 1.17 | 0.2 | 15 |
| 77 | 0 | 0 | 0.25 | 0.1 | 15 |
| 78 | 0 | 2 | 0.25 | 0.2 | −5 |
| 79 | 0 | 2 | 1.17 | 0.1 | −5 |
| 80 | 0 | 0 | 1.17 | 0.2 | −5 |
| 81 | 0 | 0 | 0.25 | 0.1 | −5 |
| 82 | 0.5 | 1 | 0.71 | 0.15 | 5 |

TABLE 11b

|  | Mass(g) Ex. 74 | Mass(g) Ex. 75 | Mass(g) Ex. 76 | Mass(g) Ex. 77 | Mass(g) Ex. 78 | Mass(g) Ex. 79 |
|---|---|---|---|---|---|---|
| Monomers in Reactor Charge | | | | | | |
| Methyl Methacrylate | 54.90 | 55.04 | 55.58 | 55.74 | 32.24 | 32.46 |
| Styrene | 7.91 | 7.99 | 7.15 | 7.28 | 7.91 | 7.99 |
| Butyl Acrylate | 46.68 | 46.64 | 46.77 | 46.64 | 69.35 | 69.22 |
| Trimethylolpropane Triacrylate | 0.34 | 0.17 | 0.34 | 0.17 | 0.34 | 0.17 |
| Monomers in Feed 1 | | | | | | |
| Methyl Methacrylate | 337.27 | 338.09 | 341.39 | 342.42 | 198.03 | 199.37 |
| Styrene | 48.59 | 49.05 | 43.91 | 44.74 | 48.59 | 49.05 |
| Butyl Acrylate | 286.75 | 286.50 | 287.31 | 286.48 | 425.99 | 425.22 |
| Trimethylolpropane triacrylate | 2.06 | 1.03 | 2.06 | 1.03 | 2.06 | 1.03 |
| Monomers in Feed 2 | | | | | | |
| Styrene | 183.35 | 182.82 | 188.81 | 187.84 | 183.35 | 182.82 |
| Butyl Acrylate | 132.50 | 122.00 | 140.00 | 152.00 | 132.50 | 122.00 |
| Allyl Methacrylate | 47.97 | 47.97 | 47.97 | 47.97 | 47.97 | 47.97 |
| t-Butylaminoethyl Methacrylate | 23.99 | 23.99 | 23.99 | 23.99 | 23.99 | 23.99 |
| 2-Ethylhexyl 3-Mercapto-propionate | 3.00 | 14.03 | 14.03 | 3.00 | 3.00 | 14.03 |
| Acetoacetoxyethyl Methacrylate | 23.99 | 23.99 | 0.00 | 0.00 | 23.99 | 23.99 |
| AMPS | 1.68 | 1.68 | 1.68 | 1.68 | 1.68 | 1.68 |
| Weight Percent Styrene in Shell | 44 | 44 | 45 | 45 | 44 | 44 |
| Percent Solids of Latex | 46.5 | 46.5 | 46.5 | 46.4 | 45.7 | 45.5 |
| Dried Solids Collected (100 mesh) | 2.1 | 3.4 | 5.8 | 3.3 | 6.8 | 14.1 |
| Particle Size (nm) | 301 | 306 | 373 | 316 | 253 | 250 |
| Viscosity (LVT 1 at 60 rpm) | 11.4 | 10.6 | 11.4 | 11.2 | 12.2 | 11.0 |
| pH | 7.7 | 7.9 | 8.0 | 8.0 | 7.9 | 7.9 |

TABLE 11c

|  | Mass(g) Ex. 80 | Mass(g) Ex. 81 | Mass(g) Ex. 82 |
|---|---|---|---|
| Monomers in Reactor Charge | | | |
| Methyl Methacrylate | 32.96 | 33.16 | 42.88 |
| Styrene | 7.36 | 7.28 | 8.05 |
| Butyl Acrylate | 69.18 | 69.22 | 29.32 |
| Trimethylolpropane Triacrylate | 0.34 | 0.17 | 0.25 |
| 2-Ethylhexyl Acrylate | 0.00 | 0.00 | 29.32 |
| Monomers in Feed 1 | | | |
| Methyl Methacrylate | 202.46 | 203.70 | 263.42 |
| Styrene | 45.20 | 44.74 | 49.48 |
| Butyl Acrylate | 424.95 | 425.20 | 180.12 |
| Trimethylolpropane Triacrylate | 2.06 | 1.03 | 180.12 |
| 2-Ethylhexyl Acrylate | | | |
| Monomers in Feed 2 | | | |
| Styrene | 187.31 | 187.84 | 182.33 |
| Butyl Acrylate | 141.50 | 152.00 | 70 |
| 2-Ethylhexyl Acrylate | 0.00 | 0.00 | 70 |
| Allyl Methacrylate | 47.97 | 47.97 | 47.97 |
| t-Butylaminoethyl Methacrylate | 23.99 | 23.99 | 23.99 |
| 2-Ethylhexyl 3-Mercapto-propionate | 14.03 | 3.00 | 8.52 |
| Acetoacetoxyethyl Methacrylate | 0.00 | 0.00 | 11.99 |
| AMPS | 1.68 | 1.68 | 1.68 |
| Weight Percent Styrene in Shell | 45 | 45 | 44 |
| Percent Solids of Latex | 46.4 | 46.2 | 46.1 |
| Dried Solids Collected (100 mesh) | 1.7 | 8.0 | 0.30 |
| Particle Size (nm) | 268 | 238 | 265 |
| Viscosity (LVT 1 at 60 rpm) | 11.9 | 17.0 | 18.9 |
| pH | 7.9 | 8.1 | 7.9 |

TABLE 11d

Characterization of Examples 46–53, 74–82

| Examples | Scrap (phr) | Shear Stable | Freeze-Thaw Cycles | MFFT (°C.) | % Allyl Survival | Latex Gel Fraction Latex (X100) | Swell Ratio of Latex |
|---|---|---|---|---|---|---|---|
| 46 | 0.0305 | Yes | 5 | 12.7 | 90.7 | 77.9 | 5.4 |
| 47 | 0.0482 | Yes | 5 | 16 | 100 | 72.4 | 6.486 |
| 48 | 2.04 | Yes | 5 | 16.2 | 99.5 | 79.4 | 5.915 |
| 49 | 0.0321 | Yes | 5 | 7.8 | 99.4 | 72.1 | 6.289 |

TABLE 11d-continued

Characterization of Examples 46–53, 74–82

| Examples | Scrap (phr) | Shear Stable | Freeze-Thaw Cycles | MFFT (°C.) | % Allyl Survival | Latex Gel Fraction Latex (X100) | Swell Ratio of Latex |
|---|---|---|---|---|---|---|---|
| 50 | 0.137 | Yes | 0 | 5.8 | 93.96 | 80.4 | 4.927 |
| 51 | 0.0763 | Yes | 0 | 6.9 | 100 | 82.6 | 5.231 |
| 52 | 0.12 | Yes | 5 | 6.8 | 96.4 | 81.5 | 6.038 |
| 53 | 0.289 | Yes | 5 | 7.8 | 100 | 68.1 | 7.531 |
| 74 | 0.171 | Yes | 5 | 22 | 86.8 | 80.5 | 5.458 |
| 75 | 0.275 | Yes | 5 | 22 | 91 | 71.6 | 7.032 |
| 76 | 0.47 | Yes | 5 | 18 | 90 | 79.7 | 6.119 |
| 77 | 0.267 | Yes | 5 | 19 | 73.5 | 77.7 | 6.063 |
| 78 | 0.551 | Yes | 0 | 11 | 90.5 | 80.5 | 6.001 |
| 79 | 1.142 | Yes | 0 | 10 | 96.7 | 67.6 | 8.575 |
| 80 | 0.138 | Yes | 0 | 11.8 | 73.8 | 76.5 | 6.113 |
| 81 | 0.648 | Yes | 0 | 15.6 | 82.4 | 71.3 | 6.813 |
| 82 | 0.02 | Yes | 0 | 14.7 | 98.9 | 72.8 | 6.782 |

TABLE 11e

(Analysis of Examples 46–53, 65–73)

| Variables | Fr.-Thaw | % Allyl Survival | Latex Gel Fraction | Latex Swell Ratio | MFFT: Resist |
|---|---|---|---|---|---|
| Ave. Value | 2.9 | 92 | 76 | 6.2807 | 13.2 |
| BA(0) vs. 2-EHA (1) | 0 | (12) | 0 | 0 | (−6.2) |
| AAEM (0 to 2%) | 0 | 0 | 0 | 0 | 0 |
| Mercaptan (0.25 to 1.2%) | 0 | 0 | (−4) | 0 | (−2.2) |
| TMPTA (0.1 to 0.2%) | 0 | 0 | (6.6) | (−1) | 0 |
| Tg (−5 to 15° C.) | (11) | 0 | 0 | 0 | (7.2) |
| Interactions | No | Yes | Yes | Yes | Yes |
| R2 | 0.5464 | 0.6369 | 0.7987 | 0.477 | 0.9099 |

Table 12a

The latex particles contain 4 percent by weight of allyl methacrylate, and are prepared from styrene (20 weight percent), 2-ethylhexyl acrylate, methyl methacrylate, tri-metholylpropane triacrylate (TMPTA), 2-ethylhexyl 3-mercaptopropionate, and the sodium salt of 2-acrylamido-2-methylpropane sulfonate (AMPS). In addition, monomer acetoacetoxyethyl methacrylate is added as a variable. The shell of core/shell particles have a calculated Tg of −5° C., and the Tg of the core is varied to obtain overall Tg of the core/shell particles. The monomer percents shown below are based on total monomer weight of the latex particles.

Variable 1: Dimethylaminoethyl Methacrylate (DMAEMA) (0) versus t-BAMA (1)
Variable 2: AAEM (0 versus 2%)
Variable 3: 2-ethylhexyl 3-mercaptopropionate, (0.25 versus 1.17%)
Variable 4: TMPTA (0.1 versus 0.2%)
Variable 5: (Shell Tg Calculated, −5° C., core Tg adjusted to give overall Tg of −5° C. to 15° C.)

TABLE 12a

| Examples | Amine t-BAMA = 1 DMAEMA = 0 | Percent AAEM | Percent Mercaptan | Percent TMPTA | Glass Transition Temperature (°C.) |
|---|---|---|---|---|---|
| 83 | 1 | 2 | 1.17 | 0.2 | 15 |
| 84 | 1 | 2 | 0.25 | 0.1 | 15 |
| 85 | 1 | 0 | 0.25 | 0.2 | 15 |
| 86 | 1 | 0 | 1.17 | 0.1 | 15 |
| 50 | 1 | 2 | 1.17 | 0.2 | −5 |
| 51 | 1 | 2 | 0.25 | 0.1 | −5 |
| 52 | 1 | 0 | 0.25 | 0.2 | −5 |
| 53 | 1 | 0 | 1.17 | 0.1 | −5 |
| 87 | 0 | 2 | 0.25 | 0.2 | 15 |
| 88 | 0 | 2 | 1.17 | 0.1 | 15 |
| 89 | 0 | 0 | 1.17 | 0.2 | 15 |
| 90 | 0 | 0 | 0.25 | 0.1 | 15 |
| 58 | 0 | 2 | 0.25 | 0.2 | −5 |
| 59 | 0 | 2 | 1.17 | 0.1 | −5 |
| 60 | 0 | 0 | 1.17 | 0.2 | −5 |
| 61 | 0 | 0 | 0.25 | 0.1 | −5 |
| 91 | 0.5 | 1 | 0.71 | 0.15 | 5 |

TABLE 12b

| | Mass(g) Ex. 83 | Mass(g) Ex. 84 | Mass(g) Ex. 85 | Mass(g) Ex. 86 | Mass(g) Ex. 87 | Mass(g) Ex. 88 |
|---|---|---|---|---|---|---|
| Monomers in Reactor Charge | | | | | | |
| Methyl Methacrylate | 52.05 | 52.22 | 52.97 | 52.89 | 52.64 | 52.94 |
| Styrene | 17.16 | 17.22 | 16.66 | 16.67 | 16.58 | 16.58 |

TABLE 12b-continued

|  | Mass(g) Ex. 83 | Mass(g) Ex. 84 | Mass(g) Ex. 85 | Mass(g) Ex. 86 | Mass(g) Ex. 87 | Mass(g) Ex. 88 |
|---|---|---|---|---|---|---|
| 2-Ethylhexyl Acrylate | 40.29 | 40.22 | 39.86 | 40.11 | 40.28 | 40.14 |
| Trimethylolpropane Triacrylate | 0.34 | 0.17 | 0.34 | 0.17 | 0.34 | 0.17 |
| Monomers in Feed 1 | | | | | | |
| Methyl Methacrylate | 319.73 | 320.76 | 325.41 | 324.89 | 323.34 | 325.20 |
| Styrene | 105.38 | 105.78 | 102.36 | 102.39 | 101.83 | 101.86 |
| 2-Ethylhexyl Acrylate | 247.49 | 247.09 | 244.85 | 246.37 | 247.44 | 246.58 |
| Trimethylolpropane Triacrylate | 2.06 | 1.03 | 2.06 | 1.03 | 2.06 | 1.03 |
| Monomers in Feed 2 | | | | | | |
| Styrene | 117.32 | 116.85 | 120.84 | 120.81 | 121.45 | 121.42 |
| 2-Ethylhexyl Acrylate | 187.50 | 199.00 | 219.00 | 208.00 | 198.00 | 187.00 |
| Allyl Methacrylate | 47.97 | 47.97 | 47.97 | 47.97 | 47.97 | 47.97 |
| Dimethylaminoethyl Methacrylate | 0.00 | 0.00 | 0.00 | 0.00 | 20.39 | 20.39 |
| t-Butylaminoethyl Methacrylate | 23.99 | 23.99 | 23.99 | 23.99 | 0.00 | 0.00 |
| 2-Ethylhexyl 3-Mercapto-propionate | 14.03 | 3.00 | 3.00 | 14.03 | 3.00 | 14.03 |
| Acetoacetoxyethyl Methacrylate | 23.99 | 23.99 | 0.00 | 0.00 | 23.99 | 23.99 |
| AMPS | 1.68 | 1.68 | 1.68 | 1.68 | 1.68 | 1.68 |
| Weight Percent Styrene in Shell | 28 | 28 | 29 | 29 | 29 | 29 |
| Percent Solids of Latex | 46.9 | 46.6 | 47.7 | 47.0 | 47.2 | 46.1 |
| Dried Solids Collected (100 mesh) | 18.3 | 0.7 | 19.3 | 6.3 | 0.7 | 0.3 |
| Particle Size (nm) | 232 | 242 | 261 | 271 | 251 | 232 |
| Viscosity (LVT 1 at 60 rpm) | 17.6 | 16.1 | 18.6 | 15.0 | 46.9 | 20.9 |
| pH | 7.5 | 7.4 | 7.9 | 7.8 | 7.84 | 7.6 |

TABLE 12c

|  | Mass(g) Ex. 89 | Mass(g) Ex. 90 | Mass(g) Ex. 91 | Mass(g) Ex. 92 | Mass(g) Ex. 93 | Mass(g) Ex. 94 |
|---|---|---|---|---|---|---|
| Monomers in Reactor Charge | | | | | | |
| Methyl Methacrylate | 53.11 | 53.11 | 41.64 | 48.02 | 43.49 | 41.20 |
| Styrene | 16.02 | 16.02 | 12.21 | 1.34 | 5.96 | 8.27 |
| 2-Ethylhexyl Acrylate | 40.36 | 40.54 | 55.73 | 60.22 | 60.13 | 60.11 |
| Trimethylolpropane Triacrylate | 0.34 | 0.17 | 0.25 | 0.25 | 0.25 | 0.25 |
| Monomers in Feed 1 | | | | | | |
| Methyl Methacrylate | 326.23 | 326.23 | 255.79 | 294.98 | 267.13 | 253.11 |
| Styrene | 98.43 | 98.40 | 75.02 | 8.24 | 36.59 | 50.77 |
| 2-Ethylhexyl Acrylate | 247.95 | 249.01 | 342.32 | 369.91 | 369.40 | 369.25 |
| Trimethylolpropane Triacrylate | 2.06 | 1.03 | 1.55 | 1.55 | 1.55 | 1.55 |
| Monomers in Feed 2 | | | | | | |
| Styrene | 125.41 | 125.44 | 152.63 | 230.28 | 197.31 | 180.82 |
| 2-Ethylhexyl Acrylate | 207.00 | 218.00 | 171.50 | 176.00 | 161.00 | 153.50 |
| Allyl Methacrylate | 47.97 | 47.97 | 47.97 | 0.00 | 47.97 | 47.97 |
| Dimethylaminoethyl Methacrylate | 20.39 | 20.39 | 10.19 | 0.00 | 0.00 | 0.00 |
| t-Butylaminoethyl Methacrylate | 0.00 | 0.00 | 11.99 | 0.00 | 0.00 | 23.99 |
| 2-Ethylhexyl 3-Mercapto-propionate | 14.03 | 3.00 | 8.52 | 8.52 | 8.52 | 8.52 |
| Acetoacetoxyethyl Methacrylate | 0.00 | 0.00 | 11.99 | 0.00 | 0.00 | 0.00 |
| AMPS | 1.68 | 1.68 | 1.68 | 1.68 | 1.68 | 1.68 |
| Weight Percent Styrene in Shell | 30 | 30 | 36 | 55 | 47 | 43 |
| Percent Solids of Latex | 45.4 | 46.6 | 46.2 | 47 | 46 | 46 |
| Dried Solids Collected (100 mesh) | 3.8 | 17.1 | 0.60 | 0.05 | 4.4 | 16.08 |
| Particle Size (nm) | 265 | 247 | 235 | 325 | 292 | 251 |
| Viscosity (LVT 1 at 60 rpm) | 14.9 | 16.8 | 20.4 | 18.4 | 17.2 | 17.9 |
| pH | 7.9 | 7.7 | 7.8 | 7.2 | 7.5 | 8.2 |

TABLE 12d

| Examples | Scrap (phr) | Shear Stable | Freeze-Thaw Cycles | MFFT (°C.) | % Allyl Survival | Latex Gel Fraction (X100) | Swell Ratio of Latex |
|---|---|---|---|---|---|---|---|
| 83 | 1.47 | Yes | 2 | 12.7 | 81.4 | 73.2 | 5.634 |
| 84 | 0.05 | Yes | 4 | 13.8 | 78 | 73.4 | 5.595 |
| 85 | 1.55 | Yes | 0 | 15.5 | 72.9 | 80.5 | 5.331 |
| 86 | 0.5 | Yes | 0 | 15.5 | 75.5 | 74 | 6.225 |
| 50 | 0.137 | Yes | 0 | 5.8 | 93.96 | 80.4 | 4.927 |
| 51 | 0.0763 | Yes | 0 | 6.9 | 100 | 82.6 | 5.231 |
| 52 | 0.12 | Yes | 5 | 6.8 | 96.4 | 81.5 | 6.038 |
| 53 | 0.289 | Yes | 5 | 7.8 | 100 | 68.1 | 7.531 |
| 87 | 0.05 | Yes | 5 | 13.6 | 92.5 | 74.3 | 5.106 |
| 88 | 0.02 | Yes | 0 | 9 | 90.5 | 48 | 5.274 |
| 89 | 0.3 | Yes | 0 | 9.9 | 96.4 | 63.9 | 6.67 |
| 90 | 1.35 | Yes | 0 | 10.8 | 83.5 | 76.3 | 8.05 |
| 58 | 0.996 | Yes | 3 | 7.2 | 100 | 79.8 | 5.608 |
| 59 | 0.221 | Yes | 5 | 7.9 | 100 | 62.5 | 7.38 |
| 60 | 0.13 | Yes | 5 | 7.2 | 96 | 71.9 | 5.389 |
| 61 | 0.0402 | Yes | 0 | 4.7 | 100 | 72.8 | 6.596 |
| 90 | 0.05 | Yes | 5 | — | 100 | 69.5 | — |

TABLE 12e (Analysis of Examples 83–86, 50–53, 87–90, 58–61, 90)

| Variables | Output Fr.-Thaw | Output % Allyl Survival | Output Gel Fraction | Output Swell Ratio | Output MFFT: Resist |
|---|---|---|---|---|---|
| Ave. Value | 2.3 | 92 | 72.5 | 6.032 | 9.28 |
| DMAEMA (0) vs. t-BAMA (1) | 0 | (–7.6) | (8.0) | 0 | 0 |
| AAEM (0 to 2%) | 0 | 0 | 0 | (–0.44) | 0 |
| Mercaptan (0.25 to 1.2%) | 0 | 0 | (–9.8) | 0 | 0 |
| TMPTA (0.1 to 0.2%) | 0 | 0 | (6) | (–9) | |
| Tg (15° to –5° C.) | 0 | (–14.4) | 0 | 0 | (5.8) |
| Interactions | Yes | Yes | No | No | No |
| R2 | 0.2262 | 0.8354 | 0.6676 | 0.4658 | 0.4787 |

EXAMPLE 95

The Use of AEROSOL OT-75 in Place of Other Anionic Surfactants

The latex was prepared using essentially procedure 6 and the monomer composition from Example 95 (Table 19a) except that AEROSOL OT-75 was substituted for the TREM LF-40 and AEROSOL 18. Electron micrograph showed a broad particle size distribution where each particle has the core/shell morphology. The product is characterized in Table 19b.

EXAMPLE 96

The Use of AQ55D POLYESTER (Eastman Chemical Company) Surfactant

The latex was prepared using essentially procedure 6 and the monomer composition from Example 96 (Table 19a) except that 40.2 g of AQ55D POLYESTER (Eastman Chemical Company)(31% in water) were added in the initial reactor charge. No TREM LF-40 or AEROSOL 18 was used in the polymerization of the latex. The product is characterized in Table 19b.

EXAMPLES 97–98

The Use of Power Feed

The latexes were prepared using essentially procedure 6 and the monomer compositions described in Examples 97 and 98 (Table 19a) except that feed tank two was fed into feed tank one at 3.1 g/minutes while emulsion from feed tank one was fed into the reactor at 8.38 g/minutes. Example 98 was shown by electron micrograph to have a continuous styrene-rich shell. The product is characterized in Table l9b.

EXAMPLES 99–100

The Preparation of Allyl group-containing Waterborne Polymer

The latexes were prepared using essentially procedure 6 and the monomer compositions described in Table 19a. The product is characterized in Table 19b.

EXAMPLE 101

The Preparation of Allyl group-containing Waterborne Polymer Using a Reactive Surfactant The latex was prepared using essentially procedure 6 and the monomer compositions described in Example 95 (Table 19a) except that HITENOL HS-20 was substituted for the TREM LF-40 in the initial reactor charge and first emulsion feed. The product is characterized in Table 19b.

EXAMPLE 102

The Preparation of Allyl group-containing Waterborne Polymer Using a Reactive Surfactant The latex was prepared using essentially procedure 6 and the monomer compositions described in Example 95 (Table 19a) except that HITENOL HS-20 was substituted for the TREM LF-40 in the initial reactor charge and first emulsion feed, and substituted for AEROSOL 18 in the second monomer feed. The product is characterized in Table 19b.

TABLE 19a

|  | Mass(g) Ex. 95 | Mass(g) Ex. 96 | Mass(g) Ex. 97 | Mass(g) Ex. 98 | Mass(g) Ex. 99 | Mass(g) Ex. 100 |
|---|---|---|---|---|---|---|
| Monomers in Reactor Charge | | | | | | |
| Methyl Methacrylate | 41.20 | 41.20 | 41.20 | 52.96 | 35.26 | 38.61 |
| Styrene | 8.26 | 8.27 | 8.27 | 16.66 | 8.54 | 7.84 |
| 2-Ethylhexyl Acrylate | 60.11 | 60.11 | 60.11 | 39.95 | 65.86 | 0.00 |
| Trimethylolpropane Triacrylate | 0.25 | 0.25 | 0.25 | 0.25 | 0.17 | 0.17 |
| Butyl Acrylate | | | | | | 63.20 |
| Monomers in Feed 1 | | | | | | |
| Methyl Methacrylate | 253.10 | 253.11 | 253.11 | 325.30 | 216.59 | 237.22 |
| Styrene | 50.77 | 50.77 | 50.77 | 102.37 | 52.46 | 48.16 |
| 2-Ethylhexyl Acrylate | 369.25 | 369.25 | 369.25 | 245.45 | 404.58 | 0.00 |
| Trimethylolpropane Triacrylate | 1.55 | 1.55 | 1.55 | 1.55 | 1.03 | 1.03 |
| Butyl Acrylate | | | | | | 388.25 |
| Monomers in Feed 2 | | | | | | |
| Butyl Acrylate | | | | | | 132.00 |
| Styrene | 180.82 | 180.82 | 180.82 | 120.82 | 178.85 | 183.85 |
| 2-Ethylhexyl Acrylate | 153.5 | 153.5 | 153.5 | 213.5 | 137.00 | 0.00 |
| Allyl Methacrylate | 47.97 | 47.97 | 47.97 | 47.97 | 47.97 | 47.97 |
| t-Butylaminoethyl Methacrylate | 23.99 | 23.99 | 23.99 | 23.99 | 23.99 | 23.99 |
| 2-Ethylhexyl 3-Mercapto-propionate | 8.52 | 8.52 | 8.52 | 8.52 | 3.00 | 3.00 |
| Acetoacetoxyethyl Methacrylate | 0.00 | 0.00 | 0.00 | 0.00 | 23.99 | 23.99 |
| AMPS | 1.68 | 1.68 | 1.68 | 1.68 | 1.68 | 1.68 |
| Weight Percent Styrene in Shell | 43 | 43 | 43 | 29 | 43 | 44 |
| Percent Solids of Latex | 46 | 46.1 | 46.4 | 46.5 | 46.9 | 46.4 |
| Dried Solids Collected (100 mesh) | 25 | 18.1 | 2.5 | 0.70 | 2.6 | 0.20 |
| Particle Size (nm) | 229 | 251 | 290 | 295 | | |
| Viscosity (LVT 1 at 60 rpm) | 20.5 | 14.9 | 18.1 | 19.9 | | |

TABLE 19b

| Examples | Scrap (phr) | Shear Stable | Freeze-Thaw Cycles | MFFT (°C.) | % Allyl Survival | Latex Gel Fraction (X100) | Swell Ratio of Latex |
|---|---|---|---|---|---|---|---|
| 92 | 0.004 | Yes | 1 | 8.4 | — | 56.1 | 5.2 |
| 93 | 0.354 | Yes | 1 | 8.9 | 98 | 69.4 | 7.0 |
| 94 | 1.29 | Yes | 5 | 100 | | | |
| 95 | 2.04 | Yes | 0 | 9 | 99.1 | | |
| 96 | 1.45 | Yes | 5 | 8 | 92.4 | | |
| 97 | 0.201 | Yes | 5 | 8 | 93.1 | | |
| 98 | 0.056 | Yes | 0 | 11.3 | 79.2 | | |
| 99 | 0.209 | — | — | | | | |
| 100 | 0.016 | — | — | | | | |
| 101 | 31.3 | Yes | 5 | 4.2 | 100 | | |
| 102 | 12.5 | Yes | 5 | 4.7 | 91.8 | | |

EXAMPLE 103
The Preparation of Allyl group-containing Waterborne Polymers Using Hydroxybutenyl Methacrylate The latex was prepared using essentially procedure 6 and the monomer compositions described in Example 99 except that hydroxybutenyl methacrylate was substituted for the allyl methacrylate in the second monomer feed. The emulsion was filtered through 100 mesh wire screen, the solids which were collected (1.1 g) dried. Latex, 47% solids.

EXAMPLE 104
The Preparation of Allyl group-containing Waterborne Polymers Using Hydroxybutenyl Methacrylate The latex was prepared using essentially procedure 6 and the monomer compositions described in Example 99 except that hydroxybutenyl methacrylate was substituted for the allyl methacrylate in the second monomer feed. The emulsion was filter through 100 mesh wire screen, the solids which were collected (1.0 g) dried. Latex, 47% solids.

EXAMPLE 105
The Preparation of Allyl group-containing Waterborne Polymers Using a poly(glycidyl allyl ether) and allyl methacrylate The latexes were prepared using procedure 6 except that initial monomer charged to the reactor contained 48.72 g of methyl methacrylate, 14.10 g of styrene, 49.79 g of 2-ethylhexyl acrylate, and 0.335 g of trimethylolpropane triacrylate. In addition to the surfactants and water described in procedure 6, the first emulsion feed contained 299.26 g of methyl methacrylate, 86.64 g of styrene, 305.91 g of 2-ethylhexyl acrylate, and 2.06 g of trimethylolpropane triacrylate. The second emulsion feed contained 40 g of methyl methacrylate, 139.11 g of styrene, 145 g of 2-ethylhexyl acrylate, 47.97 g of allyl methacrylate, 20.39 g of dimethylaminoethyl methacrylate, and 24 g of the poly (glycidyl allyl ether), MONSANTOLINK XI-100. Solids, 47.0; solids collected (100 mesh screen), 9.2 g; Particle Size, 160 nm; pH, 7.26; Infrared Absorbance, 1647 cm$^{-1}$. Based on infrared analysis, the allyl survival (based on allyl methacrylate only) is much greater than 100% showing the poly(glycidyl allyl ether) is grafted to the latex particle.

EXAMPLE 106

Preparation of Waterborne Allyl Methacrylate-Containing Polymers Using Butyl Methacrylate as a Monomer To a 3000 mL resin kettle equipped with a condenser, nitrogen purge, and subsurface feed tube were added 640 g of water, 4.05 g of TREM LF-40, 1.93 g of TERGITOL NP-40(70%), and 7.3 g of sodium carbonate, 54.8 g of methyl methacrylate, 0.77 g of butyl methacrylate, 54.00 g of 2-ethylhexyl acrylate, and 0.25 g of trimethylolpropane triacrylate. A nitrogen purge was begun, then the contents of the reactor brought up to 80° C. at 400 rpm. After reaching 80° C., an initiator charge composed of 7.70 g of sodium persulfate dissolved in 43.6 g of water was added to the reactor. An emulsion feed composed of 355 g of water, 13.01 g of TREM LF-40, 10.21 g of TERGITOL NP-40 (70%), 336.64 g of methyl methacrylate, 4.76 g of butyl methacrylate, 331.72 g of 2-ethylhexyl acrylate, and 1.54 g of trimethylolpropane triacrylate was begun. Five minutes after the first emulsion feed was begun, an initiator solution composed of 4.36 g of sodium persulfate dissolved in 112 g of water was fed in at 0.536 g/min. After the first emulsion feed was completed, a second emulsion feed composed of 171 g of water, 12.79 g of Aerosol 18, 5.09 g of TERGITOL NP-40 (70%), 243.32 g of butyl methacrylate, 100 g of 2-ethylhexyl acrylate, 47.97 g of allyl methacrylate, 23.99 g of t-butylaminoethyl methacrylate, 8.51 g of 2-ethylhexyl 3-mercaptopropionate, and 1.68 g of sodium 2-acrylamido-2-methylpropanesulfonate (50% in water) was fed into the reactor at 8.375 g/min. Five minutes after the last feed, an initiator solution of 1.34 g of t-butyl-hydroperoxide, and 1.34 g of sodium formaldehyde sulfoxylate dissolved in 40.2 g of water was charged and heating continued for 30 minutes. The emulsion was cooled then filtered through 100 mesh wire screen. Solids Level, 47.1%; dried material collected, 1.5 g; Particle Size, 271 nm; pH, 7.9; allyl survival, 15.2%.

EXAMPLE 107

Preparation of Waterborne Allyl Methacrylate-Containing Polymers Using Isobornyl Methacrylate as a Monomer To a 3000 mL resin kettle equipped with a condenser, nitrogen purge, and subsurface feed tube were added 640 g of water, 4.05 g of TREM LF-40, 1.93 g of TERGITOL NP-40(70%), and 7.3 g of sodium carbonate, 38.28 g of methyl methacrylate, 10.43 g of Isobornyl methacrylate, 60.86 g of 2-ethylhexyl acrylate, and 0.25 g of trimethylolpropane triacrylate. A nitrogen purge was begun, then the contents of the reactor brought up to 80° C. at 400 rpm. After reaching 80° C., an initiator charge composed of 7.70 g of sodium persulfate dissolved in 43.6 g of water were added to the reactor. An emulsion feed composed of 355 g of water, 13.01 g of TREM LF-40, 10.21 g of TERGITOL NP-40 (70%), 336.64 g of methyl methacrylate, 4.76 g of butyl methacrylate, 331.72 g of 2-ethylhexyl acrylate, and 1.54 g of trimethylolpropane triacrylate was begun. Five minutes after the first emulsion feed was begun, an initiator solution composed of 4.36 g of sodium persulfate dissolved in 112 g of water was fed in at 0.54 g/min. After the first emulsion feed was completed, a second emulsion feed composed of 171 g of water, 12.79 g of AEROSOL 18, 5.09 g of TERGITOL NP-40 (70%), 243.32 g of butyl methacrylate, 100 g of 2-ethylhexyl acrylate, 47.97 g of allyl methacrylate, 23.99 g of t-butylaminoethyl methacrylate, 8.51 g of 2-ethylhexyl 3-mercaptopropionate, and 1.68 g of 2-acrylamido-2-methylpropanesulfonate (50% in water) was fed into the reactor at 8.38 g/min. Five minutes after the last feed, an initiator solution of 1.34 g of t-butylhydroperoxide, and 1.34 g of sodium formaldehyde sulfoxylate dissolved in 40.2 g of water was charged and heating continued for 30 minutes. The emulsion was cooled then filtered through 100 mesh wire screen. Solids Level, 47.1%; dried material collected, 1.5 g; Particle Size, 271 nm; pH, 7.9; allyl survival, 15.2%.

EXAMPLE 108

Preparation of Waterborne Allyl Methacrylate-Containing Polymers Using Only 10% Styrene for the Particles To a 3000 mL resin kettle equipped with a condenser, nitrogen purge, and subsurface feed tube were added 640 g of water, 4.05 g of TREM LF-40, 1.93 g of TERGITOL NP-40(70%), and 7.3 g of sodium carbonate, 63.83 g of methyl methacrylate, 5.38 g of styrene, 40.36 g of 2-ethylhexyl acrylate, and 0.25 g of trimethylolpropane triacrylate. A nitrogen purge was begun, then the contents of the reactor brought up to 8° C. at 400 rpm. After reaching 80° C., an initiator charge composed of 7.70 g of sodium persulfate dissolved in 43.6 g of water were added to the reactor. An emulsion feed composed of 355 g of water, 11.7 g of TREM LF-40, 10.21 g of TERGITOL NP-40 (70%), 392.1 g of methyl methacrylate, 33.10 g of styrene, 247.94 g of 2-ethylhexyl acrylate, and 1.55 g of trimethylolpropane triacrylate was begun. Five minutes after the first emulsion feed was begun, an initiator solution composed of 4.36 g of sodium persulfate dissolved in 112 g of water was fed in at 0.536 g/min. After the first emulsion feed was completed, a second emulsion feed composed of 171 g of water, T12.79 g of Aerosol 18, 5.09 g of TERGITOL NP-40 (70%), 40 g of methyl methacrylate, 81.45 g of styrene, 210 g of 2-ethylhexyl acrylate, 47.97 g of allyl methacrylate, 20.39 g of dimethylaminoethyl methacrylate, 3.00 g of 2-ethylhexyl 3-mercaptopropionate, 12.00 g of acetoacetyl methacrylate, and 1.68 g of 2-acrylamido-2-methylpropanesulfonate (50% in water) was fed into the reactor at 8.38 g/min. Five minutes after the last feed, a post catalyst solution of 1.34 g of t-butylhydroperoxide, and 1.34 g of sodium formaldehyde sulfoxylate dissolved in 40.2 g of water was charged and heating continued for 30 minutes. The emulsion was cooled than filtered through 100 mesh wire screen. Solids Level, 46.7%; dried material collected, 1.9 g.

EXAMPLE 109

Preparation of Waterborne Allyl Methacrylate-Containing Polymers Using 45% Styrene To a 3000 mL resin kettle equipped with a condenser, nitrogen purge, and subsurface feed tube were added 640 g of water, 4.05 g of TREM LF-40, 1.93 g of TERGITOL NP-40(70%), and 7.3 g of sodium carbonate, 10.94 g of methyl methacrylate, 58.55 g of styrene, 40.08 g of 2-ethylhexyl acrylate, and 0.25g of trimethylolpropane triacrylate. A nitrogen purge was begun, then the contents of the reactor brought up to 80° C. at 400 rpm. After reaching 80° C., an initiator charge composed of 7.70 g of sodium persulfate dissolved in 43.6 g of water were added to the reactor. An emulsion feed composed of 355 g of water, 11.7 g of TREM LF-40, 10.21 g of TERGITOL NP-40 (70%), 67.21 g of methyl methacrylate, 359.68 g of styrene, 246.23 g of 2-ethylhexyl acrylate, and 1.55 g of trimethylolpropane triacrylate was begun. Five minutes after the first emulsion feed was begun, an initiator solution composed of 4.36 g of sodium persulfate dissolved in 112 g of water was fed in at 0.536 g/min. After the first emulsion feed was completed, a second emulsion feed composed of 171 g of water, 12.79 g of Aerosol 18, 5.09 g of TERGITOL NP-40 (70%), 10 g of methyl methacrylate, 212.45 g of styrene, 200 g of 2-ethylhexyl acrylate, 47.97 g of allyl methacrylate, 20.39 g of dimethylaminoethyl methacrylate, 3.00 g of 2-ethylhexyl 3-mercaptopropionate, 12.00 g of acetoacetyl methacrylate, and 1.68 g of 2-acrylamido-2-methylpropanesulfonate (50% in water) was fed into the reactor at 8.38 g/min. Five minutes after the last feed, an initiator solution of 1.34 g of t-butylhydroperoxide, and 1.34 g of sodium formaldehyde sulfoxylate dissolved in 40.2 g of water was charged and heating continued for 30 minutes. The emulsion was cooled than filtered through 100 mesh wire screen. Solids Level, 46.4%; dried material collected, 14.8 g.

EXAMPLE 110

Preparation of Waterborne Allyl Methacrylate-Containing Polymers Containing a Cobalt Drier The same procedure to prepare the latex in Example 78 was used except that 8.32 g of AQUACAT cobalt drier was added to the monomer feed. Latex solids: 47%; filterable solids, 2 g (100 mesh wire screen). The latex was slightly pink in color.

EXAMPLE 111

Preparation of Waterborne Allyl Methacrylate-Containing Polymers Containing a Cobalt Drier The procedure was similar to the procedure in Example 110 except the AEROSOL OT-75 was substituted for Aerosol 18. Latex Filterable solids, >100 g (100 mesh wire screen).

EXAMPLE 112

Cure Studies on Clear Films Prepared from Example 26 and 27 Prepared with and without a Cobalt Drier To 25 of latex from Examples 26 and 27 were added 0.05 g of FC-430, and 0.93 g of SURFYNOL 104DPM. The above procedure was repeated except that in addition to the FC-430 and SURFYNOL 104DPM, 0.93 g of AQUACAT drier was added. Samples were cast over release paper, then cured in a forced-air oven for 30 minutes. The dry film thickness of the samples was 1 mil. Samples of cured films were taken, and their gel fraction determined. The results are shown in FIG. 4.

EXAMPLE 113

Cure Studies on Clear Films Prepared from Example 29 through 45 Prepared without a Cobalt Drier Samples of a latex were drawn over release paper and cured at room temperature for 37 days. The dry film thickness of the samples was 1 mil. At selected intervals, films were taken and their swell ratio determined. Plots were constructed as illustrated in FIG. 5. Linear correlation were done for each plot, and the change in swell ratio per day obtained from the slope of the plot. This data is shown in Table 8b. A negative value shows that the swell ratio of the dried films decreases with time; thus, crosslinking is occurring at room temperature.

EXAMPLE 114

Cure Studies on Clear Films Prepared from Example 99 using a Cobalt Drier, Methylene Blue, and a poly(glycidyl allyl ether) as Crosslinking Catalysts To 25 g of the latex from Examples 99 was added 0.94 g of HYDROCURE II. To a second sample was added 0.05 g methylene blue. To a third sample were added 0.94 g of HYDROCURE II, 0.05 g of methylene blue, and 0.94 of MONSANTOLINK XI-100. Samples were stirred overnight, then cast over release paper and air dried at room temperature at 50% relative humidity. The dry film thickness of the samples was 1 mil. Samples of cured films were taken, and their gel fraction and molecular weight between crosslink points determined. The results are shown in FIGS. 6 and 7. The results show that methylene blue by itself is not an effective catalyst; however, cobalt drier or combination of cobalt driers and methylene blue promote crosslinking.

EXAMPLE 115

Solvent Resistance Evaluation of Latexes from Examples 52, 78, 90, 99, and 108

Preparation of the filming aid emulsion: An emulsion was prepared from a solution of 0.192 g of AEROSOL OT-75 and 0.143 g of TERGITOL NP-6 to 7.2 g of pentaerythritol triacrylate and pentaerythritol tetraacrylate. This solution was stirred into 14.4 g of water which contained 0.14 g of TERGITOL NP-40 (70) to give a white emulsion of the acrylates.

Preparation of an emulsion containing AQUACAT: To 20 g of latex was added with stirring 0.197 g of aquacat drier. Stirring was continued for at least 15 minutes.

Preparation of an emulsion containing filming aid and aquacat: To 20 g of latex was added with stirring 0.73 g of acrylate emulsion. Stirring was continued for 15 minutes, then 0.197 g of AQUACAT drier was added.

Evaluation of Films

Four-mil wet samples were cast over aluminum panels, air dried for 15 minutes, then cured for the required profile in a forced-air oven or at room temperature (72° F.). The methyl ethyl ketone (MEK) resistance of the films were then determined using a standard testing procedure. The results are shown in Table 20.

TABLE 20

| Latex Example | Cure Temp. (°C.) | AQUACAT | Filming Aid | MEK Double Rubs Age of Formulation 4 hrs/24 hrs |
|---|---|---|---|---|
| 52 | 130 | Yes | Yes | 115/66 |
| 78 | 140 | Yes | Yes | 176/145 |
| 78 | 120 | Yes | Yes | —/145 |
| 78 | 110 | Yes | Yes | —/80 |
| 78 | Room | Yes | Yes | —/127 |

TABLE 20-continued

| Latex Example | Cure Temp. (°C.) | AQUACAT | Filming Aid | MEK Double Rubs Age of Formulation 4 hrs/24 hrs |
|---|---|---|---|---|
| | Temperature | | | |
| 90 | 140 | Yes | Yes | 164/— |
| 90 | 130 | Yes | Yes | 39/31 |
| 99 | 150 | None | None | 43/— |
| 99 | 150 | Yes | None | 186/— |
| 99 | 130 | Yes | None | 150/— |
| 99 | 140 | Yes | Yes | 147/— |
| 99 | 120 | Yes | Yes | 86/— |
| 104 | 140 | Yes | Yes | 164/— |
| 104 | 130 | Yes | Yes | 156/103 |
| 104 | 120 | Yes | Yes | —/101 |
| 108 | 140 | Yes | Yes | 149/— |
| 108 | 120 | Yes | Yes | 55/— |
| 110 | 150 | * | None | 128/— |
| 110 | 140 | * | Yes | —/160 |

Filming Aids: 1.8 phr pentaerythritol triacrylate, 1.8 phr pentaerythritol tetracrylate Catalyst: 0.1 phr AQUACAT (Cobalt Active). The room temperature sample was cured for 5 days.
*AQUACAT was added to the monomer feed.

EXAMPLE 116

Preparation of Low Volatile Organic Compound (V.O.C.) Grind

Low VOC Grind

A 15 gallon grind was prepared using a Premier disperser, as below, and a portion of the grind was used to letdown each specified paint.

| Material: | Volume: |
|---|---|
| Water | 40.00 |
| TAMOL 1124 | 4.00 |
| TRITON CF-10 | 2.00 |
| Ethylene Glycol | 2.00 |
| FOAMASTER AP | 2.00 |
| DOWICIL 75 | 1.00 |

Disperse well then add under agitation:
  TI-PURE R-900 200.00
Cowles until the grind passes 7+ Hegman then add:
  Water 25.00
Filter through a Fulflo filter and store.

EXAMPLE 117

Preparation of Low V.O.C. Paints using Emulsions from Examples 47, 48, 62, 73, 76, 80, 81, 82, 83, 87, 92, 93, 94 and 98

Paint Letdown:

| Material: | | Ex. 47 | Ex. 48 | Ex. 62 | Ex. 73 |
|---|---|---|---|---|---|
| Ex. 116 Grind | | 345.0 | 345.0 | 345.0 | 345.0 |
| Ex. Emulsion | | 598.4 | 598.4 | 598.4 | 598.4 |
| EKTASOLVE EB | | 16.6 | 16.6 | 16.6 | 16.6 |
| FOAMASTER AP | Premix | 2.52 | 2.52 | 2.52 | 2.52 |
| FOAMASTER VF | | 3.75 | 3.75 | 3.75 | 3.75 |
| Water | | 127.7 | 127.7 | 127.7 | 127.7 |
| Adjust pH to 8.3 to 8.7 using 28% ammonia below: | | | | | |
| NH₄OH | | 0.1 | 0.1 | 0.1 | 0.1 |
| Then add: | | | | | |
| Water | Premix | 75.0 | 75.0 | 75.0 | 75.0 |
| ACRYSOL RM-5 | | 55.0 | 55.0 | 55.0 | 55.0 |
| Adjust pH to 8.3 to 8.7 using 28% ammonia below: | | | | | |
| NH₄OH | | 4.1 | 4.1 | 4.1 | 4.1 |
| Then add: | | | | | |
| Cellosize 4400H | premix | 1.25 | 1.25 | 1.25 | 1.25 |
| Water | | 25.0 | 25.0 | 25.0 | 25.0 |
| Resulting pH: | | 8.3 | 8.6 | 8.5 | 8.4 |
| KU Viscosity: | | 78 | 77 | 77 | 79 |
| 60 Degree gloss: | | 74 | 70 | 74 | 81 |
| 20 Degree gloss: | | 39 | 26 | 39 | 50 |

Example 117 cont::

| Material: | | Ex. 76 | Ex. 80 | Ex. 81 | Ex. 82 |
|---|---|---|---|---|---|
| Ex. 116 Grind | | 345.0 | 345.0 | 345.0 | 345.0 |
| Ex. Emulsion | | 598.4 | 598.4 | 598.4 | 598.4 |
| EKTASOLVE EG | | 16.6 | 16.6 | 16.6 | 16.6 |
| FOAMASTER AP | Premix | 2.52 | 2.52 | 2.52 | 2.52 |
| FOAMASTER VF | | 3.75 | 3.75 | 3.75 | 3.75 |
| Water | | 127.7 | 127.7 | 127.7 | 127.7 |
| Adjust pH to 8.3 to 8.7 using 28% ammonia below: | | | | | |
| NH₄OH | | 0.1 | 0.1 | 0.1 | 0.1 |
| Then add: | | | | | |
| Water | Premix | 75.0 | 75.0 | 75.0 | 75.0 |
| ACRYSOL RM-5 | | 55.0 | 55.0 | 55.0 | 55.0 |
| Adjust pH to 8.3 to 8.7 using 28% ammonia below: | | | | | |
| NH₄OH | | 4.1 | 4.1 | 4.1 | 4.1 |
| Then add: | | | | | |
| CELLOSIZE 4400H | Premix | 1.25 | 1.25 | 1.25 | 1.25 |
| Water | | 25.0 | 25.0 | 25.0 | 25.0 |
| Resulting pH: | | 8.7 | 8.5 | 8.6 | 8.5 |
| KU Viscosity: | | 78 | 76 | 78 | 77 |
| 60 degree gloss: | | 70 | 71 | 60 | 74 |
| 20 degree gloss: | | 26 | 34 | 24 | 39 |

Example 117 cont::

| Material: | | Ex. 83 | Ex. 87 |
|---|---|---|---|
| Ex. 116 Grind | | 345.0 | 345.0 |
| Ex. Emulsion | | 598.4 | 582.6 |
| EKTASOLVE EB | | 16.6 | 16.6 |
| FOAMASTER AP | Premix | 2.5 | 2.5 |
| FOAMASTER VF | | 3.75 | 3.75 |
| Water | | 127.7 | 127.7 |
| Adjust pH to 8.3 to 8.7 using 28% ammonia below: | | | |
| NH₄OH | | 0.10 | 0.3 |
| Then add: | | | |
| Water | Premix | 75.0 | 75.0 |
| ACRYSOL RM-5 | | 55.0 | 55.0 |
| Adjust pH to 8.3 to 8.7 using 28% ammonia below: | | | |
| NH₄OH | | 4.1 | 4.1 |
| Then add: | | | |
| CELLOSIZE 4400H | Premix | 1.25 | 1.25 |
| Water | | 25.0 | 25.0 |
| Resulting pH: | | 8.7 | 8.5 |
| KU Viscosity: | | 77 | 83 |
| 60 degree gloss: | | 74 | 71 |
| 20 degree gloss: | | 34 | 34 |

Example 117 cont:

| Material: | Ex. 92 | Ex. 93 | Ex. 94 | Ex. 98 |
|---|---|---|---|---|
| Ex. 116 Grind | 297.15 | 345.00 | 345.00 | 345.00 |
| Ex. Emulsion | 515.4 | 598.4 | 598.4 | 598.4 |
| EKTASOLVE EG | 14.4 | 16.6 | 16.0 | 16.6 |

-continued

| | | | | | |
|---|---|---|---|---|---|
| FOAMASTER AP | } Premix | 2.15 | 2.5 | 2.5 | 2.5 |
| FOAMASTER VF | | 3.23 | 3.75 | 3.75 | 3.75 |
| Water | | 109.99 | 127.7 | 127.7 | 127.7 |
| Adjust pH to 8.3 to 8.7 using 28% ammonia below: | | | | | |
| NH$_3$OH | | 1.0 | 0.30 | 0.10 | 0.30 |
| Then add: | | | | | |
| Water | } Premix | 64.6 | 75.0 | 75.0 | 75.0 |
| ACRYSOL RM-5 | | 47.3 | 55.0 | 55.0 | 55.0 |
| Adjust pH to 8.3 to 8.7 using 28% ammonia below: | | | | | |
| NH$_4$OH | | 5.1 | 5.5 | 4.9 | 6.66 |
| Then add: | | | | | |
| CELLOSIZE 4400H | } Premix | 1.25 | 1.25 | 1.25 | 1.25 |
| Water | | 25.0 | 25.0 | 25.0 | 25.0 |
| Resulting pH: | | 8.6 | 8.7 | 8.3 | 8.4 |
| KU Viscosity: | | 76 | 75 | 75 | 79 |
| 60 degree gloss: | | 72 | 83 | 77 | 81 |
| 20 degree gloss: | | 36 | 53 | 37 | 50 |

EXAMPLE 118

Coating Properties of Low VOC Semigloss Paints from Example 117

Paint samples were evaluated for print and block resistance. Ratings for the paints are shown on Table 21.

TABLE 21

Block and Print Resistance Properties of Low VOC Semi-gloss Paints from Examples 47, 48, 62, 73, 76, 80, 81, 82, 83, 92, 93, and 94:

| | | Block Resistance (days dry) | | | | Print Resistance (days dry) | | | |
|---|---|---|---|---|---|---|---|---|---|
| Paint: | | 1 | 2 | 7 | 21 | 1 | 2 | 7 | 21 |
| Ex. 47 | 1 day: | 2 | 2 | 1 | 1 | 3 | 3 | 2 | 2 |
| | 7 day: | 4 | 4 | 2 | 1 | 3 | 3 | 2 | 1 |
| Ex. 48 | 1 day: | 3 | 2 | 1 | 2 | 3 | 2 | 2 | 2 |
| | 7 day: | 4 | 2 | 2 | 2 | 2 | 3 | 2 | 2 |
| Ex. 62 | 1 day: | 2 | 2 | 1 | 1 | 3 | 3 | 3 | 2 |
| | 7 day: | 4 | 2 | 2 | 1 | 3 | 3 | 3 | 2 |
| Ex. 73 | 1 day: | 3 | 2 | 1 | 1 | 3 | 3 | 2 | 2 |
| | 7 day: | 3 | 2 | 2 | 2 | 3 | 3 | 2 | 2 |
| Ex. 76 | 1 day: | 2 | 2 | 1 | 1 | 3 | 3 | 1 | 3 |
| | 7 day: | 4 | 4 | 2 | 2 | 3 | 3 | 2 | 1 |
| Ex. 80 | 1 day: | 2 | 2 | 2 | 2 | 2 | 2 | 3 | 2 |
| | 7 day: | 4 | 3 | 2 | 2 | 3 | 3 | 3 | 1 |
| Ex. 81 | 1 day: | 2 | 2 | 2 | 2 | 2 | 3 | 2 | 1 |
| | 7 day: | 2 | 2 | 2 | 2 | 3 | 3 | 2 | 3 |
| Ex. 82 | 1 day: | 3 | 2 | 1 | 2 | 3 | 2 | 2 | 2 |
| | 7 day: | 4 | 2 | 2 | 2 | 3 | 3 | 3 | 3 |
| Ex. 83 | 1 day: | 2 | 2 | 2 | 2 | 3 | 3 | 2 | 2 |
| | 7 day: | 3 | 2 | 2 | 2 | 3 | 3 | 2 | 2 |
| Ex. 92 | 1 day: | 4 | 2 | 2 | 2 | 3 | 3 | 3 | 3 |
| | 7 day: | 3 | 2 | 2 | 2 | 3 | 3 | 3 | 3 |
| Ex. 93 | 1 day: | 2 | 2 | 2 | 2 | 3 | 3 | 3 | 3 |
| | 7 day: | 2 | 2 | 2 | 2 | 3 | 3 | 3 | 2 |
| Ex. 94 | 1 day: | 2 | 2 | 2 | 2 | 3 | 2 | 2 | 2 |
| | 7 day: | 2 | 2 | 2 | 2 | 3 | 3 | 3 | 3 |
| Ex. 98 | 1 day: | 2 | 2 | 2 | 2 | 3 | 3 | 2 | 2 |
| | 7 day: | 3 | 3 | 2 | 1 | 3 | 2 | 2 | 2 |

EXAMPLE 119

Preparation of Zero Volatile Organic Compound (V.O.C.) Grind

Zero VOC Grind

A 15 gallon grind was prepared using a Premier disperser, as below, and a portion of the grind was used to letdown each specified paint.

| Material: | Volume: |
|---|---|
| Water | 48.00 |
| TAMOL 1124 | 4.00 |
| TRITON CF-10 | 2.00 |
| FOAMASTER AP | 2.00 |
| DOWICIL 75 | 1.00 |

Disperse well then and add under agitation:
TI-PURE R-900 200.00
Cowles until the grind passes 7+ Hegman add:
Water 19.00
Filter through a Fulflo filter and store.

EXAMPLE 120

Preparation of Zero V.O.C. Paints using Emulsions from Examples 47, 48, 73, 76, 80, 81, 82, 83, 87, 92, 93, 94 and 98

The following paint letdowns were prepared using the zero V.O.C. grind of example 120 and emulsions of the examples shown.

Paint Letdown:

| | | Weight (g): | | | |
|---|---|---|---|---|---|
| Material: | | Ex. 47 | Ex. 48 | Ex. 73 | Ex. 76 |
| Zero VOC Grind | | 345.0 | 345.0 | 345.0 | 345.0 |
| Emulsion | | 598.4 | 598.4 | 598.4 | 598.4 |
| Water | | 6.25 | 6.25 | 6.25 | 6.25 |
| FOAMASTER AP | } Premix | 2.50 | 2.52 | 2.50 | 2.50 |
| FOAMASTER VF | | 3.75 | 3.75 | 3.75 | 3.75 |
| SURFYNOL 104 | | 6.25 | 6.25 | 6.25 | 6.25 |
| Water | | 132.25 | 132.25 | 132.25 | 132.25 |
| Then adjust pH to 8.3 to 8.7 using 28% ammonia below: | | | | | |
| NH$_4$OH | | 0.10 | 0.10 | 0.40 | 0.10 |
| Then add: | | | | | |
| Water | } Premix | 75.00 | 75.00 | 75.00 | 75.00 |
| ACRYSOL RM-5 | | 50.00 | 50.00 | 50.00 | 50.00 |
| Then adjust pH to 8.3 to 8.7 using 28% ammonia below: | | | | | |
| NH$_4$OH | | 4.60 | 4.50 | 8.0 | 6.70 |
| Then add: | | | | | |
| CELLOSIZE 4400H | } Premix | 4.60 | 4.50 | 8.0 | 6.70 |
| Water | | 23.9 | 28.5 | | |
| Resulting pH: | | 8.5 | 8.3 | 8.7 | 8.7 |
| KU Viscosity: | | 80 | 72 | 77 | 80 |
| 60 Gloss: | | 66 | 68 | 75 | 64 |
| 20 Gloss: | | 29 | 32 | 41 | 22 |

Example 120 cont.

| | | Weight (g): | | | |
|---|---|---|---|---|---|
| Material: | | Ex. 80 | Ex. 81 | Ex. 82 | Ex. 83 |
| Zero VOC Grind | | 345.0 | 345.0 | 345.0 | 345.0 |
| Emulsion | | 598.4 | 598.4 | 598.4 | 598.4 |
| Water | | 6.25 | 6.25 | 6.25 | 6.25 |
| FOAMASTER AP | } Premix | 2.50 | 2.50 | 2.50 | 2.50 |
| FOAMASTER VF | | 3.75 | 3.75 | 3.75 | 3.75 |
| SURFYNOL 104 | | 6.25 | 6.25 | 6.25 | 6.25 |
| Water | | 132.5 | 132.5 | 132.5 | 132.5 |
| Then adjust pH to 8.3 to 8.7 using 28% ammonia below: | | | | | |
| NH$_4$OH | | 0.10 | 0.10 | 0.10 | 0.10 |
| Then add: | | | | | |
| Water | } Premix | 75.00 | 75.00 | 75.00 | 75.00 |
| ACRYSOL RM-5 | | 50.00 | 50.00 | 50.00 | 50.00 |
| Then adjust pH to 8.3 to 8.7 using 28% ammonia below: | | | | | |
| NH$_4$OH | | 4.60 | 5.73 | 5.8 | 6.70 |
| Then add: | | | | | |
| CELLOSIZE 4400H | | 0.51 | 1.50 | 1.5 | 1.5 |

-continued

| | | | | | |
|---|---|---|---|---|---|
| Water | } Premix | 9.5 | 28.5 | 28.5 | 28.5 |
| Resulting pH: | | 8.5 | 8.6 | 8.6 | 8.6 |
| KU Viscosity: | | 80 | 80 | 77 | 77 |
| 60 Gloss: | | 66 | 60 | 75 | 70 |
| 20 Gloss: | | 29 | 24 | 41 | 32 |

Example 120 cont:

| Material: | | Weight (g):<br>Ex. 87 |
|---|---|---|
| Zero VOC Grind | | 345.00 |
| Emulsion | | 598.4 |
| Water | | 6.25 |
| FOAMASTER AP | } Premix | 2.50 |
| FOAMASTER VF | | 3.75 |
| SURFYNOLS 104 | | 6.25 |
| Water | | 132.25 |
| Then adjust pH to 8.3 to 8.7 using 28% ammonia below: | | |
| NH$_4$OH | | 0.40 |
| Then add: | | |
| water | } Premix | 75.00 |
| ACRYSOL RM-5 | | 50.00 |
| Then adjust pH to 8.3 to 8.7 using 28% ammonia below: | | |
| NH$_4$OH | | 6.20 |
| Resulting pH: | | 8.5 |
| KU Viscosity | | 83 |
| 60 Gloss | | 64 |
| 20 Gloss | | 27 |

Example 120 cont:

| Material: | | Ex. 92 | Ex. 93 | Ex. 94 | Ex. 98 |
|---|---|---|---|---|---|
| Zero VOC Grind | | 345.00 | 345.00 | 345.00 | 345.00 |
| Emulsion | | 598.0 | 598.0 | 598.0 | 598.0 |
| Water | | 6.25 | 6.25 | 6.25 | 6.25 |
| FOAMASTER AP | } Premix | 2.50 | 2.50 | 2.50 | 2.50 |
| FOAMASTER VF | | 3.75 | 3.75 | 3.75 | 3.75 |
| SURFYNOL 104 | | 6.25 | 6.25 | 6.25 | 6.25 |
| Water | | 132.5 | 132.5 | 132.5 | 132.5 |
| Then adjust pH to 8.3 to 8.7 using 28% ammonia below: | | | | | |
| NH$_4$OH | | 0.40 | 0.40 | 0.37 | 0.40 |
| Then add: | | | | | |
| Water | } Premix | 75.00 | 75.00 | 75.00 | 75.00 |
| ACRYSOL RM-5 | | 50.00 | 50.00 | 50.00 | 50.00 |
| Then adjust pH to 8.3 to 8.7 using 28% ammonia below: | | | | | |
| NH$_4$OH | | 6.30 | 4.89 | 6.51 | 5.18 |
| Then add: | | | | | |
| CELLOSIZE 4400H | } Premix | 0.49 | 1.06 | 0.49 | 0.49 |
| Water | | 9.81 | 21.1 | 79.89 | 9.81 |
| Resulting pH: | | 8.5 | 8.5 | 8.4 | 8.4 |
| KU Viscosity: | | 76 | 74 | 76 | 79 |
| 60 Gloss: | | 68 | 77 | 72 | 75 |
| 20 Gloss: | | 31 | 40 | 34 | 37 |

EXAMPLE 121

Coating Properties of Zero VOC Semigloss Paints from Example 120

Coatings were tested for print and blocking resistance. The ratings for the paints are shown in Table 22.

TABLE 22

Block and Print Resistance Properties of Zero VOC Semigloss Paints from Examples 47, 48, 73, 76, 80, 81, 82, 83, 87, 92, 93, 94, and 98:

| Paint: | FTF: | Block Resistance:<br>(Days Dry) | | | | Print Resistance:<br>(Days Dry) | | | |
|---|---|---|---|---|---|---|---|---|---|
| | | 1 | 2 | 7 | 21 | 1 | 2 | 7 | 21 |
| Example 47 | 1 day: | 2 | 2 | 2 | 2 | 2 | 2 | 2 | 2 |
| | 7 day: | 4 | 2 | 2 | 1 | 3 | 2 | 2 | 2 |
| Example 48 | 1 day: | 2 | 2 | 1 | 1 | 2 | 1 | 1 | 2 |
| | 7 day: | 2 | 3 | 2 | 2 | 3 | 3 | 3 | 3 |
| Example 73 | 1 day: | 3 | 2 | 1 | 2 | 3 | 3 | 1 | 2 |
| | 7 day: | 3 | 2 | 2 | 2 | 3 | 3 | 2 | 2 |
| Example 76 | 1 day: | 1 | 2 | 2 | 1 | 2 | 2 | 1 | 1 |
| | 7 day: | 2 | 2 | 2 | 1 | 1 | 2 | 2 | 1 |
| Example 80 | 1 day: | 2 | 2 | 2 | 2 | 3 | 2 | 2 | 3 |
| | 7 day: | 2 | 2 | 2 | 2 | 3 | 3 | 3 | 2 |
| Example 81 | 1 day: | 2 | 2 | 2 | 2 | 2 | 2 | 2 | 2 |
| | 7 day: | 3 | 2 | 2 | 1 | 3 | 3 | 3 | 2 |
| Example 82 | 1 day: | 2 | 2 | 1 | 1 | 4 | 3 | 2 | 2 |
| | 7 day: | 3 | 3 | 2 | 2 | 4 | 3 | 3 | 3 |
| Example 83 | 1 day: | 2 | 2 | 2 | 1 | 3 | 3 | 2 | 2 |
| | 7 day: | 2 | 2 | 2 | 2 | 3 | 3 | 3 | 2 |
| Example 87 | 1 day: | 2 | 2 | 1 | 2 | 2 | 2 | 3 | 2 |
| | 7 day: | 2 | 2 | 2 | 2 | 3 | 2 | 3 | 2 |
| Example 92 | 1 day: | 3 | 3 | 3 | 2 | 3 | 3 | 3 | 3 |
| | 7 day: | 3 | 2 | 3 | 2 | 3 | 3 | 3 | 3 |
| Example 93 | 1 day: | 3 | 2 | 3 | 2 | 3 | 3 | 3 | 3 |
| | 7 day: | 3 | 3 | 2 | 2 | 3 | 3 | 3 | 3 |
| Example 94 | 1 day: | 2 | 2 | 2 | 2 | 3 | 2 | 3 | 3 |
| | 7 day: | 2 | 2 | 2 | 2 | 3 | 3 | 3 | 3 |
| Example 95 | 1 day: | 2 | 2 | 2 | 2 | 3 | 2 | 2 | 1 |
| | 7 day: | 3 | 3 | 3 | 2 | 3 | 2 | 2 | 2 |

EXAMPLES 122 and 123

Preparation of Water Borne Allyl Methacrylate, t-Butylaminoethyl Methacrylate-Containing Vinyl-Acrylic Polymers Procedure 7

To a 100 mL resin kettle equipped with a condenser, nitrogen purge and subsurface feed tube were added 219 g of water, 9.88 g of TERGITOL NP40 (70%), 3.52 g TERGITOL NP15 (25%) and 1.16 g of AEROSOL A102 (31%). A nitrogen purge was begun, then the contents of the reactor were brought up to 40° C. at 350 rpm. After reaching 40° C., an initiator charge of 0.100 g of isoascorbic acid in 5.0 g of water, 0.100 g of t-butyl hydroperoxide in 5.0 g of water, 0.710 g of 1.0% ammonium iron sulfate solution and 0.585 g of 1.0% diammonium ethylene-diamine-tetraacetic acid were added to the reactor. A monomer feed of 163.86 g of vinyl acetate and 32.48 g of 2-ethylhexyl acrylate was begun and fed in over approximately 90 minutes. Immediately after the first monomer feed was started, an initiator solution composed of 0.585 g of t-butyl hydroperoxide and 0.410 g of ammonium carbonate in 50 g of water and a reductant solution of 0.815 g of isoascorbic acid in 50 g of water were co-fed at rates of 0.21 g/min. for each solution. After the first stage monomer addition was complete, the reactor was held at 40° C. for 60 minutes with continued addition of initiator and reductant. After the hold period, a second monomer feed composed of 73 g of water, 4.7 g of AEROSOL 18 and monomers was fed into the reactor over 60 min. Heating was continued for approximately 60 min. The emulsion was cooled and then filtered through 100 mesh wire screen. The solids level, amount of dried material and the particle size were determined. The composition for the second stage of each latex is shown in Table 23.

TABLE 23

| Monomers in Feed 2 | Example 122 | Example 123 |
|---|---|---|
| Styrene | 57.87 | 56.30 |
| n-Butyl Acrylate | 41.55 | — |
| 2-Ethylhexyl Acrylate | — | 43.12 |
| Allyl Methacrylate | 15.12 | 15.12 |
| t-Butylaminoethyl Methacrylate | 7.54 | 7.54 |
| Acetoacetoxyethyl Methacrylate | 7.54 | 7.54 |
| 2-Ethylhexyl-3-mercaptopropionate | 0.95 | 0.95 |
| AMPS | 0.52 | 0.52 |

EXAMPLES 124–125
Cobalt formulation of Examples 122 and 123

EXAMPLE 124

To 100 g of the latex prepared in Example 122 were added with stirring 0.48 g of cobalt HYDROCURE II catalyst (5% active on cobalt). The formulated emulsion was stirred for 15 minutes.

EXAMPLE 125

To 100 g of the latex prepared in Example 123 were added with stirring 0.48 g of cobalt HYDROCURE II catalyst (5% active on cobalt). The formulated emulsion was stirred for 15 minutes.

Film Properties of Examples 122–125

Films of the emulsions from Examples 122–125 were cast at a wet thickness of 6 mil on release paper and allowed to dry at 50% relative humidity and 72° F. At the specified day, film samples were analyzed for gel fraction and swell ratio. This data is presented in Table 24.

TABLE 24

| Example: | Average Film Gel Fraction | Film Swell Ratio: | | | |
|---|---|---|---|---|---|
| | | 1 day: | 3 day: | 7 day: | 21 day: |
| 122 | 82 | 18 | 14 | 11 | 10 |
| 124 | 81 | 14 | 12 | 10 | 9 |
| 123 | 76 | 17 | 14 | 13 | 12 |
| 125 | 75 | 15 | 13 | 11 | 10 |

EXAMPLE 126
Preparation of a Water Borne Allyl Methacrylate-, AAEM-Containing Polymer Using 20% Styrene To a 3000 mL resin kettle equipped with a condenser, nitrogen purge, and subsurface feed tube were added 640 g of water, 4.05 g of TREM LF-40, 1.93 g of TERGITOL NP-40(70%), and 7.3 g of sodium carbonate, 41.987 g of methyl methacrylate, 8.79 g of styrene, 58.89 g of 2-ethylhexyl acrylate, and 0.17 g of trimethylolpropane triacrylate. A nitrogen purge was begun, then the contents of the reactor brought up to 80° C. at 400 rpm. After reaching 80° C., an initiator charge composed of 7.70 g of sodium persulfate dissolved in 43.6 g of water was added to the reactor. An emulsion feed composed of 355 g of water, 11.7 g of TREM LF-40, 10.21 g of TERGITOL NP-40 (70%), 357.9 g of methyl methacrylate, 54.0 g of styrene, 361.78 of 2-ethylhexyl acrylate, and 1.03 g of trimethylolpropane triacrylate was begun at 8.375 g/min. Five minutes after the first emulsion feed was begun, an initiator solution composed of 4.36 g of sodium persulfate dissolved in 112 g of water was fed in at 0.536 g/min. After the first emulsion feed was completed, a second emulsion feed composed of 171 g of water,12.79 g of AEROSOL 18, 5.09 g of TERGITOL NP-40 (70%), 177.06 g of styrene, 137 g of 2-ethylhexyl acrylate, 47.97 g of allyl methacrylate, 23.99 g of t-butylaminoethyl methacrylate, 4.80 g of 2-ethylhexyl 3-mercaptopropionate, 23.99 g of acetoacetoxyethyl methacrylate, and 1.68 g of 2-acrylamido-2-methylpropanesulfonate (50% in water) was fed into the reactor at 8.375 g/min. Five minutes after the last feed, an initiator solution of 1.34 g of t-butylhydroperoxide, and 1.34 g of sodium formaldehyde sulfoxylate dissolved in 40.2 g of water was charged and heating continued for 30 minutes. The emulsion was cooled than filtered through 100 mesh wire screen. Solids Level, 46.2%; dried material collected, 1.5 g. Latex gel fraction, 85.3% (Acetone); Latex swell Ratio, 5.7 (Acetone); Mn of Soluble Fraction, 15580 g/mole (GPC, polystyrene standard); Polydispersity, 2.8; Allyl Survival, 86%; Morphology, Core/Shell; MFFT, 10°–14° C.; Measured Tg, 0.3° C. (midpoint); −7.8° C. (Onset), Calculated Tg, 6° C. (Overall).

EXAMPLE 127
Preparation of a Waterborne Allyl Methacrylate-, Ureido-Containing Polymer Using 51% Styrene To a 1000 mL resin kettle equipped with a condenser, nitrogen purge, and subsurface feed tube were added 293.4 g of water, 1.34 g of TREM LF-40, 1.79 g of TERGITOL NP-40(70%), and 2.19 g of sodium carbonate, 18.9 g of styrene, 14.95 g of 2-ethylhexyl acrylate, and 0.10 g of trimethylolpropane triacrylate. A nitrogen purge was begun, then the contents of the reactor brought up to 80° C. at 400 rpm. After reaching 80° C., an initiator charge composed of 2.31 g of sodium persulfate dissolved in 13.1 g of water was added to the reactor. An emulsion feed composed of 72 g of water, 5.97 g of TREM LF-40, 4.30 g of TERGITOL NP-40 (70%), 116.2 g of styrene, 91.82 of 2-ethylhexyl acrylate, and 0.62 g of trimethylolpropane triacrylate was begun at 1.72 g/min. Five minutes after the first emulsion feed was begun, an initiator solution composed of 1.31 g of sodium persulfate dissolved in 33.67 g of water was fed in at 0.16 g/min. After the first emulsion feed was completed, a second emulsion feed composed of 48 g of water, 2.98 g of AEROSOL 18, 3.98 g of TERGITOL NP-40 (70%), 48.44 g of styrene, 42 g of 2-ethylhexyl acrylate, 14.44 g of allyl methacrylate, 7.20 g of N,N-dimethylaminoethyl methacrylate, 1.62 g of 2-ethylhexyl 3-mercaptopropionate, 7.20 g of ROHAMERE 6852-0 (N-(2-methacryloyloxyethyl)ethylene urea, a ureido-based monomer, 50% by weight in water), and 0.50 g of 2-acrylamido-2-methylpropanesulfonate (50% by weight in water) was fed into the reactor at 1.72 g/min. Five minutes after the last feed, an initiator solution of 0.402 g of t-butylhydroperoxide, and 0.402 g of sodium formaldehyde sulfoxylate dissolved in 12.1 g of water was charged and heating continued for 30 minutes. The emulsion was cooled than filtered through 100 mesh wire screen. Solids Level, 42.8%; dried material collected, 4.63 g.

EXAMPLE 128
Preparation of Zero Volatile Organic Compound-containing (V.O.C.) Semigloss Coatings from Emulsions Examples 126 and 12

The following paint letdowns were prepared using the Zero V.O.C. Grind of example 119 and emulsions of the examples shown.

Paint Letdown:

| Material: | | Weight (g): | |
|---|---|---|---|
| | | Example 126: | Example 127: |
| Zero VOC Grind | | 137.5 | 137.5 |
| Emulsion | | | |
| FOAMASTER AP | ⎫ | 1.0 | 1.0 |
| FOAMASTER VF | ⎪ | 1.5 | 1.5 |
| HYDROCURE II | Premix | 2.2 | 2.2 |
| Zirconium Hydrochem | ⎪ | — | 2.8 |
| SURFYNOL 104A | ⎭ | 5.0 | 5.0 |
| Water | | 51.0 | 51.0 |
| Then adjust pH to 8.3 to 8.7 using 28% ammonia below: | | | |
| NH₄OH | | 0.5 | 0.5 |
| Then add: | | | |
| water | ⎫ Premix | 30.0 | 30.0 |
| ACRYSOL RM-5 | ⎭ | 20.0 | 20.0 |
| Then adjust pH to 8.3 to 8.7 using 28% ammonia below: | | | |
| NH₄OH | | 0.83 | 0.83 |
| Then add: | | | |
| CELLOSIZE 4400H | ⎫ Premix | 0.5 | 0.5 |
| Water | ⎭ | 10.0 | 10.0 |
| Resulting pH: | | 8.6 | 8.5 |
| KU Viscosity | | 81 | 82 |
| 60° Gloss | | 88 | 71 |
| 20° Gloss | | 56 | 29 |

EXAMPLE 129

Coating Properties of Zero VOC Semigloss Paints from Example 128

Coatings were tested for print and blocking resistance. The ratings for the paints are shown in Table 26.

TABLE 25

Block and Print Resistance Properties of Zero VOC Semigloss Paints from Example 129:

| Example 129 Paint - Emulsion | 22-day | 22-day Wet | | Block Resistance: (days dry) | | | | Print Resistance: (days dry) | | | |
|---|---|---|---|---|---|---|---|---|---|---|---|
| Example: | Scrub: | Adhesion: | FTF: | 1 | 2 | 7 | 21 | 1 | 2 | 7 | 21 |
| 126 | 600 | 3000 | 1 day: | 2 | 2 | 2 | 1 | 2 | 2 | 2 | 2 |
| | | | 7 day: | 2 | 2 | 2 | 2 | 2 | 2 | 2 | 2 |
| 127 | 31 | 3000 | 1 day: | 2 | 2 | 2 | 1 | 1 | 1 | 1 | 1 |
| | | | 7 day: | 2 | 2 | 2 | 1 | 2 | 2 | 1 | 1 |

EXAMPLE 130

Preparation of Water-Borne 1-(2-Methoxy-3-Butenyl) Methacrylate-Containing Core/Shell Particles Preparation of the core To a 1000 mL resin Kettle equipped with a condenser, nitrogen purge, and subsurface feed tube were added 330 g of water, 1.79 g of TREM LF-40, 0.855 g of Tergitol NP-40 (70%), 18.04 g of styrene, 10.93 g of methyl methacrylate, 21.05 g of 2-ethylhexyl acrylate, and 0.100 g of trimethylolpropane triacrylate and 3.5 g of sodium carbonate. A nitrogen purge was begun, then the contents of the reactor brought up to 80° C. at 400 rpm. After reaching 80° C., an initiator solution charge composed of 3.29 g of sodium persulfate dissolved in 13 g of water were added to the reactor. An emulsion feed composed of 120 g of water, 5.18 g of TREM LF-40, 4.52 g of Teritol NP-40, 110.84 g of styrene, 67.11 g of methyl methacrylate, 129.30 g of 2-ethylhexyl acrylate, and 0.615 g of trimethylolpropane triacrylate was begun at 3.5 g/min. Five minutes after the emulsion feed was begun, an initiator solution composed of 2.22 g dissolved in 33.5 g of water was fed in at 0.223 g/min. After the initiator feed was completed, the contents of the reactors were heated for an additional 30 minutes to complete conversion. Solids, 42.6%.

Preparation of the core/shell latex

To a 1000 mL resin kettle equipped with a condenser, nitrogen purge, and subsurface feed tube were added 492.08 g of the above core, 52.5 g of water, and 1.28 g of sodium carbonate. A nitrogen purge was begun, then the contents of the reactor brought up to 80° C. at 400 rpm. After reaching 80° C., an initiator charge composed of 1.35 g of sodium persulfate dissolved in 7.62 g of water were added to the reactor. An emulsion feed composed of 71.82 g of water, 5.34 g of Aerosol 18, 2.14 g of Tergitol NP-40 (70%), 105.25 g of styrene, 73.45 g of 2-ethylhexyl acrylate, 16.79 g of 1-(2-methoxy-3-butenyl) methacrylate, 8.40 g dimethyaminoethyl methacrylate, 1.78 g of 2-ethylhexyl 3-mercaptopropionate, 8.40 g of N-(2-methacryloyloxyethyl)ethylene urea (50% by weight in water), and 0.582 g of the sodium salt of 2-acrylamido-2-methylpropanesulfonate (50% by weight in water) was fed into the reactor at 2.9 g/min. Five minutes after the emulsion feed was begun, an initiator solution composed of 0.762 g of sodium persulfate dissolved in 19.64 g of water was fed into the reactor at 0.188 g/min. Five minutes after the last feed, a post catalyst solution of 0.469 g of t-butylhydroperoxide, and 0.469 g of sodium formaldehyde sulfoxylate dissolved in 14.1 g of water was charged and heating continued for 30 minutes. The emulsion was cooled, then filtered through 100 mesh wire screen. The solids level (amount of dried material collected through a 100 mesh screen), 0.11 g; Solids, 48.1%.

Preparation of Zero Volatile Organic Compound (V.O.C.) Grind

A 15 gallon grind was prepared using a Premier disperser, as below, and a portion of the grind was used to letdown each specified paint.

| Material: | Volume: |
|---|---|
| Water | 48.00 |
| TAMOL 1124 | 4.00 |
| TRITON CF-10 | 2.00 |
| FOAMASTER AP | 2.00 |
| DOWICIL 75 | 1.00 |
| Disperse well then add under agitation: | |

-continued

| Material: | Volume: |
|---|---|
| TI-PURE R-900 | 200.00 |
| Cowles until the grind passes 7+ Hegman add: | |
| Water | 19.00 |
| Filter through a Fulflo filter and store. | |

Preparation of Zero V.O.C. Paint using Waterborne 1-(2-Methoxy-3-Butenyl) Methacrylate-Containing Core/shell Latex Emulsion The following paint letdown was prepared using the zero V.O.C. grind and the emulsion of the examples above.

| Material: | Paint Letdown: Weight (g): |
|---|---|
| Zero VOC Grind | 136.0 |
| Emulsion | 235.0 |
| FOAMASTER AP ⎫ | 1.0 |
| FOAMASTER VF ⎬ Premix | 1.5 |
| SURFYNOL 104 ⎪ | 3.8 |
| Hydrocure 11 ⎭ | 2.2 |
| ACRYSOL RM-2020 | 20.0 |
| Then adjust pH to 8.3 to 8.7 using 28% ammonia below: | |
| NH$_4$OH | 4.60 |
| Resulting pH: | 8.7 |
| KU Viscosity: | 86 |
| 60 Gloss: | 74 |
| 20 Gloss: | 33 |

Paint Property Evaluations

The paint made above was tested for block resistance, print resistance, scrub resistance and wet adhesion. The results are tabulated below.

Block and Print Resistance Properties of Zero VOC Semigloss Paint

| | Block Resistance: (Days Dry) | | | | Print Resistance: (Days Dry) | | | |
|---|---|---|---|---|---|---|---|---|
| Days FTF: | 1 | 2 | 7 | 21 | 1 | 2 | 7 | 21 |
| 1 day: | 7 | 8 | 8 | 9 | 0 | 4 | 4 | 4 |
| 7 day: | 7 | 7 | 9 | 9 | 0 | 0 | 2 | 2 |

ASTM Heated Block: 8
ASTM Heated Print: 6

Scrub Resistance of Zero VOC Semigloss Paint

| Days Dry: | Scrub cycles: |
|---|---|
| 8 | 687 |
| 15 | 703 |
| 22 | 619 |

Wet Adhesion Resistance of Zero VOC Semigloss Paint

| Days Dry: | Break Through Cycles: | Total Failure Cycles: |
|---|---|---|
| 1 | 3000 | 3000 |
| 8 | 3000 | 3000 |
| 15 | 3000 | 3000 |

We claim:

1. A curable polymer composition comprising the reaction product of the free radical emulsion polymerization of an allyl group-containing ethylenically unsaturated monomer, wherein said allyl group-containing monomer is a compound having at least one allyl group and at least one other ethylenically unsaturated group other than an allyl or a group which is capable of a free radical reaction, or wherein said allyl group-containing ethylenically unsaturated monomer is a compound having three or more allyl groups, wherein said allyl group is bonded to a moiety which is other than a carbonyl group, with a styrenic monomer or an alkyl (alkyl)acrylate, and optionally other ethylenically unsaturated monomers, wherein said polymer possesses sufficient available pendant allyl functionality to effect crosslinking, provided that said polymer has a glass transition temperature of less than 65° C.

2. The polymer composition of claim 1, wherein in said polymer, greater than about 60 percent of the total allyl groups on said allyl group-containing ethylenically unsaturated monomers remain unreacted after said polymerization.

3. The polymer composition of claim 1 or 2, wherein the allyl group-containing ethylenically unsaturated monomer is selected from the group consisting of allyl methacrylate, hydroxybutenyl methacrylate, allylmercapto propionate, the mono- and diallyl ester of maleic acid, and poly(allyl glycidyl ether); and wherein the styrenic monomer is selected from the group consisting of styrene, alpha-methyl styrene, vinyl naphthalene, vinyl toluene, and chloromethyl styrene.

4. The polymer composition of claim 1 or 2 wherein the allyl group-containing ethylenically unsaturated monomer is 1-(2-methoxy-3-butenyl) methacrylate.

5. The polymer composition of claim 1, wherein said composition, when applied to a substrate at a thickness of about 2 mils and exposed to at least ambient temperatures for a period of at least about 5 days, remains unpenetrated when subjected to about 100 methylethylketone double rubs.

6. The polymer composition of claim 1 or 5, wherein said polymer is prepared from monomers comprising about 4 to about 6 weight percent of allyl group-containing polyethylenically unsaturated monomers, about 20 to about 55 weight percent of styrenic monomers, and other ethylenically unsaturated monomers, the total being 100 percent.

7. The polymer composition of claim 1, wherein said other monomers are selected from the group consisting of t-butylaminoethyl methacrylate, dimethylaminoethyl methacrylate, and diethylaminoethyl methacrylate, N,N-dimethylaminopropyl methacrylamide, 2-t-butylaminoethyl methacrylate, N,N-dimethylaminoethyl acrylate, N-(2-methacryloyloxyethyl)ethylene urea, and methacrylamidoethylethylene urea.

8. The polymer composition of claim 1, further comprising pendant acetoacetyl moieties, wherein said moieties are optionally stabilized by reaction with ammonia or a primary or secondary amine.

9. The polymer composition of claim 1, further comprising an acetoacetoxy compound, wherein said compound is optionally reacted with ammonia or a primary or secondary amine to form an enamine.

10. A waterborne coating composition comprising a blend of water; a curable polymer composition comprising the reaction product of the free radical emulsion polymerization of an allyl group-containing ethylenically unsaturated monomer, wherein said allyl group-containing monomer is a compound having at least one allyl group and at least one other ethylenically unsaturated group other than an allyl or a group which is capable of a free radical reaction, or wherein said allyl group-containing ethylenically unsaturated monomer is a compound having three or more allyl groups, wherein said allyl group is bonded to a moiety which is other than a carbonyl group, with a styrenic monomer or an alkyl (alkyl)acrylate, and optionally other ethylenically unsaturated monomers, wherein said polymer possesses sufficient available pendant allyl functionality to effect crosslinking, provided that said polymer has a glass transition temperature of less than 65° C.; and optionally one or more water dispersible polymers selected from the group consisting of polyesters, polyester-amides, cellulose esters, alkyds, polyurethanes, epoxy resins, polyamides, acrylics, and vinyl polymers.

11. The coating composition of claim 10, further comprising one or more fillers and/or pigments.

12. A substrate coated with the composition of claim 10.

* * * * *